(12) United States Patent
Ruopp et al.

(10) Patent No.: US 11,939,026 B2
(45) Date of Patent: Mar. 26, 2024

(54) HYDRAULIC MASTER APPARATUS FOR A HYDRAULIC BRAKE OR CLUTCH OF HANDLEBAR-GUIDED VEHICLES AND HYDRAULIC BRAKE OF A HANDLEBAR-GUIDED VEHICLE

(71) Applicant: Gustav Magenwirth GmbH & Co. KG, Bad Urach (DE)

(72) Inventors: Michael Ruopp, Berghülen (DE); Axel Wechsler, Sindelfingen (DE); Philipp Rösing, Neuhausen (DE)

(73) Assignee: Gustav Magenwirth GmbH & Co., Bad Urach (DE)

( * ) Notice: Subject to any disclaimer, the term of this patent is extended or adjusted under 35 U.S.C. 154(b) by 375 days.

(21) Appl. No.: 16/870,626

(22) Filed: May 8, 2020

(65) Prior Publication Data
US 2020/0354015 A1 Nov. 12, 2020

(30) Foreign Application Priority Data

May 9, 2019 (DE) .................... 10 2019 206 753.0
Jun. 19, 2019 (DE) .................... 10 2019 208 990.9

(51) Int. Cl.
| | | |
|---|---|---|
| B62L 3/02 | (2006.01) | |
| B60T 7/10 | (2006.01) | |
| B60T 11/16 | (2006.01) | |
| B60T 11/18 | (2006.01) | |
| B62M 25/08 | (2006.01) | |
| B60T 11/22 | (2006.01) | |

(52) U.S. Cl.
CPC .............. *B62L 3/023* (2013.01); *B60T 7/102* (2013.01); *B60T 11/165* (2013.01); *B60T 11/18* (2013.01); *B62M 25/08* (2013.01); *B60T 11/22* (2013.01)

(58) Field of Classification Search
CPC ... B60T 7/08; B60T 7/10; B60T 7/101; B60T 7/102; B60T 7/108; B62L 3/02; B62L 3/023; B62K 23/06; B62M 25/08
See application file for complete search history.

(56) References Cited

U.S. PATENT DOCUMENTS

| 4,501,340 A | 2/1985 | Yoshida |
|---|---|---|
| 6,502,675 B1 | 1/2003 | Andrus |

(Continued)

FOREIGN PATENT DOCUMENTS

| CN | 204399153 U | 6/2015 |
|---|---|---|
| CN | 105073572 A | 11/2015 |

(Continued)

OTHER PUBLICATIONS

European Search Report for European Patent App. No. 20173859.8 dated Sep. 3, 2020.

(Continued)

*Primary Examiner* — Nicholas J Lane
(74) *Attorney, Agent, or Firm* — Gregory L. Mayback; Mayback IP Law, P.A.

(57) ABSTRACT

A hydraulic master apparatus, in particular, for a hydraulic brake or clutch of handlebar-guided vehicles with a lever, which is pivotally mounted in a support, and a hydraulic cylinder, which can be disposed in a handlebar tube of the handlebar-guided vehicle and has a piston movably disposed therein, wherein a central valve is disposed in the piston.

13 Claims, 29 Drawing Sheets

(56) References Cited

U.S. PATENT DOCUMENTS

| | | | |
|---|---|---|---|
| 7,249,661 | B2 | 7/2007 | Becocci et al. |
| 8,151,666 | B1 | 4/2012 | Kraus |
| 9,630,677 | B2 | 4/2017 | Jordan et al. |
| 10,589,819 | B2 * | 3/2020 | Komada ............... B62M 25/04 |
| 11,203,394 | B2 * | 12/2021 | Komada ............... B62L 3/023 |
| 2007/0251780 | A1 | 11/2007 | Lyons |
| 2009/0152063 | A1 | 6/2009 | Tsai |
| 2011/0162929 | A1 * | 7/2011 | Moore ................ B62K 21/12 |
| | | | 188/344 |
| 2012/0124991 | A1 * | 5/2012 | Thomas ............... F16D 25/088 |
| | | | 60/327 |
| 2012/0152673 | A1 | 6/2012 | Wang |
| 2015/0321725 | A1 * | 11/2015 | Kariyama ............. B62L 3/023 |
| | | | 74/491 |
| 2016/0221632 | A1 * | 8/2016 | Fujiwara ............. B62K 21/125 |
| 2016/0327070 | A1 * | 11/2016 | Fujiwara ............. B62L 3/023 |
| 2017/0240244 | A1 * | 8/2017 | Kariyama ............. F15B 1/26 |
| 2019/0152457 | A1 * | 5/2019 | Ruopp ................ B60T 11/22 |

FOREIGN PATENT DOCUMENTS

| | | |
|---|---|---|
| CN | 105460132 A | 4/2016 |
| DE | 3706545 A1 | 9/1988 |
| DE | 20107599 U1 | 3/2001 |
| DE | 202010016054 U1 | 3/2011 |
| DE | 102010053009 A1 | 6/2012 |
| DE | 102013009904 A1 | 12/2013 |
| DE | 102014007717 B3 | 9/2015 |
| DE | 102015010839 A1 | 8/2016 |
| DE | 102015010858 A1 | 8/2016 |
| DE | 102017202842 A1 | 8/2017 |
| DE | 102016119666.5 A1 | 4/2018 |
| DE | 102017219666 A1 | 5/2019 |
| DE | 202018000240 U1 | 5/2019 |
| EP | 0875443 A2 | 11/1998 |
| EP | 1449759 B1 | 6/2006 |
| EP | 1714734 B1 | 10/2006 |
| EP | 2460717 A1 | 6/2012 |
| EP | 2468618 A1 | 6/2012 |
| EP | 1595781 A1 | 11/2014 |
| EP | 2985198 A1 | 2/2016 |
| EP | 3018049 A1 | 5/2016 |
| EP | 3483049 A1 | 5/2019 |
| FR | 960276 A | 4/1950 |
| GB | 800196 A | 8/1958 |
| JP | H09226661 A | 9/1997 |
| TW | 201615479 A | 5/2016 |
| WO | 2004012956 A1 | 2/2004 |

OTHER PUBLICATIONS

European Search Report for European Patent App. No. 18204570.8 dated Apr. 15, 2019.

German Search Report for German Patent Application No. 10 2019 206 753.0 dated Jan. 16, 2020.

German Search Report for German Patent Application No. 10 2019 208 990.9 dated Feb. 17, 2020.

* cited by examiner

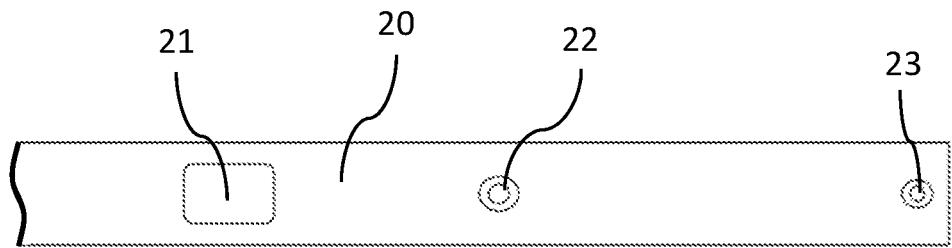
Fig. 3
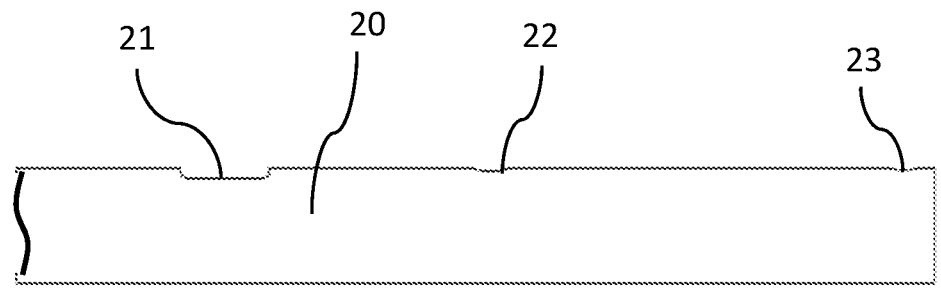
Fig. 4
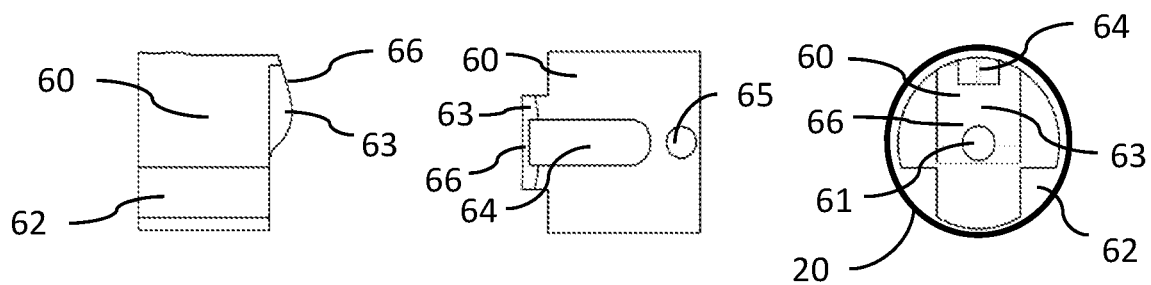
Fig. 5  Fig. 6  Fig. 7
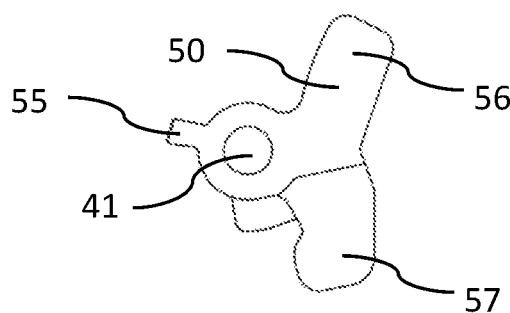 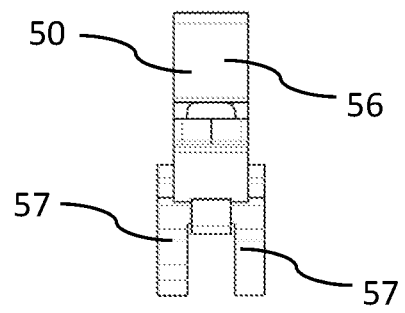
Fig. 8  Fig. 9

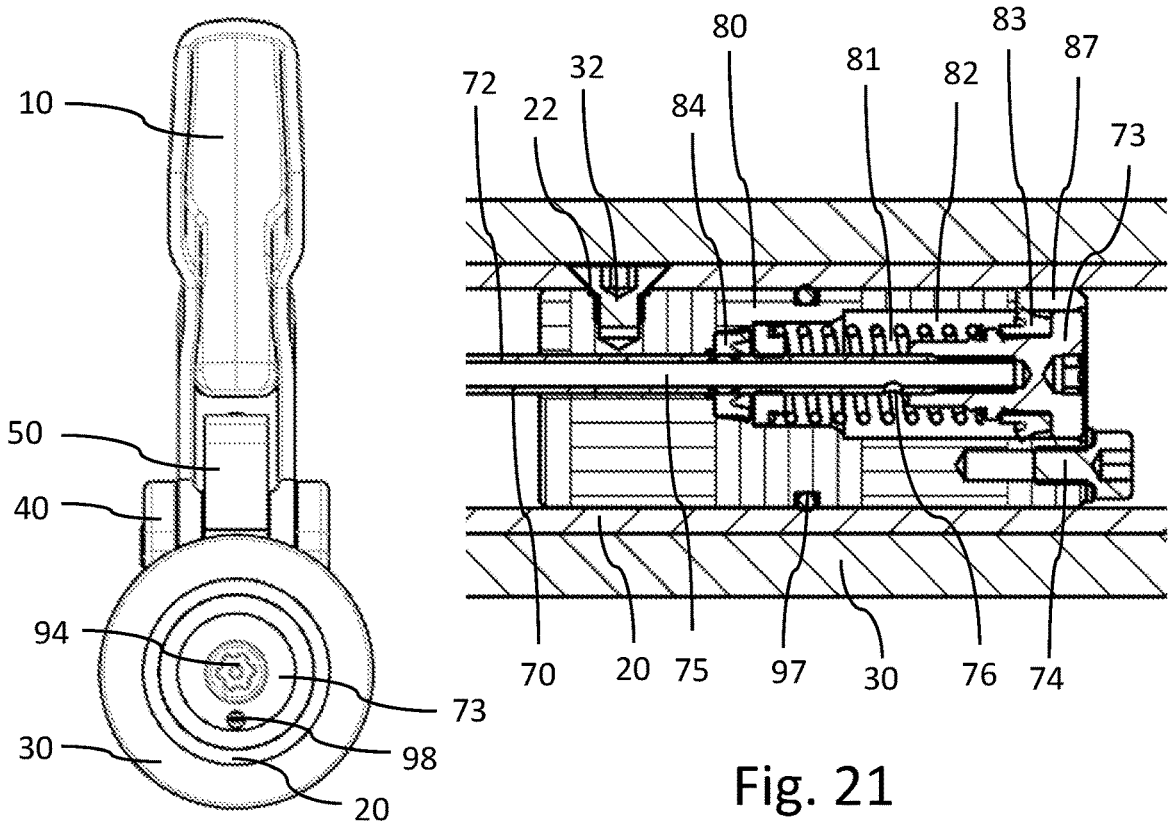
Fig. 20
Fig. 21
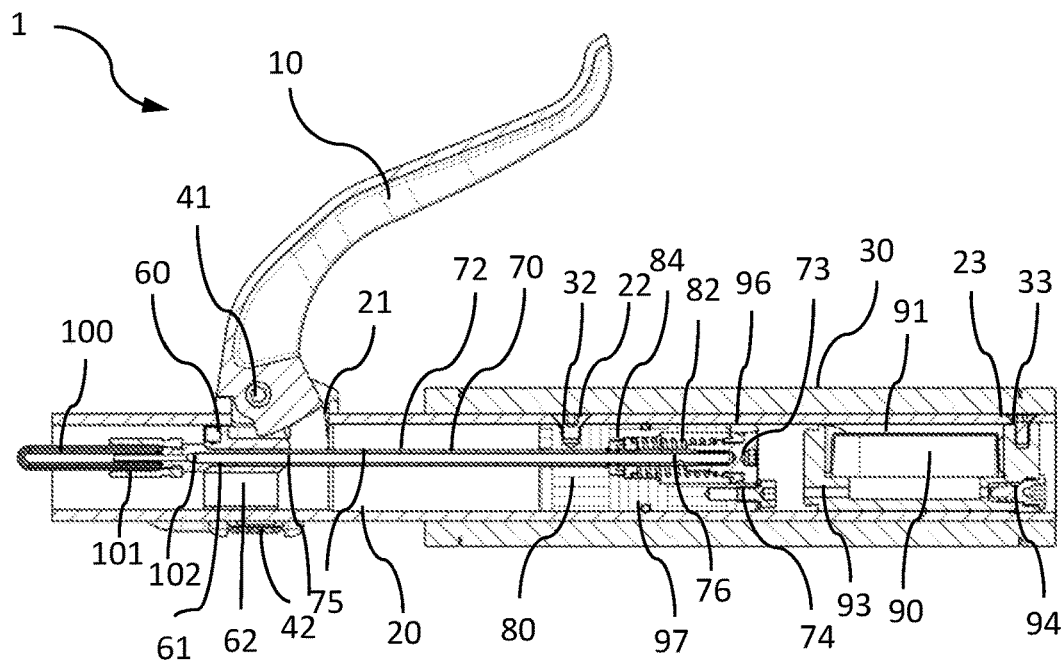
Fig. 22

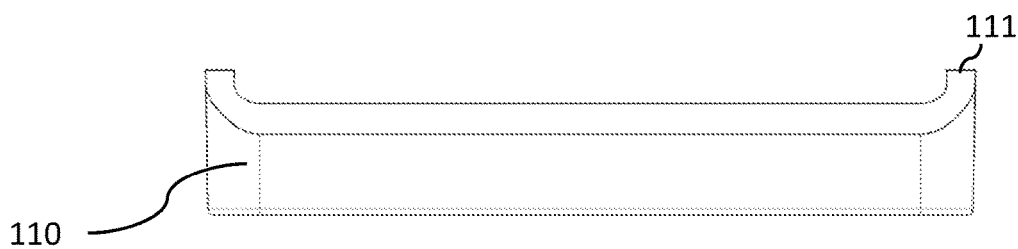
Fig. 30
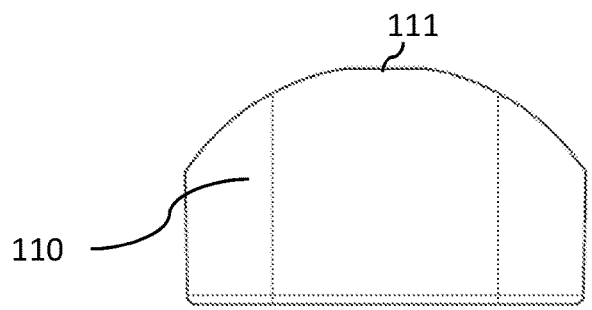
Fig. 31
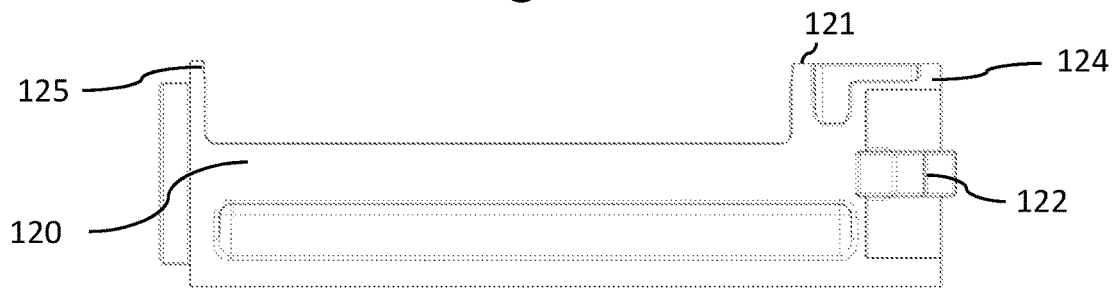
Fig. 32
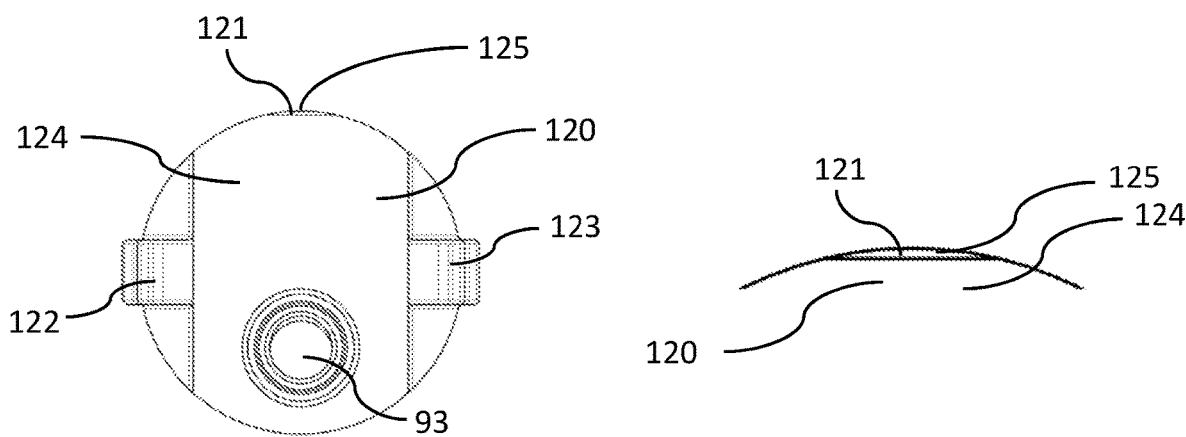
Fig. 33
Fig. 34

HYDRAULIC MASTER APPARATUS FOR A HYDRAULIC BRAKE OR CLUTCH OF HANDLEBAR-GUIDED VEHICLES AND HYDRAULIC BRAKE OF A HANDLEBAR-GUIDED VEHICLE

CROSS-REFERENCE TO RELATED APPLICATIONS

This application claims the priority, under 35 U.S.C. §§ 119, 120, 172, 363, and 365, of German patent application No. 10 2019 206 753.0, filed May 9, 2019, and German patent application No. 10 2019 208 990.9, filed Jun. 19, 2019; the prior applications are herewith incorporated by reference in their entirety.

STATEMENT REGARDING FEDERALLY SPONSORED RESEARCH OR DEVELOPMENT

Not Applicable

FIELD OF THE INVENTION

The present systems, apparatuses, and methods lie in the field of handlebar-guided vehicles. The present disclosure relates to a hydraulic master apparatus for a hydraulic brake or clutch of a handlebar-guided vehicle and a hydraulic brake of a handlebar-guided vehicle.

BACKGROUND OF THE INVENTION

British Patent No. GB 800,196 A discloses a hydraulic master apparatus that is disposed in a handlebar tube. This known hydraulic master apparatus is used for a closed system without compensating container and has a relatively complex design. A pressure cylinder is disposed in the hydraulic cylinder. The pressure rod is actuated by a deflection that is guided around the cylinder and that is actuated by the lever. This design is very space-intensive and not suitable for open systems having a compensating container.

German Published, Non-Prosecuted Patent Applications DE 10 2015 010 839 A1 and DE 10 2015 010 858 A1 disclose hydraulic master apparatuses for a special handlebar geometry, which have a handlebar tube that is guided forward. At the open end of the handlebar tube, the hydraulic master apparatus protrudes forward from the handlebar tube and is also disposed around the handlebar tube. These known hydraulic master apparatuses are not suitable for mounting on handlebars that run transversely to the longitudinal axis of the vehicle, such as those used on trekking bikes, mountain bikes or most electric bicycles.

U.S. Pat. No. 6,502,675 B1 discloses hydraulic master apparatuses for a hydraulic brake of a handlebar-guided vehicle, where the master cylinder is disposed in the handlebar tube. The hydraulic master apparatuses known from U.S. Pat. No. 6,502,675 B1 have the disadvantage that the master cylinders are disposed in the handlebar tube in the direction of the vehicle center seen from the lever. This is where the handlebar tube usually has bends. This means that only a very limited installation space is available and the assembly is cumbersome and difficult if the conventional curved handlebar tubes are used.

Thus, a need exists to overcome the problems with the prior art systems, designs, and processes as discussed above.

SUMMARY OF THE INVENTION

The systems, apparatuses, and methods described provide a hydraulic master apparatus for a hydraulic brake or clutch of a handlebar-guided vehicle and a hydraulic brake of a handlebar-guided vehicle that overcome the hereinafore-mentioned disadvantages of the heretofore-known devices and methods of this general type and that provide such features with a hydraulic master apparatus that can be easily mounted on standard handlebar tubes with bends towards the center of the vehicle.

According to a configuration, a hydraulic master apparatus, in particular for a hydraulic brake or clutch of handlebar-guided vehicles, is provided with a lever pivotally mounted in a support and a hydraulic cylinder, which can be disposed in a handlebar tube of the handlebar-guided vehicle and has a piston movably disposed therein, a central valve being disposed in the piston. This design has the advantage that it can be made very short and simple, so that it can be e.g., disposed in the handlebar tube or integrated into it or formed as a unit that can be inserted into the limited installation space of the handlebar tube.

According to a configuration, the central valve can establish a connection between the pressure chamber provided in the hydraulic cylinder and the compensating chamber in the rest state and close it when the hydraulic master apparatus is actuated. The central valve can, thus, replace the compensating bore, which is normally traversed in known hydraulic master apparatuses without a central valve when the piston seal is actuated.

According to a configuration, the central valve can comprise a closing member that is configured as a hydraulic channel. Preferably, the hydraulic channel can create or have a connection to the compensating container.

According to a configuration, the hydraulic cylinder can be configured as a pull cylinder. A pull cylinder is understood to be in particular hydraulic cylinders in which a pulling device is provided for actuating the hydraulic master apparatus, which can be formed, for example, according to one of the designs herein. The pulling device can be made here such that, when the hydraulic master apparatus is actuated, a pulling force is exerted on the pulling device by the lever or the pressure piece and the pulling device pulls the piston in the direction of the pressure chamber of the hydraulic cylinder.

According to a configuration, the hydraulic cylinder can alternatively be made as a pressure cylinder. A pressure cylinder is understood to be, in particular, hydraulic cylinders in which, upon actuation of the hydraulic master apparatus, which can be formed according to one of the configurations here, for example, a pressure is exerted on the piston that is directed towards the pressure chamber of the hydraulic cylinder.

One exemplary configuration provides a hydraulic master apparatus, in particular, for a hydraulic brake or clutch of handlebar-guided vehicles, which can preferably be made with a central valve according to the above-mentioned configuration, which central valve comprises a lever with a force transmission member and an insert for insertion into a handlebar tube, the insert having an end at which a hydraulic cylinder (or master cylinder) is formed and/or disposed with a pressure chamber in which a piston is movably disposed, and comprises an engagement opening for engagement of the force transmission member.

According to a configuration, this or these design(s) of the hydraulic master apparatus according to a configuration can be made in accordance with one or more of the above mentioned features of the other configurations.

Likewise, the other designs of the hydraulic master apparatus according to a configuration can be configured in accordance with one or more of the features of the respectively other configurations.

According to a configuration, the force transmission member can bean extension of the lever or an extension of a pressure piece optionally provided in the force transmission path.

According to a configuration, a connection between the compensating chamber and the pressure chamber can be created by a or the central valve in the case of the configurations having a compensating chamber. The central valve can here have a passage that runs through the piston of the master apparatus. The passage through the piston can be closed by the pulling device in the case of the designs that have a pulling device. Alternatively or additionally, the central valve can be closed in another way when the hydraulic master apparatus is actuated, for example, by a preloaded valve closing spring. The closing member of the central valve can be formed by one end of the pulling device running through the piston.

Even in configurations without a pulling device, the central valve can be closed in another way when the hydraulic master apparatus is actuated, for example, by a preloaded valve closing spring.

For all configurations with central valve, the valve seat of the central valve can be formed in the piston. The central valve can have a seal disposed between the closing member and the valve seat. Alternatively or additionally, the central valve can be formed and disposed such that it is closed by the interaction of closing member and valve seat.

According to a configuration, the pulling device can have a connecting section or a connecting device that can be disposed and/or secured in the shifting device. The shifting device can be made here in two or more parts and/or have a clamping device that is disposed and formed such that it can secure or fasten the connecting device of the pulling device to the shifting device. In this case, the clamping device can have a contour on which the force transmission part (e.g., pressure piece or lever extension) engages, which can be formed such that a desired change in the transmission ratio is achieved in the course of actuation.

According to a configuration, the hydraulic cylinder can be made as a pressure cylinder that can be actuated when a pressure is applied by the force transmission member.

According to a configuration, the hydraulic master apparatus can have a pulling device to which a pressure is applied by the force transmission part when the hydraulic master apparatus is actuated and that exerts a pulling force on the piston of the hydraulic cylinder.

According to a configuration, the hydraulic master apparatus can have a compensating container for hydraulic fluid that is formed and/or disposed in the insert.

According to a configuration, the compensating container can be disposed and/or formed at the end of the insert that is opposite the end of the insert at which the hydraulic cylinder is disposed and/or formed.

According to a configuration, the engagement opening in the insert can be disposed between the compensating container and the hydraulic cylinder.

Applicant hereby incorporates by reference herein U.S. Patent Publication No. 2019/152457 (application Ser. No. 16/181,873), filed Nov. 6, 2018. A design to the invention provides a hydraulic master apparatus as disclosed in U.S. Patent Publication No. 2019/152457 being modified by one or more of the features of any of the designs as disclosed in this application, especially by one or more features as disclosed in the designs of the invention as shown in one or more of FIGS. 46 to 80.

A configuration provides a hydraulic master apparatus, in particular, for a hydraulic brake or clutch of handlebar-guided vehicles, which can be made preferably according to one or more of the above mentioned or other configurations, with a lever pivotally mounted in a support and a hydraulic cylinder that can be disposed in a handlebar tube of the handlebar-guided vehicle, the hydraulic master apparatus having a pulling device that exerts a pulling force on the piston of the hydraulic cylinder when the hydraulic master apparatus is actuated.

The configurations herein have the advantage that due to the embodiment according to a configuration sufficient installation space is available because the master cylinder can be disposed from the lever to the vehicle side, i.e., in the straight area of the handle tube.

According to a configuration, this or these configuration(s) of the hydraulic master apparatus can be formed in accordance with one or more of the above mentioned features of the other configurations.

According to a configuration, the pulling device can comprise a pull rod. The pull rod can here simultaneously be the piston rod for the piston of the hydraulic master apparatus. Due to the double function of the pull rod, a compact and simple design can be achieved.

According to a configuration, the piston rod can run through the pressure chamber. This has the advantage of a compact and simple design.

According to a configuration, a hydraulic channel can be disposed in the pulling device from the hydraulic cylinder to the hydraulic line that is connected to the associated hydraulic slave apparatus.

According to a configuration, the hydraulic channel can be disposed or formed in the pull rod. This design has the advantage that very little space is required due to the double function of the pull bar.

According to a configuration, the hydraulic master apparatus can have a shifting device that is disposed in the handlebar tube of the handlebar-guided vehicle such that it can be moved in the longitudinal direction of the handlebar tube.

According to a configuration, the shifting device can be connected to the pulling device. Here, a connecting device for connecting the shifting device to the pulling device can be provided.

In the case of the configurations with a pull rod, the pull rod can have a bent section or be bent by a certain angle to form the connecting device. The pull rod or the bent section can be bent here at an angle of more than 45 degrees, preferably more than 60 degrees, more preferably more than 75 degrees, and preferably at an angle of approximately 90 degrees. The bending radius of the bent section of the pull rod here can be less than 80%, preferably less than 70%, more preferably less than 60% and preferably about 50% of the diameter of the handlebar tube or insert or hydraulic cylinder. This method can simplify the assembly and significantly reduce the cost of the pulling device. A safety device can be provided here to secure the pulling device in the shifting device. Advantageously, the safety device can be formed and disposed such that it supports the bent section of the pull rod, preferably, such that deformation or fatigue of the bent section of the pull rod is hindered or prevented by the support when the hydraulic master apparatus is actuated. The support allows the bent section of the pull rod to be supported on the safety device so that, as far as possible, no forces are exerted on the bent section that would bring the bent section back into a straight shape or into a less bent shape. According to a configuration, the pulling device can thus have a safety device that is formed and disposed such that it secures the pulling device in the shifting device and supports the bent section of the pull rod such that deformation of the bent section is prevented. The safety device can be configured here as a bolt or pin. These configurations have the advantage that a longer service life or durability of the pull rod is created.

According to a configuration, the lever can be hinged to two axes of rotation, which are engaged by two arms pivotally disposed on the lever. This configuration has the advantage that when the pivot point is low, the increase in the transmission ratio can be somewhat lower.

According to a configuration, one arm can be part of a pressure piece.

According to a configuration, the pulling device can have an anti-rotation mechanism, which prevents or restricts rotation in the handlebar tube. The anti-rotation mechanism can here include an alignment device between the shifting device and a pressure piece that transmits the force from the lever to the shifting device. For example, the shifting device can include a groove that is engaged by fork legs or two extensions of the pressure piece. In the case of configurations without pressure piece, the lever can also engage accordingly directly on the shifting device. Alternatively or additionally, the shifting device can also comprise two webs between which a web of the pressure piece or lever engages.

An anti-rotation mechanism is advantageous because the hydraulic line might possibly exert a torque on the hydraulic master apparatus because the hydraulic line might have been disposed on a reel before the assembly and, therefore, has a twist.

According to a configuration, the shifting device can have a contour in order to achieve a decreasing transmission ratio preferably with increasing actuation of the hydraulic master apparatus. For these designs, it is advantageous to provide an anti-rotation mechanism for the shifting device.

According to a configuration, the hydraulic master apparatus can be configured such that a variable transmission ratio is realized, wherein a decreasing transmission ratio can be achieved preferably with increasing actuation of the hydraulic master apparatus. The variable transmission ratio can here, preferably, be achieved mechanically. Alternatively or additionally, the transmission ratio can also be varied hydraulically with the actuation travel. In the case of mechanical change in the transmission ratio, the change can be achieved by the use of gates and/or eccentrics by which, preferably, the length of the effective lever arms is varied. Additionally or alternatively, the desired movement geometry can be achieved by providing multiple joint apparatuses, such as parallelogram joint apparatuses. Alternatively or additionally, actuation travel-dependent or actuation angle-dependent tread geometries can be provided. These can, for example, be formed on interacting running surfaces. According to a configuration, treads cooperating during actuation can be provided on the lever and/or an optionally provided gate, on the lever and/or an optionally provided pressure piece, in the case of a multi-part lever on a first and/or a second lever part, on an optionally provided gate and/or an optionally provided pressure piece, on the optionally provided pressure piece and/or the piston, on the gate and/or the piston, on the lever and/or the piston.

According to a configuration, the hydraulic master apparatus can have a lever bearing for receiving the lever on the hydraulic master apparatus. In this case, the lever bearing can be disposed and formed in a bearing block disposed outside the handlebar tube. The bearing block can be made here as a separate component. The bearing block can be made as one piece or as several pieces. In the case of a design with several pieces, the bearing block can be connected with suitable connecting members, wherein it is preferably clamped onto the handlebar tube. The anti-rotation mechanism of the bearing block can also be realized by the engagement of the lever and/or a pressure piece which is optionally provided in the force flow and which engages in or enters the handlebar tube for force transmission.

According to a configuration, the lever bearing can be integrated into the hydraulic master apparatus. The lever bearing can be disposed here and formed such that it is disposed inside the handlebar tube, in the area of the wall of the handlebar tube and/or on areas of the hydraulic master apparatus that protrude from the handlebar tube. In some configurations in which the hydraulic master apparatus is formed as a cartridge inserted into the handlebar tube, the lever bearing can be carried out such that the lever bearing is formed as a component that can be disposed so as to engage in the handlebar tube at least partially through an opening in the handlebar tube. Alternatively or additionally, the lever bearing can be integrated into the handlebar tube. In this case, the lever bearing can at least partially guarantee the further function of securing the hydraulic master apparatus disposed in the handlebar tube. The safety device can be an anti-rotation mechanism and/or a safety device to prevent displacement in an axial direction. Alternatively or additionally, the lever bearing can be disposed and formed outside the handlebar tube, for example, as a bearing block that can be separate and/or integrated or partially integrated into the handlebar tube.

According to a configuration, the lever bearing can be disposed and/or formed in tabs formed by the handlebar tube. The tabs can be at least partially formed here from the material of the handlebar tube that is available for the passage of the handlebar when the opening in the handlebar tube is formed. In other words, the tabs can be formed at least partially by bending the material of the handlebar tube outwards to form an opening. Alternatively and/or additionally, the handlebar tube can also be formed from a fiber composite material, wherein it is possible to integrate, during the production, the tabs that are provided in the vicinity of an opening for the passage of the lever and/or of a pressure piece and/or of a component in the force transmission chain, preferably, on both sides of the opening. Alternatively, a bearing on one side can also be provided in order to create installation space for other components on the other side. For example, only one tab can be provided. Alternatively, in the case of configurations with two tabs, the other tab can be used to accommodate other components.

According to a configuration, the lever bearing can include journals integrated in the pressure piece and/or the lever. The journals can be disposed here in corresponding supports.

According to a configuration, the lever bearing can be made with a screw connection or bolting, a riveting, a pressing, a pinning and/or any combination of these bearings known to a person skilled in the art.

According to a configuration, the lever bearing can be disposed and formed such that the lever bearing axis runs at an angle, i.e., at an angle to a vertical of the axis or extension of the handlebar tube. The angle of the lever bearing axis to the axis of the handlebar tube can be more than 60 degrees, preferably more than 70 degrees, and preferably more than 80 degrees. The angle of the lever bearing axis to the axis of the handlebar tube can be less than 89 degrees, preferably less than 88 degrees, and preferably less than 87 degrees. For example, the angle can be approximately 85 degrees.

According to a configuration, the lever bearing can be disposed and formed such that the lever bearing point and/or the direction of the lever bearing axis is dependent on the angle of rotation. The lever bearing can here have an eccentric and/or a worm gear apparatus which changes the lever bearing point, i.e., the distance of the lever axis of rotation from the handlebar tube, and/or the momentary direction of the bearing axis, i.e., the angle between the momentary lever axis of rotation and the handlebar tube, depending on the angle of rotation of the lever or the actuation travel.

According to a configuration, the lever bearing point can be adjustable.

According to a configuration, the lever can be removable. This can be used as an anti-theft device, for example. Alternatively and/or additionally, the lever can be reusable in another direction in which the hydraulic master apparatus is fully actuated, for example. In the case of a brake, the brake would then be actuated, which can be used as both an anti-theft device and a transport-securing device.

According to a configuration, a device for electrical gas actuation can be integrated in the lever bearing.

According to a configuration, the hydraulic master apparatus can have a grip width adjusting apparatus, by which the distance between the support for the lever and the master cylinder can be adjusted in order to adjust the grip width.

Therefore, according to a configuration also provides a hydraulic master apparatus, in particular, for a hydraulic brake or clutch of handlebar-guided vehicles, which can preferably be made according to one or more of the above mentioned configurations, with a lever that is pivotally disposed in a support and a hydraulic cylinder that can be disposed in a handlebar tube of the handlebar-guided vehicle, the hydraulic master apparatus having a grip width adjusting apparatus with which the distance between the support for the lever and the master cylinder can be adjusted in order to adjust the grip width.

According to a configuration, this or these configuration(s) of the hydraulic master apparatus according to a configuration can be made in accordance with one or more of the above mentioned features of the other configurations.

According to a configuration, the support can be disposed on the handlebar tube in a movable fashion.

According to a configuration, the master cylinder can be disposed in the handlebar tube in a movable fashion.

According to a configuration, the master cylinder can be fastened to the handlebar tube by a fastening member. The fastening member can be a screw. An elongated hole can be formed in the handlebar tube. The elongated hole can have an edge with contours or a grating so that the fastening member can only be tightened in certain positions.

According to a configuration, the hydraulic master apparatus can have a pulling device that exerts a pulling force on the piston of the hydraulic cylinder when the hydraulic master apparatus is actuated and can have a shifting device that is disposed in the handlebar tube of the handlebar-guided vehicle so as to be movable in the longitudinal direction of the handlebar tube, the shifting device being connected to the pulling device. The length of the pulling device can be adjustable here.

According to a configuration, the pulling device can have a pull rod.

According to a configuration, the length of the pull rod can be adjustable. Alternatively or additionally, the point of application of the pulling device on the shifting device and/or on the master cylinder can be adjustable according to a configuration.

For example, the shifting device and the pulling device or the pulling device and the master cylinder can be connected through a screw connection. This has the advantage that the point of application can be easily shifted or adjusted by turning the pulling device or a screw of the screw connection.

According to a configuration, the pulling device can have a pull rod that is connected to the shifting device through a screw.

According to a configuration, the hydraulic master apparatus can have a compensating chamber disposed in the handlebar tube.

Therefore, a hydraulic master apparatus for a hydraulic brake or clutch of handlebar-guided vehicles comprises, according to a configuration, a lever, which is pivotally disposed in a support, and a hydraulic cylinder, which can be disposed in a handlebar tube of the handlebar-guided vehicle, the hydraulic master apparatus having a compensating chamber disposed in the handlebar tube.

According to a configuration, the master cylinder can be disposed between the support for the lever and the compensating chamber.

According to a configuration, the master cylinder can have an extension, in which the compensating chamber is disposed.

According to a configuration, the lever support can be disposed on the outside of the handlebar tube. Here, the lever can be directed towards the center of the vehicle.

According to a configuration, the piston of the master cylinder can have an extension that extends into the compensating chamber. A hydraulic channel can be disposed here in the extension of the piston.

According to a configuration, the hydraulic channel can be connected to the pressure chamber in the master cylinder.

According to a configuration, the hydraulic channel can run through the compensating chamber.

According to a configuration, the compensating chamber can be disposed on the outside of the handlebar tube.

According to a configuration, the support for the vent screw can have a Luer cone for receiving a commercially available syringe.

According to a configuration, a vent valve can be provided on the end of the handlebar. The vent valve can be provided as an alternative to the vent screw. It is also possible to provide both variants. Here, the support for the vent valve can have a Luer cone for receiving a commercially available syringe. The advantage is that the system can be easily filled before the insertion or after the removal of the vent valve.

According to a configuration, the hydraulic master apparatus can have a sensor for detecting the position of the lever. Here, the position of the lever can be used to actuate a brake light. Furthermore, in vehicles with an electric drive, the position of the lever can be used to control recuperation.

According to a configuration, the hydraulic master apparatus can have an indicator that indicates the filling level in the compensating chamber. The indicator can be hydraulically connected to the compensating chamber.

According to a configuration, the indicator can be disposed in the grip area of the handlebar.

According to a configuration, the indicator can be provided at the end of the handlebar tube. For this purpose, the compensating housing can, preferably, be made of two parts, so that an indicator section can, advantageously, be made transparent.

Alternatively or additionally, the indicator can include a sensor for detecting the filling level in the compensating chamber and elements to control the indicator. The sensor device can here comprise a magnet that is disposed on the bellows and interacts with a sensor that can be provided, for example, on the wall of the compensating housing and/or of the master cylinder in the region of the compensating housing.

According to a configuration, the sensor can be configured such that it can detect the signal of the corresponding signal transmitter capacitively, electrically, optoelectrically, mechanically, and/or acoustically, for example, by ultrasound.

According to a configuration, the filling level can be transmitted to a control unit and/or an indicator. The signal (e.g., of the filling level) can be transmitted through cable and/or radio.

According to a configuration, the lever can be made in one piece.

According to a configuration, the lever can be made in several pieces. In this case, the components of the lever can be pivotally connected to one another. Preferably, a grip width adjustment device can be provided here, with which, for example, the angle between the components can be adjusted. The provision of a multi-part lever can have the advantage that a better ergonomic adjustment of the lever geometry is possible. Alternatively and/or additionally, different components with different dimensions can be used to achieve a better adaptation. For example, an adjustment can be made by adjusting the handle of the lever.

According to a configuration, the lever can have a protective apparatus, for example, a preferably spherical thickening at the end of the lever.

According to a configuration, the lever can be made of aluminum, steel, plastic material, a fiber composite, titanium, and/or a combination of these materials, or comprise one or more of these materials.

According to a configuration, the hydraulic master apparatus can be completely integrated or accommodated in the handlebar tube, except for the operating lever.

According to a configuration, the hydraulic master apparatus can have an eccentric device for eccentrically mounting the lever in the housing or for linking the lever to the housing. In such a case, the eccentric device can have a rotating device in which a link support can be formed to receive the lever and/or a pressure piece.

According to a configuration, the handlebar tube of the handlebar-guided vehicle can extend transversely to the direction of the vehicle. In other words, the handlebar tube can be formed and disposed such that the ends of the handlebar tube are disposed on both sides of the vehicle. According to a configuration, the hydraulic master apparatus can be disposed at one end of the handlebar tube, or a pair of hydraulic master apparatuses (e.g., for a front wheel brake and a rear wheel brake) can be disposed on both handlebar ends that are located on opposite sides of the vehicle (e.g., left and right in the direction of travel).

According to a configuration, the hydraulic master apparatus can have a compensating container. The compensating container can be disposed in the area of the handlebar tube end, for example, on the side of the handlebar-guided vehicle. In this case, the compensating container can have a viewing window. Alternatively and/or additionally, the compensating container or another compensating container can be formed and disposed in a detached manner in the handlebar tube. Alternatively and/or additionally, the compensating container or another compensating container can be formed and disposed outside the handlebar tube.

According to a configuration, the hydraulic master apparatus can have a support that can, for example, be configured as a mirror mount. The support can be disposed and formed on the compensating container. Alternatively and/or additionally, the support or a further support can be formed on a clamp for fastening the lever. In this case, the support can have a torque support with which the support transmits any torque to the handlebar tube and not to the lever mount. The torque support can be configured here in accordance with European Patent Publication EP 3 156 313 A1, corresponding to U.S. Pat. No. 10,279,858, the entire content of which is incorporated by reference into the present application.

According to a configuration, the support of the hydraulic master apparatus can include a support for a rotary handle. In this case, the support can simultaneously be formed and/or disposed as a support and/or mount for the lever. The rotary handle can be configured here for actuating the throttle and/or clutch. The rotary handle can be configured for the electrical operation of throttle and/or clutch.

According to a configuration, the clamp can be made as two pieces. In this case, the clamp can be tightened with two screws in order to realize a clamping at the handlebar tube.

According to a configuration, the clamp can be integrated into the lever bearing. The integration of the clamp into the lever bearing can be realized here by a rigid connection. In this case, a slot can be provided to allow clamping to the handlebar tube. Alternatively or additionally, a flexible connection between the lever bearing and the clamp can be provided, for example, by a joint connection. Alternatively or additionally, a pivotal connection between the lever bearing and the clamp can be provided. In this case, a pin or screw connection can be provided.

According to a configuration, operating elements can be provided and/or integrated in the support. The operating elements can here include switches and levers for operating or actuating adjustable seat supports, turn indicators, a horn, the lighting, the gear shift or other components. The actuation can be mechanical, electrical, hydraulic and/or by radio. According to a configuration, automatic downshifting can also be realized during braking, for example, by corresponding programming a control unit that, if necessary, also takes the current speed into account when deciding when automatic shifting to a lower gear should take place.

According to a configuration, the hydraulic master apparatus can be made to be ergonomically adapted to the driver. The hydraulic master apparatus can include a device for adjusting the angle of inclination of the lever. The angle of inclination can, for example, be adjusted by the eccentric device, if this is made to be adjustable. Additionally and/or alternatively, the hydraulic master apparatus can include a device for adjusting the free travel. Additionally and/or alternatively, the hydraulic master apparatus can include a device for adjusting the mechanical transmission ratio. Additionally and/or alternatively, the hydraulic master apparatus can include a device for adjusting the grip width. Additionally and/or alternatively, the hydraulic master apparatus can include a device for adjusting the axial position of the hydraulic master apparatus on the handlebar tube.

According to a configuration, the hydraulic master apparatus can have a switch that is actuated and/or activated when the hydraulic master apparatus is actuated. The switch can, for example, be a brake light switch and/or a clutch switch. The switch can be disposed here and formed in the lever. In such a case, the brake light switch can be activated by the internal deformation of the lever and/or a joint: The activation of the brake light switch can, for example, be in accordance with the disclosure of German Published, Non-Prosecuted Patent Application DE 10 2014 111 917 A1, the entire content of which is incorporated by reference into the present application.

According to a configuration, the switch (e.g., a brake light switch and/or a clutch switch) can be formed and disposed externally on the handlebar tube or handlebar, such as a dead man's switch.

According to a configuration, the switch (e.g., a brake light switch and/or a clutch switch) can be formed and disposed internally in the handlebar tube or handlebar, such as a dead man's switch.

According to a configuration, the switch (e.g., a brake light switch and/or a clutch switch) can be formed and disposed externally on the lever bearing, such as a dead man's switch.

According to a configuration, the switch (e.g., a brake light switch and/or a clutch switch) can be made as a reed switch.

According to a configuration, the switch (e.g., a brake light switch and/or a clutch switch) can be made as a Hall switch.

According to a configuration, the switch (e.g., brake light switch and/or clutch switch) can be made as a Hall proportional sensor.

According to a configuration, the switch (e.g., brake light switch and/or a clutch switch) can be made as a mechanical switch.

According to a configuration, the switch (e.g., brake light switch and/or clutch switch) can be made as an optoelectric switch.

According to a configuration, the switch (e.g., brake light switch and/or a clutch switch) can be made to detect the signal of the corresponding signal generator capacitively, electrically, opto-electrically, mechanically, and/or acoustically, for example, through ultrasound.

According to a configuration, the signal of the switch (e.g., the brake actuation, the brake lever position and/or the clutch switch actuation) can be transmitted to a control unit and/or a display. The signal can be transmitted by cable and/or radio.

According to a configuration, the hydraulic master apparatus can have a protection apparatus. The protection apparatus can include a hand guard. The protection apparatus can be clamped to the handlebar tube at an inner area and/or an outer area. The protection apparatus also provides protection for the mechanics and hydraulics in the event of an impact and/or a fall. According to a configuration, the hydraulic master apparatus can be disposed on a handlebar stub.

According to a configuration, the hydraulic master apparatus can be made as a closed hydraulic system.

According to a configuration, the hydraulic master apparatus can have an adjustment device. The adjustment device can compensate for a larger free travel, for example, due to pad wear, or adjust the free travel. The adjustment device can be provided here at the end of the handlebar and can, for example, be inserted deeper into the hydraulic master apparatus, for example, through a screw connection. In this case, an adjusting screw can be screwed deeper into the hydraulic master apparatus to effect the adjustment or readjustment. In this case, the piston of the hydraulic master apparatus can extend to the handlebar end and/or be closed by the adjustment device. A venting device can be disposed in the adjustment device.

A hydraulic master apparatus comprises a lever with a force transmission member and an insert for insertion into a handlebar tube, which comprises a first end at which a master cylinder with a pressure chamber is disposed and an engagement opening for engagement of the force transmission member.

This configuration has the advantage that the hydraulic master apparatus can be easily mounted in the handlebar tube by placing the insert with the master cylinder in the handlebar tube, in which an opening corresponding to the engagement opening is provided. The brake lever can then be mounted externally on the handlebar tube or on suitable fastening members of the handlebar tube, for example, in accordance with one of the above-mentioned variants, wherein the force transmission part engages or is disposed in the insert through the engagement opening such that force transmission to the piston of the master cylinder is possible.

According to a configuration, the force transmission part can bean extension of the lever and/or an optional pressure piece.

According to a configuration, a free travel adjustment device can be provided. The free travel adjustment device can be formed and disposed such that it adjusts the angle between the lever and the support to move the piston in the insert. Alternatively or additionally, the free travel adjustment device can be formed and disposed such that it moves the piston in the insert by a mechanical remote control device. The remote control device can comprise a connecting device, for example, a rod, and an adjustment device, for example, a rotation device, disposed on the handlebar end of the insert. The adjustment device can be connected here to the piston by a rod system. The rod system can be disposed in a thread in the piston that can be locked against rotation in the insert. By tuning the adjustment device, the piston can be moved axially in the insert on the external thread of the rod or rod system, so that the free travel is adjusted. The adjustment device can have an engagement for easy adjustment. A friction element can be provided to prevent independent adjustment.

According to a configuration, a compensating chamber can be provided in the insert.

According to a configuration, the lever can be disposed along the axial extension of the handlebar tube or the insert between a compensating chamber disposed in the insert and the master cylinder.

According to a configuration, a stop device can be provided with which the end position of the piston can be defined.

In the case of the configurations with compensating chamber, the connection between the pressure chamber of the master cylinder and the compensating chamber can be made through a or the central valve. In this case, the force transmission part can be fork-shaped and/or provided with two parallel extensions between which the connection between the pressure chamber and the compensating chamber is disposed.

According to a configuration, these configurations of the hydraulic master apparatus can be made in accordance with one or more of the above mentioned features of the other configurations.

According to a configuration, a hydraulic brake or hydraulic clutch or hydraulic bicycle brake is also provided, the hydraulic brake or hydraulic clutch or hydraulic bicycle brake having one or more of the above mentioned hydraulic master apparatuses.

According to a configuration, the hydraulic bicycle brake can be a disk brake or a rim brake.

With the foregoing and other objects in view, there is provided, a hydraulic master apparatus for a hydraulic brake or clutch of handlebar-guided vehicles having a handlebar tube comprises a support shaped to connect to the handlebar tube, a lever pivotally mounted in the support, and a hydraulic cylinder shaped to be disposed in the handlebar tube and comprising a movable piston having disposed therein a central valve.

With the objects in view, there is also provided a hydraulic master apparatus for a hydraulic brake or clutch of handlebar-guided vehicles having a handlebar tube comprises a support shaped to connect to the handlebar tube, a lever pivotally mounted in the support, a hydraulic master cylinder shaped to be disposed in the handlebar tube and comprising a movable piston having disposed therein a central valve, and a grip width adjusting apparatus configured to adjust a distance between the support and the hydraulic master cylinder and thereby adjust a grip width.

With the objects in view, there is also provided a hydraulic master apparatus for a hydraulic brake or clutch of handlebar-guided vehicles having a handlebar tube comprises a support shaped to connect to the handlebar tube, a lever pivotally mounted in the support, a hydraulic cylinder shaped to be disposed in the handlebar tube, and a compensating chamber shaped to be disposed in the handlebar tube.

In accordance with another feature, the hydraulic cylinder comprises a pressure chamber in which the piston is movably disposed, the lever comprises a force transmission member, and which further comprises an insert shaped to insert into the handlebar tube, comprising an end at which the hydraulic cylinder is disposed and defining an engagement opening shaped to engage the force transmission member.

In accordance with a further feature, there is provided a pulling device that, responsive to actuation of the hydraulic master apparatus, exerts a pulling force on the piston of the hydraulic cylinder.

In accordance with an added feature, the pulling device comprises a pull rod.

In accordance with an additional feature, the pull rod has a bent section.

In accordance with yet another feature, there is provided a shifting device, the pulling device comprising a safety device configured to secure the pulling device in the shifting device and supporting the bent section of the pull rod to prevent deformation of the bent section.

In accordance with yet a further feature, the pulling device defines a hydraulic channel and which further comprises a hydraulic slave apparatus, and a hydraulic line connected to the hydraulic slave apparatus and connecting the hydraulic channel to the hydraulic cylinder.

In accordance with yet an added feature, there is provided a shifting device shaped to be disposed in the handlebar tube movably in a longitudinal direction of the handlebar tube.

In accordance with yet an additional feature, there is provided a pulling device that, responsive to actuation of the hydraulic master apparatus, exerts a pulling force on the piston of the hydraulic cylinder, the shifting device being connected to the pulling device.

In accordance with again another feature, the lever comprises two anus are pivotally mounted thereon and is hinged to two axes of rotation engaged by the two arms.

In accordance with again a further feature, there is provided a pressure piece and one of the two arms being part of the pressure piece.

In accordance with again an added feature, the hydraulic cylinder is a master cylinder and which further comprises a grip width adjusting apparatus configured to adjust a distance between the support and the master cylinder and thereby adjust a grip width.

In accordance with again an additional feature, the support is configured to be movably disposed on the handlebar tube.

In accordance with still another feature, the hydraulic cylinder is a master cylinder configured to be movably disposed in the handlebar tube and which further comprises a pulling device having an adjustable length and, responsive to actuation of the hydraulic master apparatus, exerting a pulling force on the piston of the hydraulic cylinder.

In accordance with still a further feature, there is provided a pulling device configured to exert a pulling force on the piston upon actuation of the hydraulic cylinder and a shifting device shaped to be disposed in the handlebar tube and to be movable in a longitudinal direction of the handlebar tube, the shifting device being connected to the pulling device.

In accordance with still an added feature, the pulling device has an adjustable length.

In accordance with still an additional feature, there is provided a compensating chamber shaped to be disposed in the handlebar tube.

In accordance with a concomitant feature, the hydraulic cylinder is a master cylinder disposed between the support and the compensating chamber.

The systems and devices are described below by the exemplary embodiments shown in the drawings. In this case, the following reference signs are used:

1 master apparatus
10 lever
11 arm section
20 handlebar tube
21 opening
22 opening
23 opening
30 handle tube
32 screw
33 screw
40 support
41 axis of rotation
41A axis of rotation
41B axis of rotation
42 clamp
43 adapter for switch unit
44 grip width adjusting device
45 tab
46 screw
47 support
50 pressure piece
50A pressure piece section
50B pressure piece
51A arm
51B arm section
53 axis of rotation
54 axis of rotation
55 projection
56 extension
57 extension
60 shifting device
61 passage
62 passage
63 web
64 groove
65 support
66 contour
67 clamping device 671 contour
70 pulling device
71 head
71A adjusting device
71B connecting device
711 locking device
72 main body
73 screw connection
73A piston
73B piston
73C piston
731 connecting piece
74 screw
75 hydraulic channel
76 opening
80 master cylinder
81 return spring
811 bushing
812 disk
82 pressure chamber
83 primary seal
84 seal
85 pressure line
86 extension
90 compensating chamber
91 bellows
911 bead
92 cover
93 passage
94 vent screw
95 cone
96 overflow channel
97 seal
98 vent hole
99 adjusting device
100 hydraulic line
101 clamping screw
102 connecting piece
110 frame
111 flattening
120 compensating housing
121 flattening
122 snap device
123 snap device
124 front wall
125 front wall
126 web
130 sensor device
131 magnet
132 Hall sensor
140 indicator
150 compensating section
151 web
152 projection
160 indicator section
161 seal (e.g., O-ring)
162 passage
163 front wall
164 marking
165 marking
166 area
170 sensor device
171 magnet
172 sensor (e.g., Hall sensor, reed contact, etc.)
173 support (for signal generator, e.g., magnet, etc.)
200 eccentric device
201 rotation device
202 link support
203 lever support
204 fastening device
300 rotary handle device (e.g., E-gas actuation, gas actuation, clutch actuation)
400 protection apparatus (e.g., hand guard apparatus or hand guard)
410 external area
420 internal area
430 clamping area
500 switching device
501 sensor (e.g., Hall sensor, reed contact, etc.)
502 support (e.g., cable tie, etc.)
503 support (for signal generator, e.g., magnet, etc.)
504 recess
600 vent valve
601 support
700 insert
710 master cylinder
720 engagement opening
730 maintenance opening
740 free travel adjusting device
750 central valve
751 valve spring
752 seal
760 seal
770 line
800 free travel adjusting device (or mechanical remote control device)
810 adjusting device
820 connecting device
830 inhibiting device
900 stop device (for end position of the piston)
910 extension Although the systems, apparatuses, and methods are illustrated and described herein as embodied in a hydraulic master apparatus for a hydraulic brake or clutch of a handlebar-guided vehicle and a hydraulic brake of a handlebar-guided vehicle, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 3 is a fragmentary, exterior view of a handlebar tube for the hydraulic master apparatus of FIG. 1;

FIG. 4 is a fragmentary, side view of the handlebar tube of FIG. 3;

FIG. 5 is a fragmentary, side view of a shifting device for the hydraulic master apparatus of FIG. 1;

FIG. 6 is a top view of the shifting device of FIG. 5;

FIG. 7 is a view of the shifting device of FIG. 5 seen from the end of the handlebar tube towards the center of the handlebar tube in a handlebar tube;

FIG. 8 is a side view of a pressure piece for the hydraulic master apparatus of FIG. 1;

FIG. 9 is a view of the pressure piece of FIG. 8 seen from the center of the handlebar;

FIG. 20 is a view of the hydraulic master apparatus of FIG. 10 or 1 seen from the handlebar end:

FIG. 21 is a fragmentary, enlarged partial view of the sectional view of FIG. 12;

FIG. 22 is a fragmentary, cross-sectional view in accordance with FIG. 1 of a hydraulic master apparatus according to an alternative exemplary embodiment;

FIG. 30 is a side view of a frame for the hydraulic master apparatus of FIG. 25;

FIG. 31 is a view of the frame of FIG. 30 seen from the handlebar end;

FIG. 32 is a side view of a compensating housing for the hydraulic master apparatus of FIG. 25;

FIG. 33 is a view of the compensating housing of FIG. 32 seen from the handlebar end;

FIG. 34 is a fragmentary, enlarged partial view of the view of FIG. 33;

DETAILED DESCRIPTION OF THE EMBODIMENTS

Figure 1:
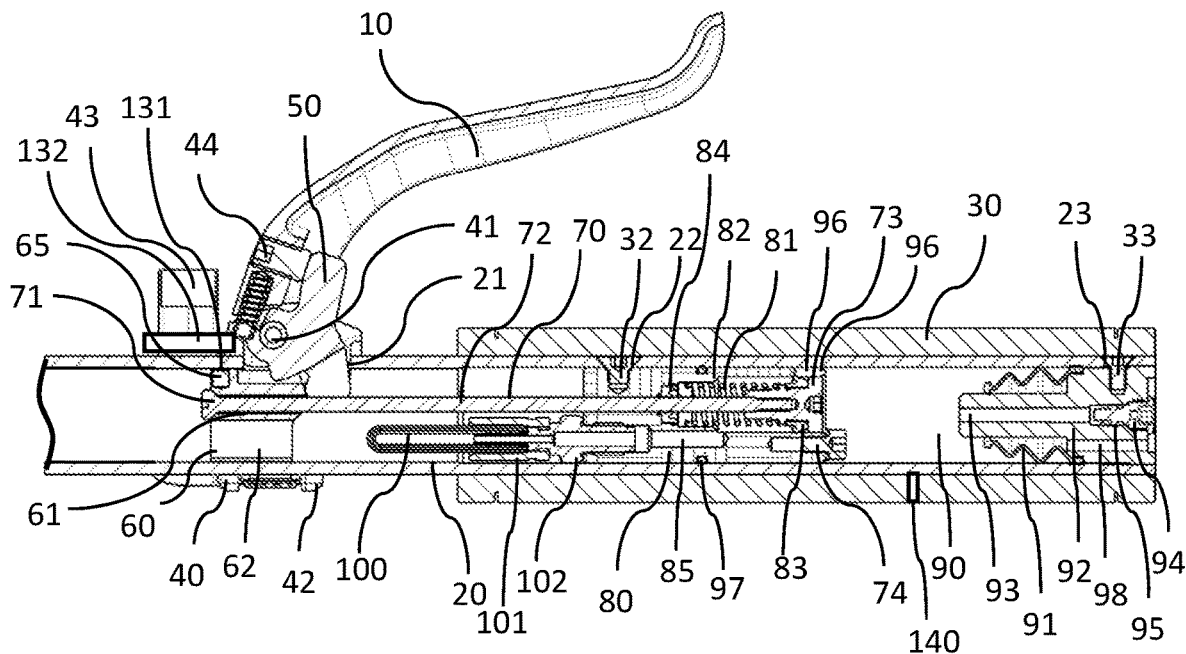
FIG. 1 is a fragmentary, cross-sectional view through a first exemplary configuration of a hydraulic master apparatus.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are cared forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Described now are exemplary embodiments. Referring now to the figures of the drawings in detail and first, particularly to FIGS. 1 to 9, there is shown a first exemplary embodiment of a hydraulic master apparatus. The hydraulic master apparatus 1 is a master apparatus of a hydraulic bicycle brake, for example, a hydraulic brake or a hydraulic disk brake or hydraulic rim brake. Only the hydraulic master apparatus and the hydraulic line 100 are shown, which leads to the hydraulic slave apparatus (not shown) and the configuration of which is known to a person skilled in the art.

The hydraulic master apparatus 1 comprises a hydraulic cylinder 80, which is integrated in the handlebar tube 20 of the handlebar-guided vehicle.

The handlebar tube 20 comprises an opening 21, through which a pressure piece 50 extends, which is pivotally disposed on a support 40 attached to the handlebar tube 20.

The hydraulic master apparatus 1 comprises a lever 10, which is pivotally disposed on the support 40. The axis of rotation 41 for the pressure piece 50 and the lever 10 is identical in the illustrated embodiment.

In addition, a grip width adjusting device 44 is provided with which the initial position of the lever 10 can be changed in the rest position. The support 40 is attached to the handlebar tube 20 by a clamp 42. An optional adapter 43 is provided on the clamp 42 to be able to accommodate a switch device (not shown).

A shifting device 60 is provided in the handlebar tube 20 and is disposed in the handlebar tube 20 such that it can be moved along the longitudinal direction of the handlebar tube 20. The shifting device 60 can be configured as a gate. The shifting device 60 comprises a passage 61, which accommodates a pulling device 70, and a passage 62, through which the hydraulic line 100 runs.

FIGS. 5 to 7 show the shifting device 60, and FIGS. 8 to 9 show the pressure piece 50. The embodiment described below secures the shifting device 60 in the handlebar tube 20 against rotation. An anti-turn system can be important because the hydraulic line 100 could exert a torque on the shifting device 60 due to twisting during the assembly, especially if the hydraulic line runs through the passage 62.

In order to prevent rotation, the shifting device 60 has a web 63 that is accommodated by two extensions 57 of the pressure piece 50. This ensures that the shifting device 60 cannot rotate in the circumferential direction of the handlebar tube 20 in relation to the pressure piece 50.

The shifting device 60 comprises a groove 64 into which the pressure piece 50 can immerse when the hydraulic unit is actuated.

When the lever 10 is actuated, the pressure piece 50 is rotated about the axis of rotation 41 and moves the shifting device 60 towards the center of the vehicle, i.e., to the left in FIG. 1. In the illustrated embodiment, the pulling device 70 is configured as a pull rod. The pulling device 70 has a head 71 that is engaged by the shifting device 60 that moves the pulling device 70 to the left when the lever 10 is actuated. The pulling device 70 has a main body 72 and a screw connection 73. The screw connection 73 acts as a piston of the master apparatus 1 and is disposed in the hydraulic cylinder 80. It is secured by a screw 74. When the lever 10 is actuated, the screw 74 is pressed to the left against the force of a return spring 81. The return spring 81 is disposed in the pressure chamber 82 of the master cylinder 80.

A compensating container 90 or reservoir for hydraulic fluid is provided to the right of the master cylinder 80. The compensating container 90 is confined to the outside by the handle tube 20. Towards the handlebar end, the compensating container is limited by a cover 92 with a bellows 91. The bellows 91 separates the hydraulic fluid in the compensating container 90 from a gas or air volume to compensate for hydraulic fluid subsequently flowing into the pressure chamber. In the embodiments using an air volume inside the bellows, this air volume is connected to the outside air through a vent hole 98. An opening 93 with a vent screw 94 is provided in the cover 92. A cone 95 is provided in opening 93 so that a commercially available syringe can be inserted to introduce hydraulic fluid into or withdraw hydraulic fluid from the compensating container. The cover 92 is secured against rotation by a screw 33, which is disposed in an opening 23 in the handle tube 20 and is screwed into the screw connection 73.

A handle tube 30 is provided outside the handlebar tube 20 and can be made of an elastic rubber material, for example.

The cylinder 80 is secured in the handlebar tube 20 against slipping and rotation by a screw 32, which is disposed in an opening 22 in the handle tube and is screwed into the master cylinder 80.

The compensating container 90 is connected to the pressure chamber 82 through an overflow channel 96. A primary seal 83 is provided on the screw connection 73 and, when the brake is actuated, passes over the overflow channel and separates the pressure chamber 82 from the compensating container 90 so that pressure can build up in the pressure chamber 82.

The compensating container 90 is sealed against the interior of the handlebar tube 20 by a seal 97, which is disposed between the handlebar tube 20 and the master cylinder 80.

A further seal 84 is provided on the pulling device 70 and seals the pressure chamber 82 against the main body 72 of the pulling device 70.

When the hydraulic master apparatus 1 is actuated, the lever 10 is pressed downwards, causing the pressure piece 50 to move about the axis of rotation 41 against the shifting device 60 and pushing the shifting device 60 to the left. As a result, the pulling device 70 moves to the left and pulls the piston, i.e., in the exemplary embodiment the screw connection 73, into the hydraulic cylinder 80 (in FIG. 1 to the left). This builds up a pressure in the pressure chamber 82 and hydraulic fluid is pressed into the hydraulic line 100, which is connected to the hydraulic slave (not shown).

The web of the shifting device 60 has a contour 66, the shape of which can be used to set a progressive and/or degressive course of the transmission ratio as required. As shown in FIG. 5, the contour 66 of the web 63 is relatively far to the right in the upper part, going a little further to the right. Then, the web 63 tapers so that the contour runs further to the left. As a result, the transmission ratio does not decrease as much with increasing actuation as with a straight contour. This is advantageous for embodiments that have a very low pivot point that requires a high transmission ratio, which is undesirable at the beginning of the actuation, because the clearance is to be crossed almost without force and quickly, i.e., with a low transmission ratio. A high transmission ratio is only advantageous when pressure is built up. The contour can at least partially compensate for the disadvantage of the low pivot point, so that the decrease is not as strong as with a straight contour.

The hydraulic master apparatus 1 has a sensor device 130 for the detection of the position and/or actuation of the hydraulic master apparatus 1. The signal of the sensor apparatus 130 can, for example, be used to indicate the actuation of the hydraulic master apparatus 1 by causing a brake light to illuminate by a suitable control device known to a person skilled in the art. Alternatively or additionally, the detection of the position of the hydraulic master apparatus 1 can be used to activate a recuperation apparatus that supports braking and at the same time feeds energy into a reservoir that can later be used to drive the vehicle. The recuperation apparatus can, for example, be switched on as soon as the connection between pressure chamber 80 and compensating chamber 90 has been interrupted. This function can be specifically used by the driver, for example, to effect a pure engine brake through recuperation when driving downhill, before the clearance between brake lining and brake disk or rim has been completely crossed.

In the embodiment of FIGS. 1 to 9, the sensor device includes a position sensor. A magnet 131 is disposed in a support 65 of the shifting device 60. A Hall sensor 132 is provided on the handlebar tube to detect the distance travelled by the shifting device 60 within the handlebar tube 20. Depending on the geometry of the master cylinder, the shifting device 60 is first moved from the rest position about 2-3 mm into the handlebar tube 20 until the connection between the pressure chamber 82 and the compensating chamber 90 is interrupted. As a result of the further actuation, the shifting device 60 moves another 5-6 mm into the handlebar tube 20, the clearance between the brake linings and the brake disk or rim being crossed. In this area of partial actuation. i.e., after the separation between the pressure chamber 82 and the compensating chamber 90, but before the clearance between the brake linings and the brake disk or rim has been crossed. i.e., before the braking effect begins, it can be advantageous to already achieve a slight braking effect if the vehicle has an electric drive. The signal from the sensor device can then be used to activate the recuperation, which includes a braking action and can simultaneously return the braking energy to the system to recharge the energy storage. Even in the case of full actuation with a braking effect by the hydraulic apparatus, it can be advantageous or desirable to support the brake by switching on the recuperation.

In addition or as an alternative to the sensor device 130 for detecting the position and/or actuation of the hydraulic master apparatus 100, it is possible to use the detection of the pressure in the pressure chamber 82. For example, the recuperation apparatus can be activated as soon as the pressure in the pressure chamber 82 exceeds a certain threshold value. Exceeding the threshold value can indicate that a braking effect is achieved by the hydraulic apparatus 1. This value can also be used, for example, to switch on a brake light or to switch it off again if the value falls below a slightly lower threshold. The recuperation can also be deactivated if the value falls below a lower threshold, which is slightly lower than the threshold used for the activation. Alternatively or additionally, the deactivation can also be effected when the rest position is reached.

An indicator 140 can be provided in the handle tube 30 to indicate the filling level in the compensating chamber 90. The indicator 140 can be connected to the compensating chamber 90 through a suitable line or a plurality of suitable lines and be configured as a transparent or translucent line to indicate the filling level. Alternatively or additionally, a suitable sensor can detect the filling level in the compensating chamber and respond to the indicator accordingly. In this case, the display can include, for example, a series of visual indications, such as LED lamps. Other suitable indicators known to a person skilled in the art are conceivable.

Figure 10:
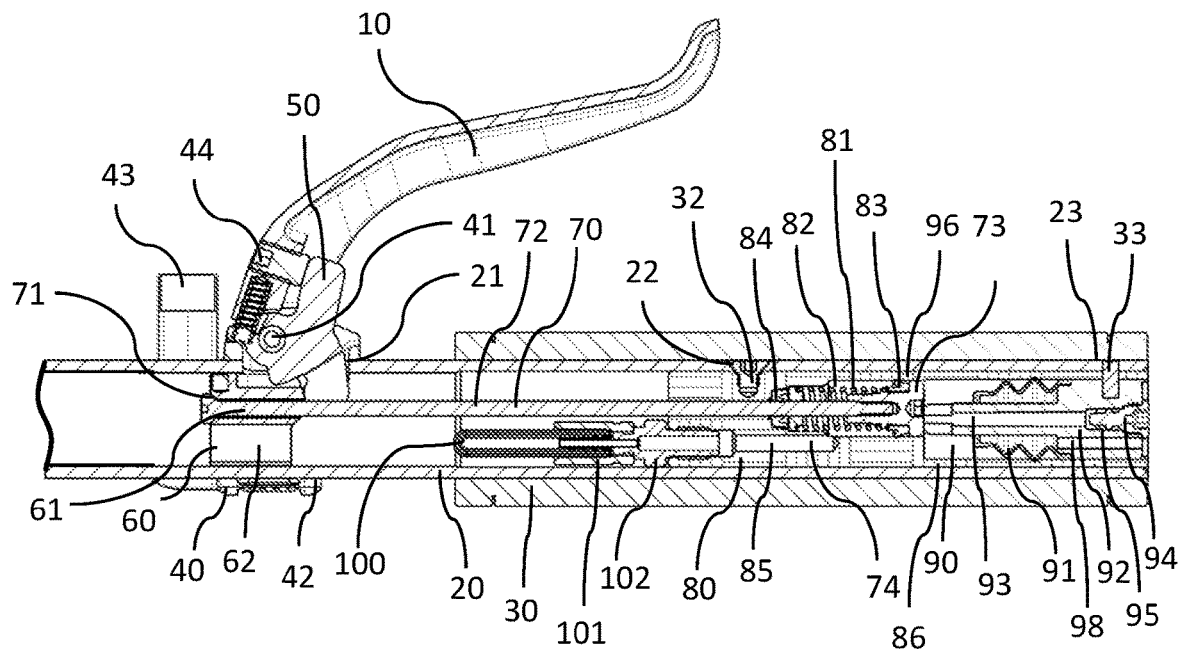
FIG. 10 is a fragmentary, cross-sectional view in accordance with FIG. 1 of a hydraulic master apparatus according to an alternative exemplary embodiment.

FIG. 10 and FIG. 20 show an alternative embodiment of the invention that substantially corresponds to the embodiment shown in FIGS. 1 to 9. Equal reference signs denote equal or corresponding components or features. Reference is made to the description of the other embodiments. In the following, the focus will be laid on the differences. This applies to all of the following exemplary embodiments, also with respect to all other exemplary embodiments of this disclosure.

The master cylinder 80 comprises an extension 86, which extends to the end of the handlebar tube 20 and in which the compensating container 90 is accommodated. The extension 86 has an outer diameter that substantially corresponds to the inner diameter of the handlebar tube 20. Because the compensating chamber is accommodated in the extension 86, the seal 97 of the embodiment shown in FIGS. 1 to 3 can be omitted. The advantage of this embodiment is that it can be installed in a handlebar tube as a unit that includes the compensating chamber 90.

Figure 11:
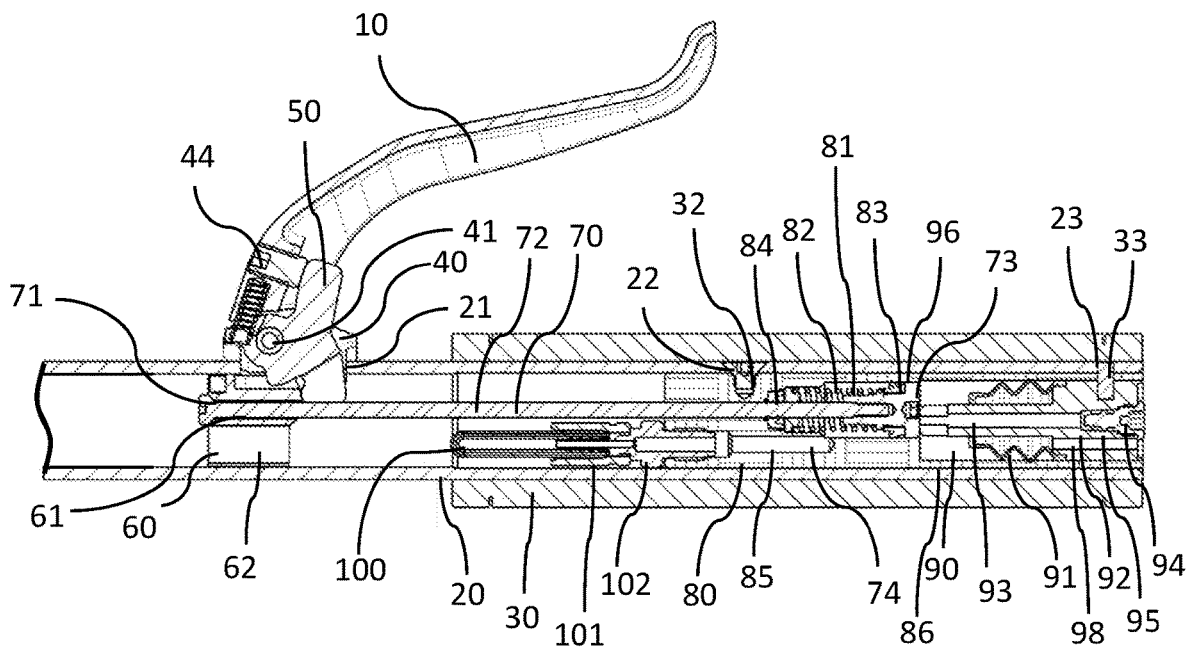
FIG. 11 is a fragmentary, cross-sectional view in accordance with FIG. 1 of a hydraulic master apparatus according to an alternative exemplary embodiment.

FIG. 11 shows an alternative embodiment of the invention that substantially corresponds to the embodiments shown in FIGS. 1 to 9 or 10 and 20. Equal reference signs denote equal or corresponding components or features. Reference is made to the description of the other exemplary embodiments. In the following, the focus will be laid on the differences.

The support 40 is integrated in the handlebar tube 20. The clamp 42 and the adapter are, therefore, omitted. The switch unit can be mounted on the handlebar tube 20 in a manner known to a person skilled in the art. Because, according to a configuration, the hydraulic master apparatus 1 is almost completely incorporated in the handlebar tube 20, except for the lever 10 and the associated components, there is sufficient space for mounting the switch unit or other components.

Figure 12:
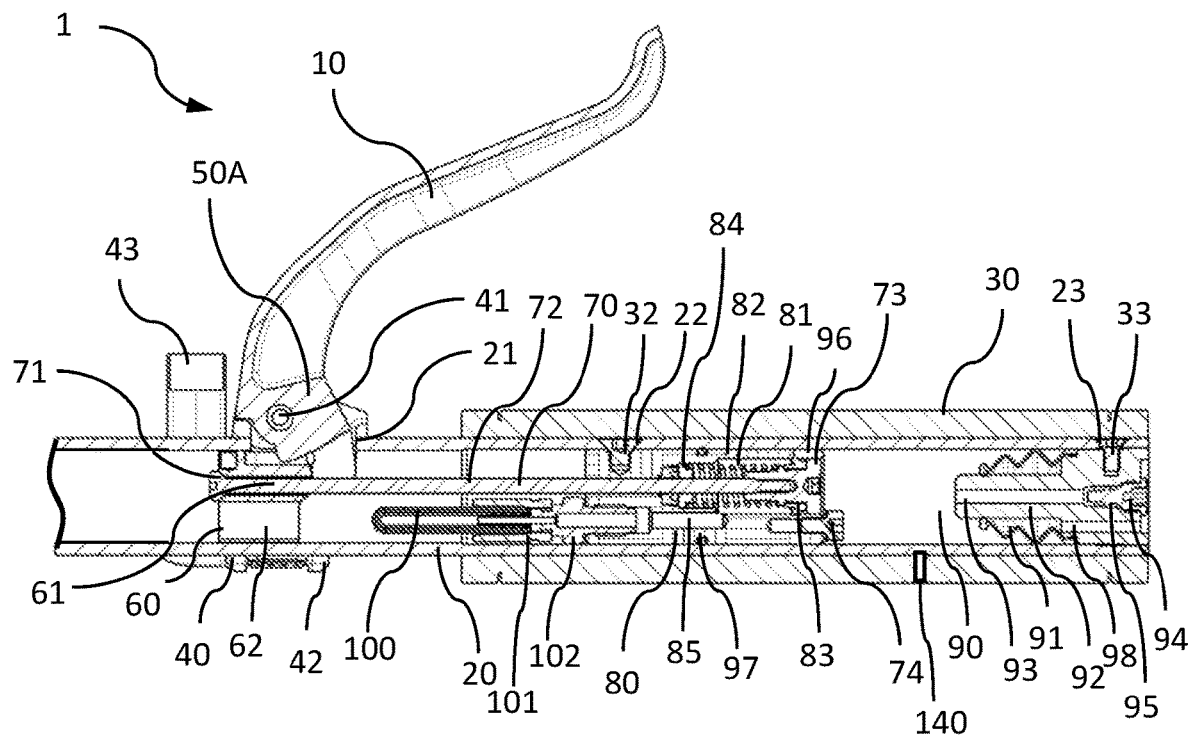
FIG. 12 is a fragmentary, cross-sectional view according to FIG. 1 of a hydraulic master apparatus according to an alternative exemplary embodiment.
Figure 13:
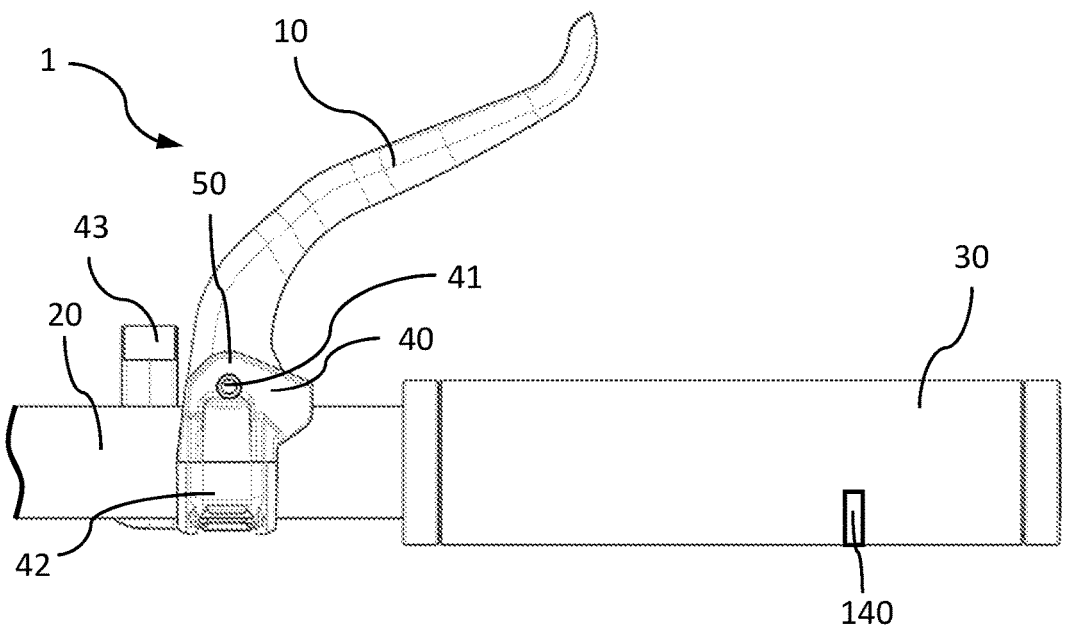
FIG. 13 is a side view of the hydraulic master apparatus of FIG. 12.

FIG. 12 and FIG. 13 show an alternative embodiment that substantially corresponds to the embodiment shown in FIGS. 1 to 9 or to the other embodiments. Equal reference signs denote equal or corresponding components or features. Reference is made to the description of the other embodiments. In the following, the focus will be laid on the differences.

In this embodiment, the lever 10 is made in one piece. The pressure piece 50 of the other embodiments is integrated in the lever 10. The lever 10 acts through its pressure piece section 50A corresponding to the pressure piece on the shifting device 60. The grip width adjusting device 44 is not available in this embodiment. The grip width can, for example, be changed by using different levers or in other ways that are known to a person skilled in the art.

According to this embodiment, like the corresponding other embodiments, the grip width can be adjusted, e.g., by adjusting or shifting the support 40 with the lever 10 relative to the shifting device 60, so that the grip width is adjusted due to the engagement between the pressure piece section 50A of the lever 10 and the shifting device 60. For this purpose, the support 40 can be loosened by loosening the clamp 42, then moved along the handlebar tube 20 to the desired position and finally fixed in the new position by tightening the clamp 42.

The pressure piece section 50A has two extensions 57 according to the embodiment of FIGS. 1 to 9, which receive the web 63 to prevent rotation of the shifting device 60.

Figure 14:
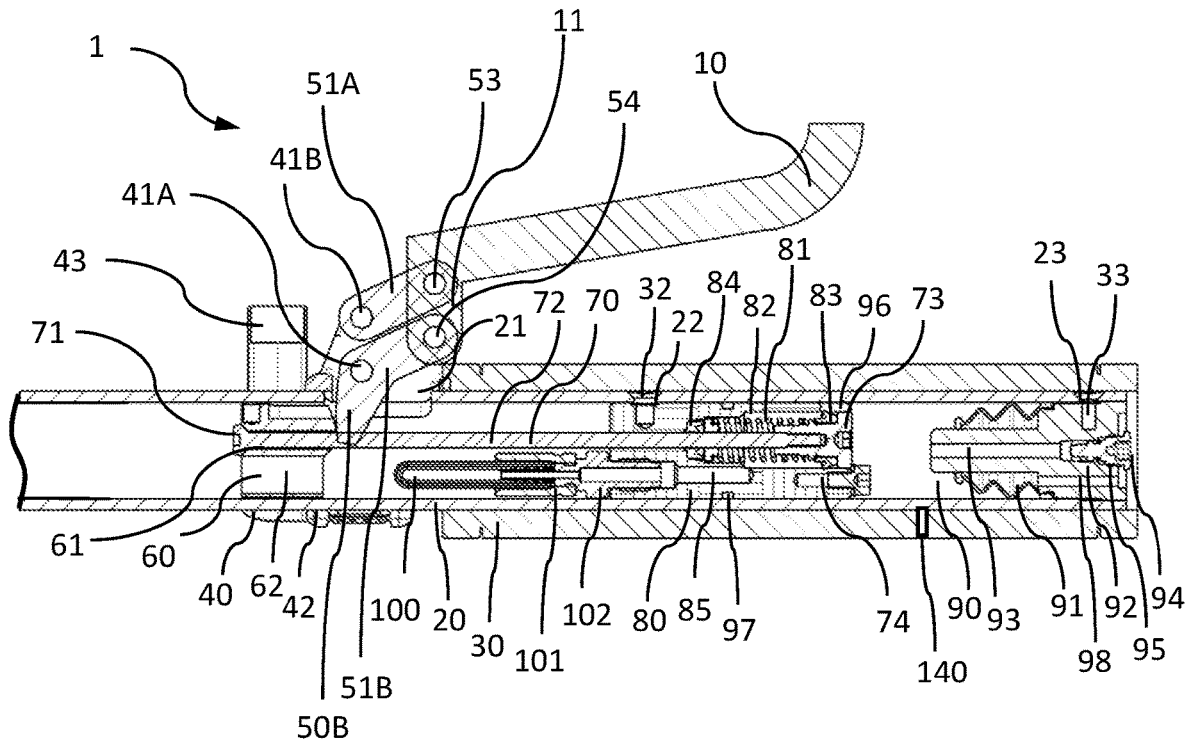
FIG. 14 is a fragmentary, cross-sectional view according to FIG. 1 of a hydraulic master apparatus according to an alternative exemplary embodiment.
Figure 15:
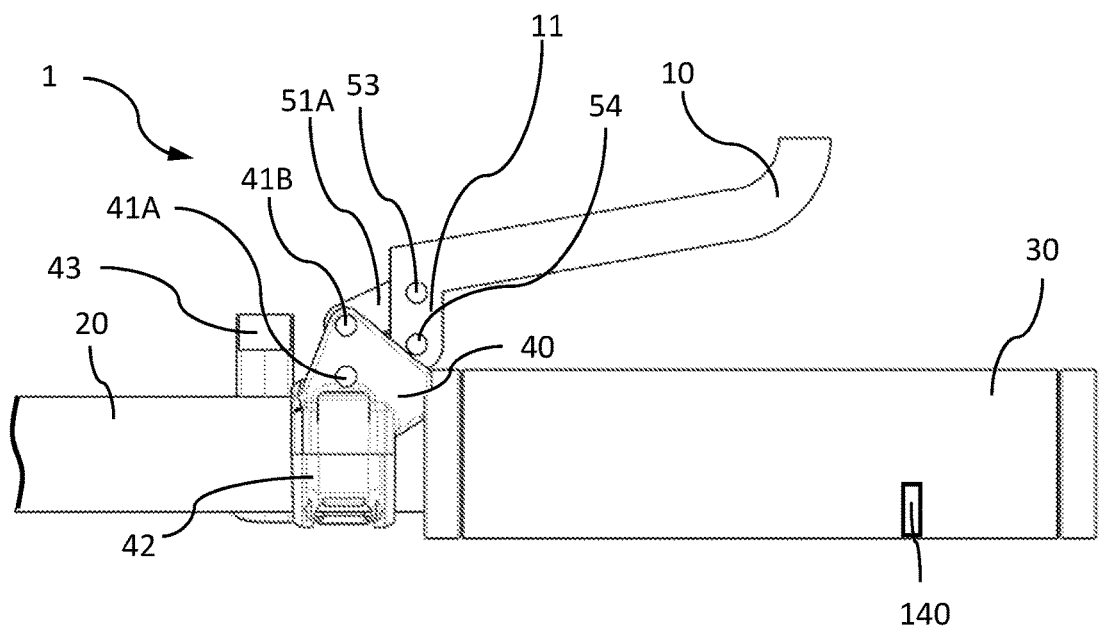
FIG. 15 is a fragmentary, side view of the hydraulic master apparatus of FIG. 14.

FIGS. 14 and 15 show an alternative embodiment that substantially corresponds to the embodiment shown in FIGS. 1 to 9 or to the other embodiments. Equal reference signs denote equal or corresponding components or features. Reference is made to the description of the other exemplary embodiments. In the following, the focus will be laid on the differences.

The lever 10 and the pressure piece 50B are hinged through two pivot points 41A and 41B and an arm 51A to the support 40. The lever has an arm section 11 and the pressure piece 50B has an arm section 51B. The arm 51 is hinged to the support 40 through the axis of rotation 41B and connected to the lever 10 through the axis of rotation 53. The pressure piece 50B is hinged to the support through the axis of rotation 41A and connected to the arm section 11 of the lever through the axis of rotation 54.

A parallelogram is defined by the four axes of rotation 41A, 41B. 53 and 54, the sides of which are formed by the support 40, the arm 51A, the arm section 51B, and the arm section 11.

The support 40 forms a fixed side. When the lever is actuated, the arm 51A and the arm section 51B rotate downwards and the arm section 11 of the lever moves downwards. The lever 10 thus moves substantially parallel to the handlebar tube 20 and at the same time experiences a slight movement in the longitudinal direction of the handle tube, which depends on the inclination of the arm 51A and the arm section 51B. At the same time, the pressure piece 50B is rotated about the axis of rotation 41A and actuates the hydraulic fluid as described above by shifting the shifting device into the handlebar tube (in FIG. 8 to the left).

This configuration allows a pleasant and easy handling of the hydraulic master apparatus.

Figure 16:
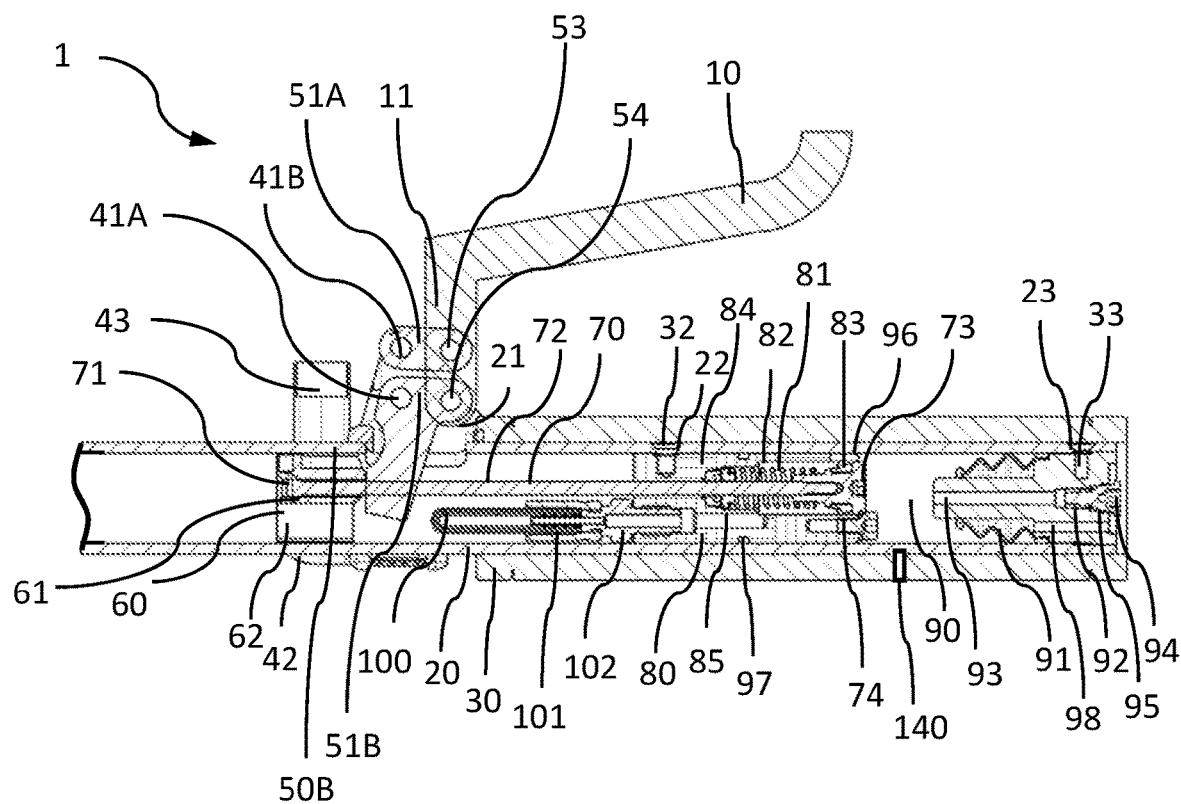
FIG. 16 is a fragmentary, cross-sectional view according to FIG. 1 of a hydraulic master apparatus according to an alternative exemplary embodiment.
Figure 17:
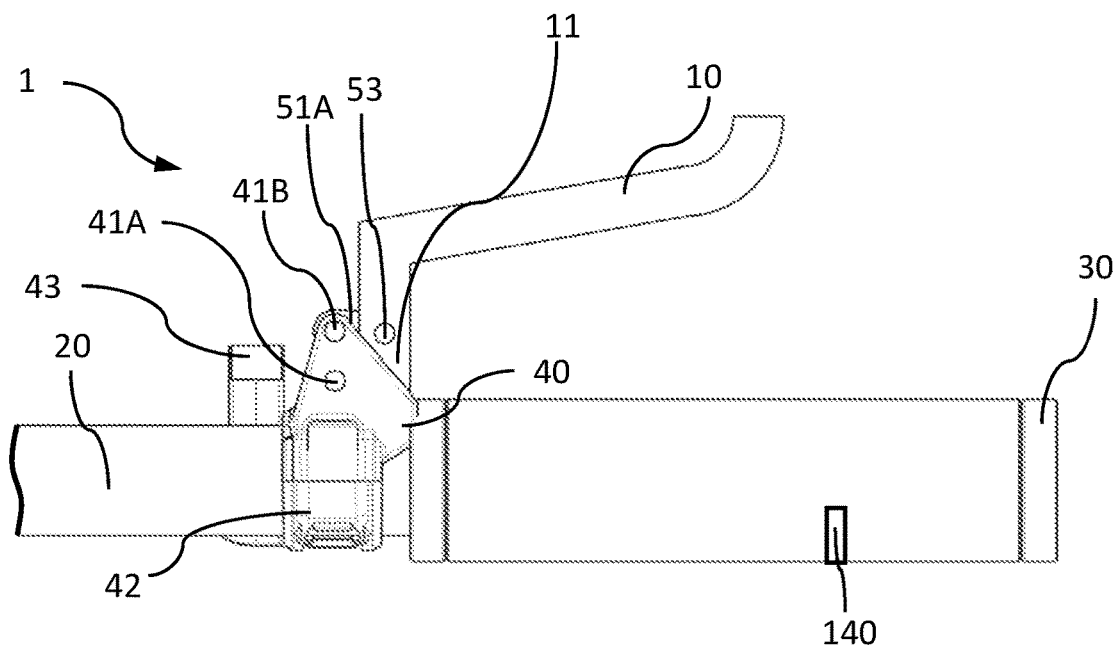
FIG. 17 is a fragmentary, side view of the hydraulic master apparatus of FIG. 16.

FIGS. 16 and 17 show an alternative embodiment that substantially corresponds to the embodiment shown in FIGS. 14 and 15 or to the other embodiments. Equal reference signs denote equal or corresponding components or features. Reference is made to the description of the other exemplary embodiments. In the following, the focus will be laid on the differences.

In this embodiment, hinging the lever 10 in the rest position is selected such that the arm 51A and the arm section 51B of the pressure piece 50B run almost parallel to the grip tube 20. This means that, from the start, the lever 10 is only moved in the direction of the center of the vehicle and not outwards. This has the advantage that, when the hydraulic master apparatus is actuated, the fingers that are not used (e.g., in the case of two-finger or one-finger actuation) cannot easily get between the lever and the handlebar tube.

Figure 2:
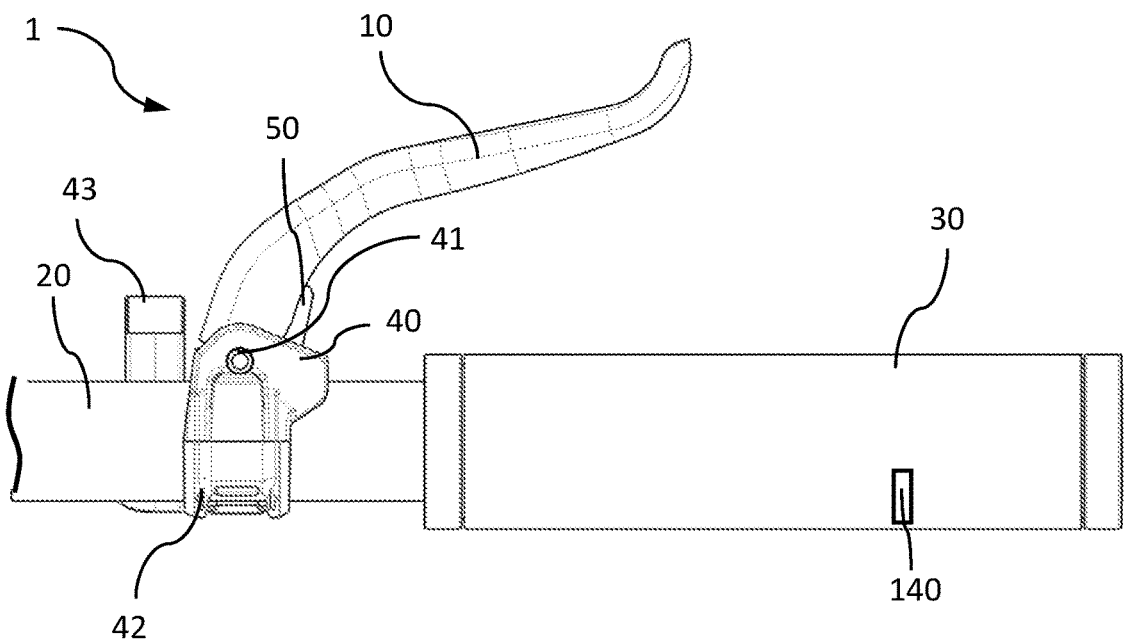
FIG. 2 is a fragmentary, side view of the hydraulic master apparatus of FIG. 1.

FIGS. 18 to 21 show an alternative embodiment that substantially corresponds to the embodiment shown in FIGS. 1 to 3 or to the other embodiments. Equal reference signs denote equal or corresponding components or features. Reference is made to the description of the other exemplary embodiments. In the following, the focus will be laid on the differences.

In this embodiment, the pulling device 70 is provided with a hydraulic channel 75, which runs from the pressure chamber 82 through the shifting device 60 to the connecting piece 102. Instead of a pull rod, a draw tube is provided, which is used as the hydraulic channel 75. The hydraulic channel 75 is connected to the pressure chamber 82 through an opening 76. This embodiment has the advantage that the passage 62 is not used for the hydraulic line and, therefore, there is space in the passage 62 for other lines, which are particularly desired in the case of e-bikes for other tasks.

In this embodiment, the support 40 is integrated in the handlebar tube 20. The handlebar tube is provided with two tabs 45, which accommodate an axis as the axis of rotation 41 for the lever 10.

The compensating chamber 90 has a compensating housing 120. The compensating chamber 90 is the space between the master cylinder 80 and the compensating housing 120 and the space in the compensating housing 120 as well as the corresponding connecting lines, such as the passage 93.

Figure 18:
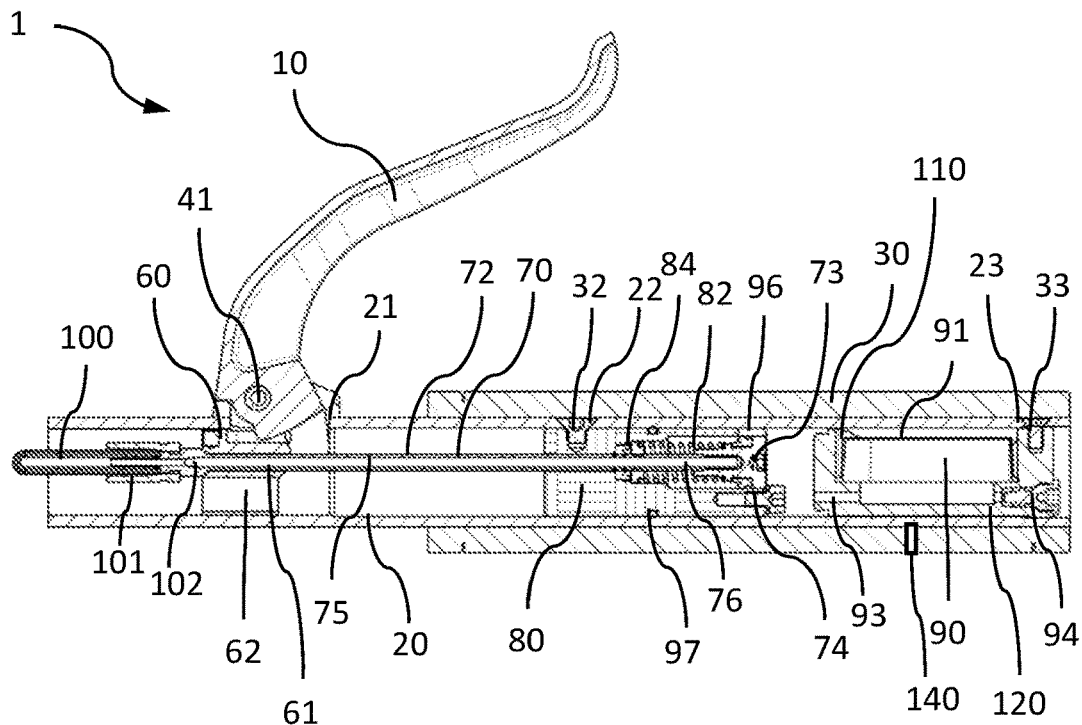
FIG. 18 is a fragmentary, cross-sectional view according to FIG. 1 of a hydraulic master apparatus according to an alternative exemplary embodiment.
Figure 19:
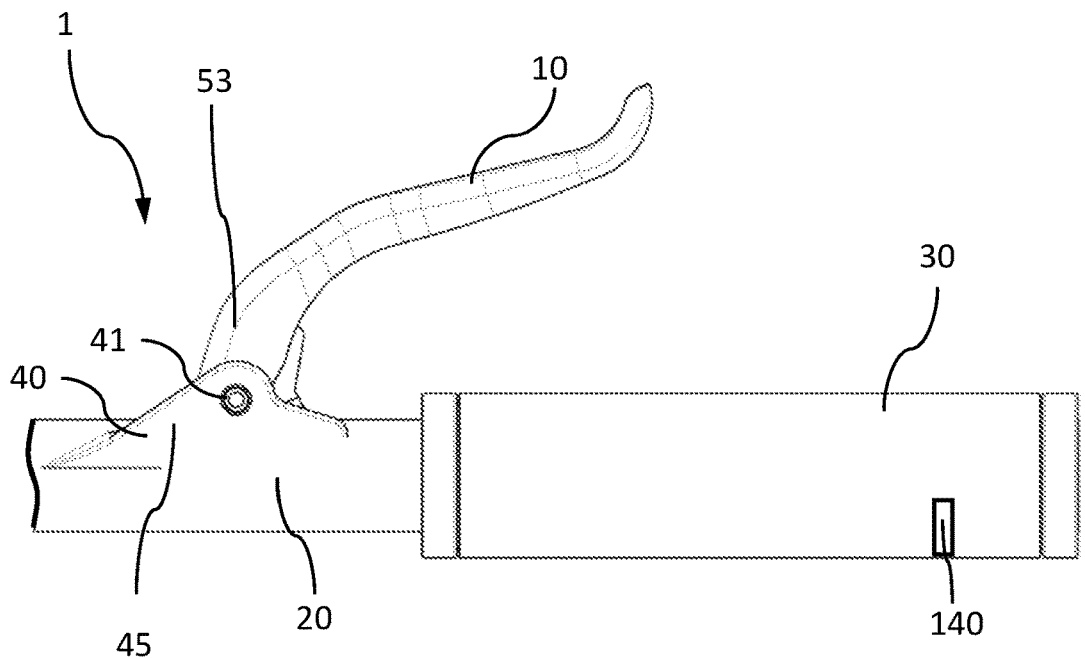
FIG. 19 is a fragmentary, side view of the hydraulic master apparatus of FIG. 18.

The compensating chamber 90 is not rotationally symmetrical here, but has the vent screw 94 and the passage 93 on the upper side. In this context, the upper side is the side of the handlebar tube that is on the top in the upright vehicle. In FIG. 18, this is the lower side because the lever is usually mounted at an angle to the bottom to allow a comfortable and natural posture during operation.

On the lower side (FIG. 18 above), related to the orientation during operation, the bellows 91 is provided, which is pressed with a frame 110 into the compensating housing 120 of the compensating container 90. The frame can be configured according to the fame shown in FIGS. 30 and 31.

This orientation of the compensating chamber with the vent screw 94 on the upper side has the advantage that the system can be vented easily and safely. However, a disadvantage for operational safety might be that the passage is accordingly disposed on the upper side because air or gas might possibly collect there. In order to avoid this disadvantage, passage 93 could be rotated in relation to vent screw 94, i.e., it could be disposed at a lower point of the compensating housing 120.

FIGS. 22 and 20 show an alternative embodiment that substantially corresponds to the embodiment shown in FIGS. 18 to 21 or to the other embodiments. Equal reference signs denote equal or corresponding components or features. Reference is made to the description of the other exemplary embodiments. In the following, the focus will be laid on the differences.

In this embodiment, the support 40 is attached to the handlebar tube with a clamp 42. This has the advantage that the grip width can be adjusted by adjusting the position of the support 40 relative to the shifting device 60.

Figure 23:
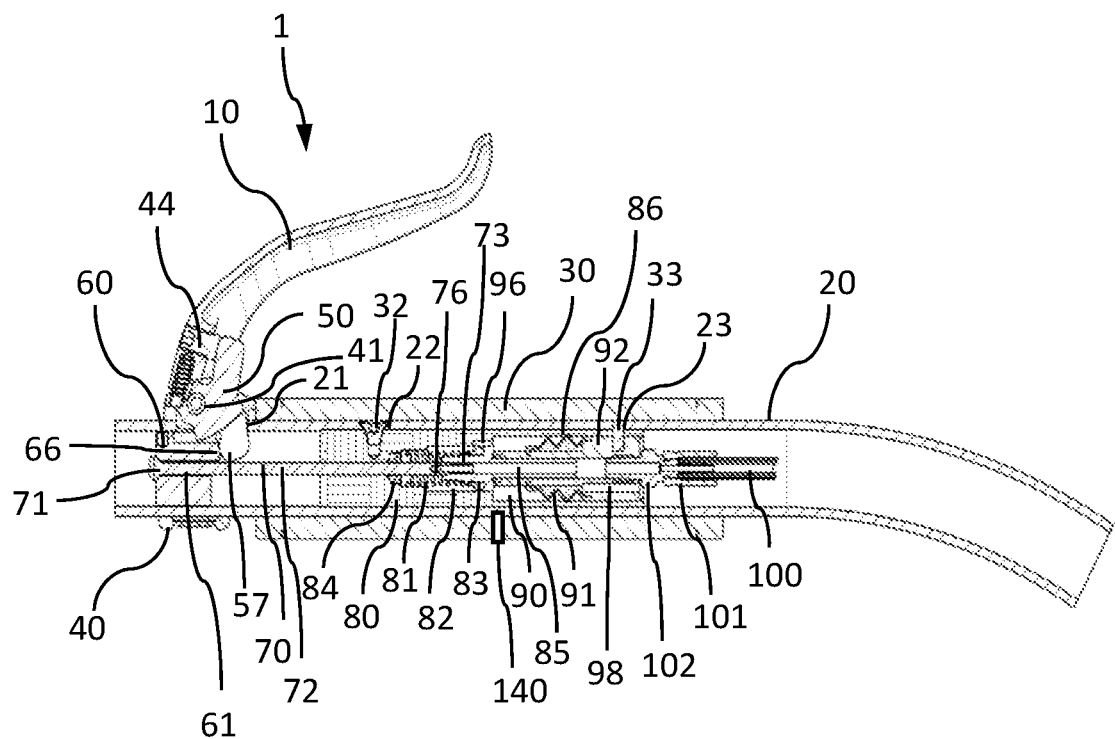
FIG. 23 is a fragmentary, cross-sectional view in accordance with FIG. 1 of a hydraulic master apparatus according to an alternative embodiment.
Figure 24:
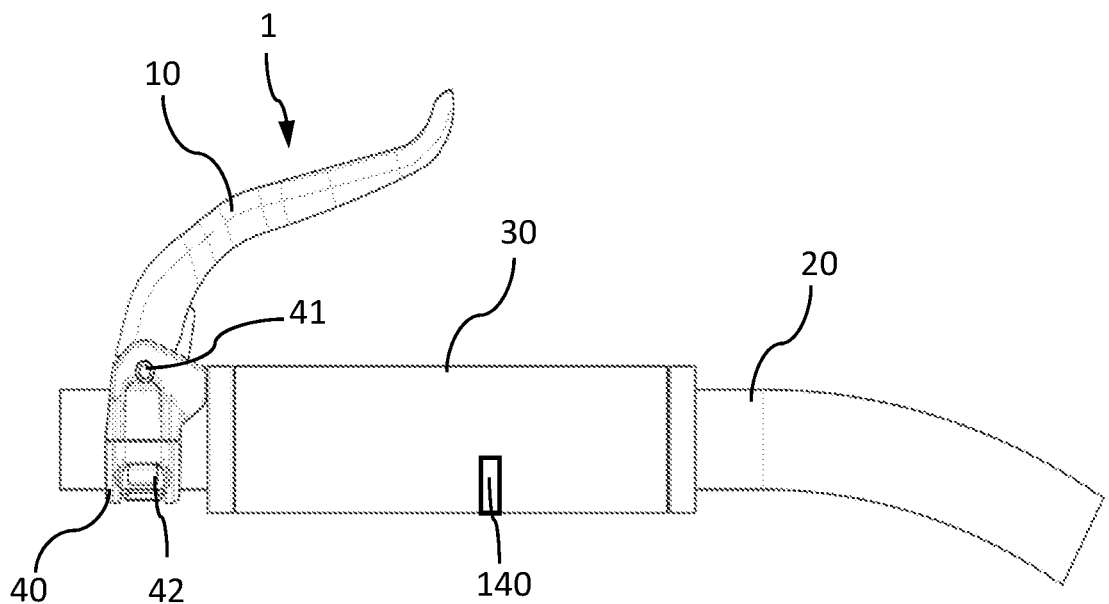
FIG. 24 is a fragmentary, side view of the hydraulic master apparatus of FIG. 23.
Figure 25:
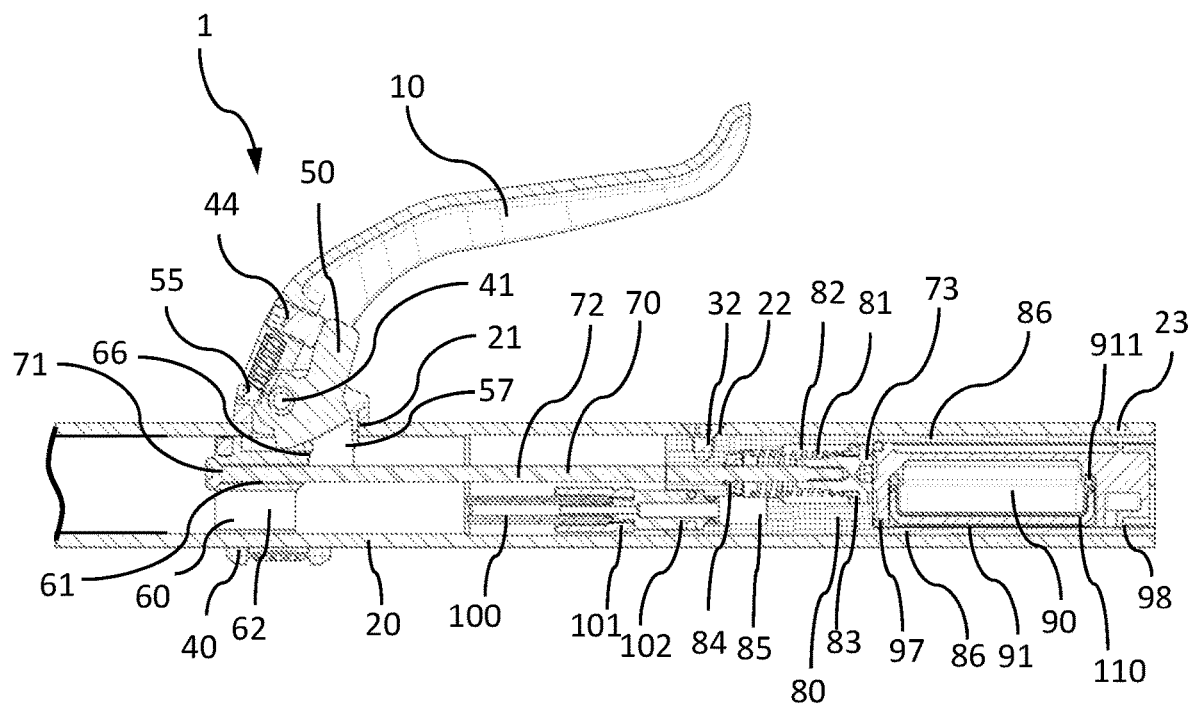
FIG. 25 is a fragmentary, cross-sectional view according to FIG. 1 of a hydraulic master apparatus according to an alternative exemplary embodiment.
Figure 26:
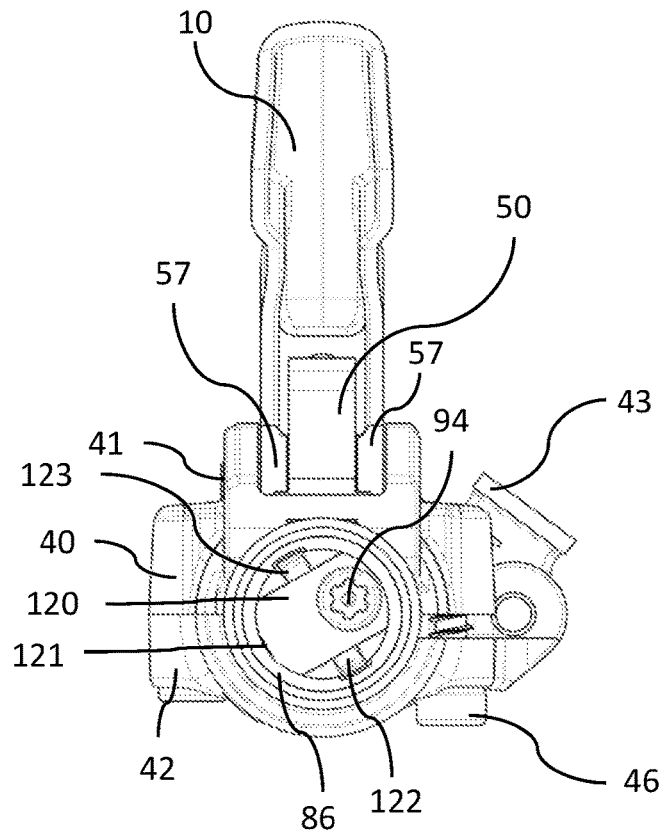
FIG. 26 is a view of the hydraulic master apparatus of FIG. 25 seen from the handlebar end.
Figure 27:
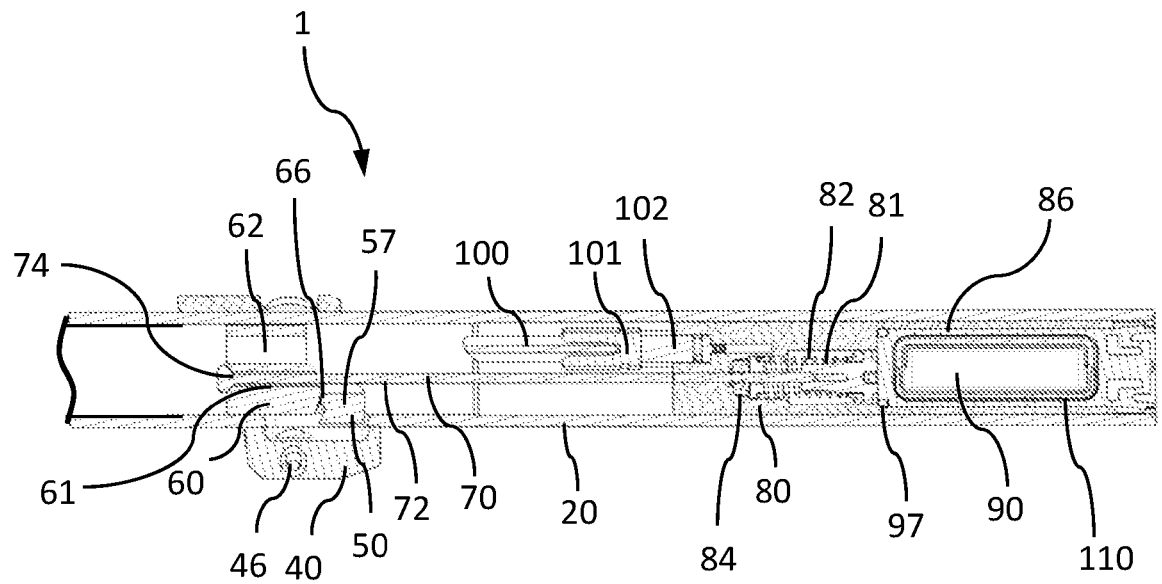
FIG. 27 is a fragmentary, cross-sectional view of the hydraulic master apparatus of FIG. 25.
Figure 28:
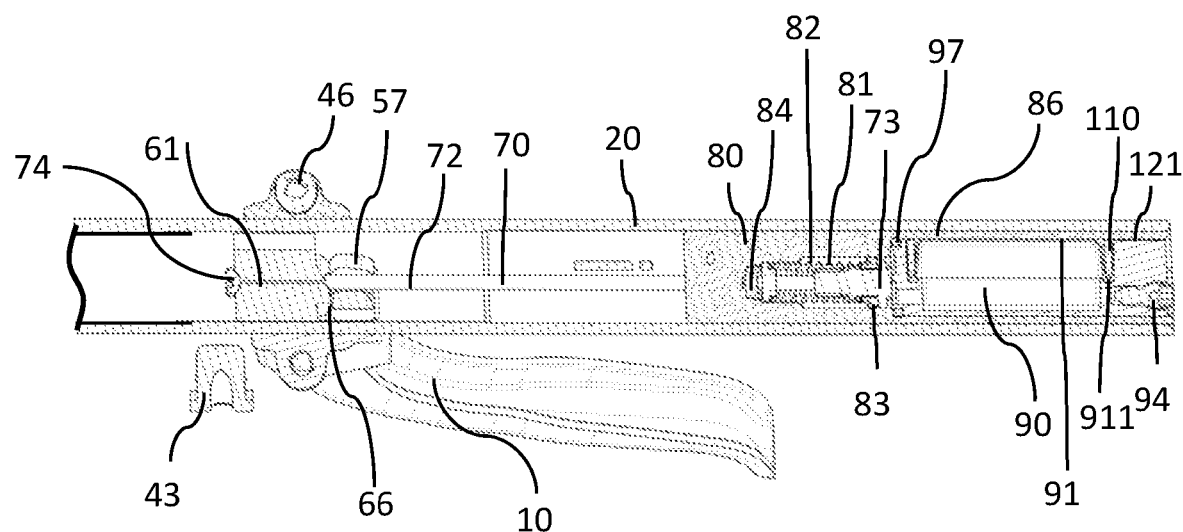
FIG. 28 is a fragmentary, cross-sectional view of the hydraulic master apparatus of FIG. 25.
Figure 29:
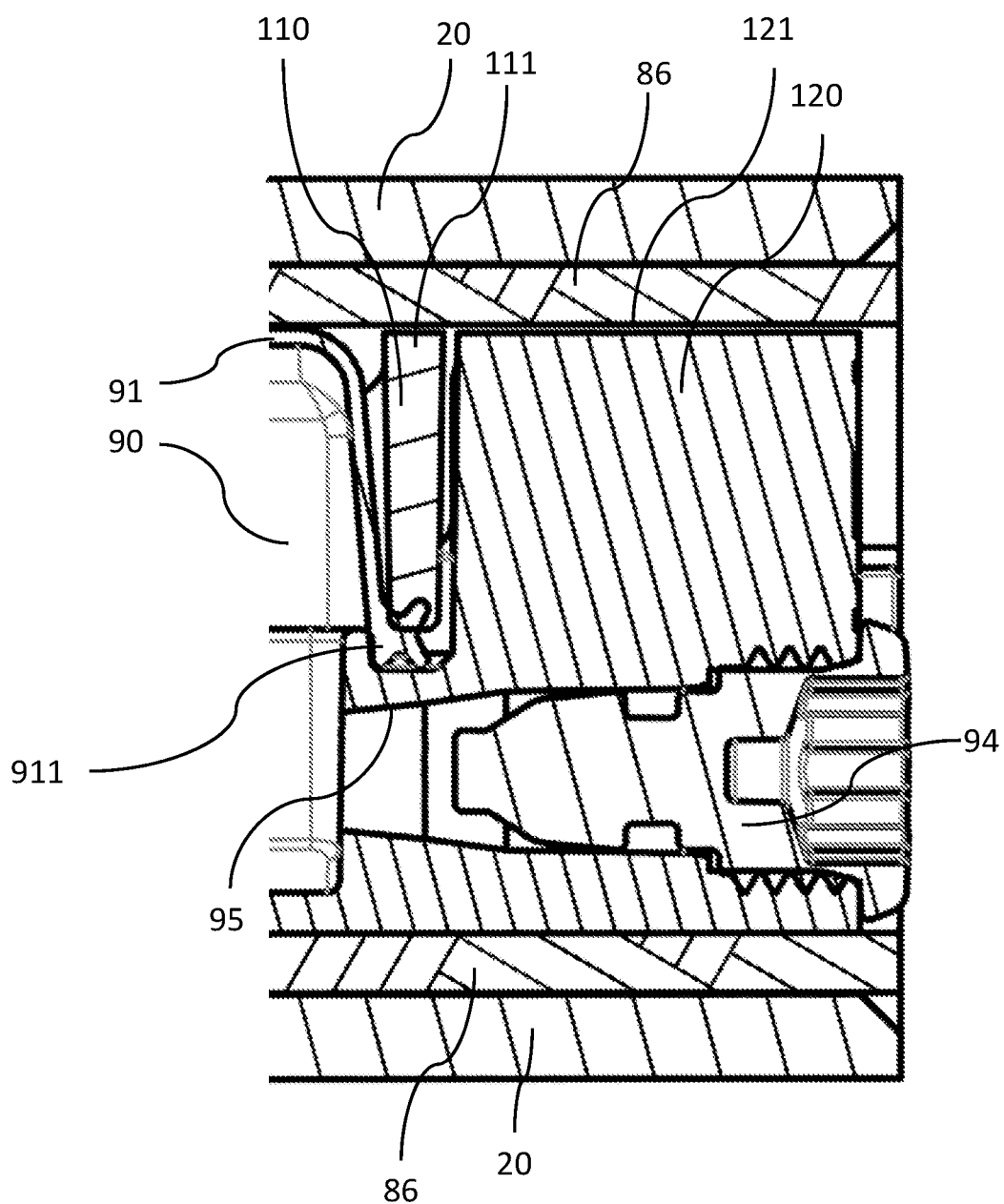
FIG. 29 is an enlarged partial view of the sectional view of FIG. 28.
Figure 35:
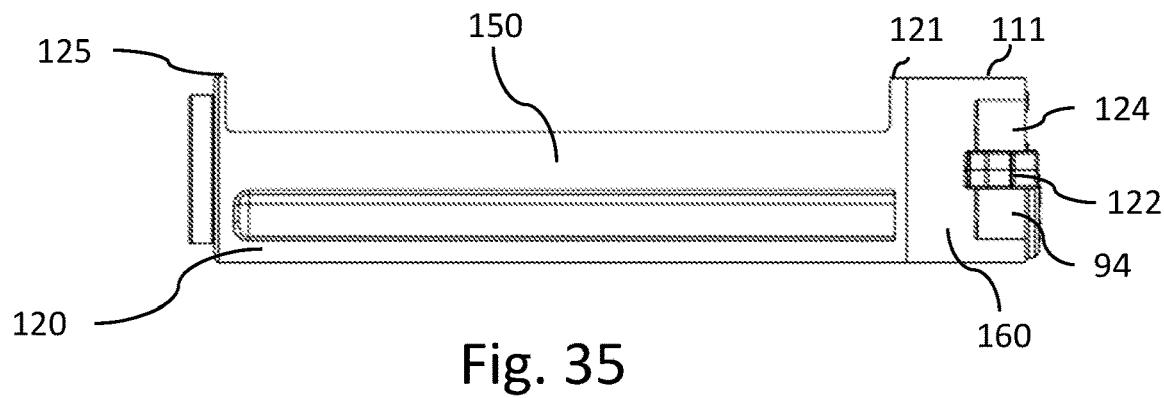
FIG. 35 is a side view of an alternative compensating housing for a hydraulic master apparatus according to FIG. 25.

FIGS. 23 to 24 show an alternative embodiment that substantially corresponds to the embodiment shown in FIGS. 1 to 3 or to the other embodiments. Equal reference signs denote equal or corresponding components or features. Reference is made to the description of the other exemplary embodiments. In the following, the focus will be laid on the differences.

In the embodiment of FIGS. 23 and 24, the handle tube 30 is disposed closer to the center of the vehicle or handlebar in relation to the lever 10 and the support 40. In other words, the lever 10 is disposed on the outer side of the handlebar tube 20.

The head 71 of the pulling device 70 can, therefore, be reached from the outside of the handlebar tube 20, so that the grip width of the lever 10 can be adjusted by changing the length of the pull bar (main body 72). For example, the head 71 could be configured as a screw that is screwed onto a threaded section of the pull rod so that the grip width can be adjusted by turning the head 71.

The screw connection 73, which forms the piston of the master cylinder 80 and which is engaged by the traction device 70, has a connecting piece 731, which extends into the compensating chamber 90, which is disposed in the direction of the center of the vehicle. A pressure line 85 is disposed in the connecting piece 731, which communicates with the pressure chamber 82 through an opening 76.

The pressure line 85 runs through the compensating chamber 90 and is connected to a hydraulic line 100.

The shifting device 60 is disposed on the outside of the handlebar tube 20. By moving the support 40 on the handlebar tube 20, the grip width can be adjusted. Alternatively, the pulling device 70 can also be adjusted in the shifting device 60, by adjusting the head 71, which can be configured as a screw, relative to the main body 72, or the main body is rotated in the screw connection 73.

The master cylinder 80 is disposed relative to the shifting device 60 further in the direction of the vehicle center or between the shifting device 60 and the compensating chamber 90.

FIGS. 25 to 34 show an alternative embodiment that substantially corresponds to the embodiment shown in FIG. 22 or to the other embodiments. Equal reference signs denote equal or corresponding components or features. Reference is made to the description of the other exemplary embodiments. In the following, the focus will be laid on the differences.

In this embodiment, the vent screw 94 is disposed at the bottom. The disadvantage here is that the vehicle should be turned upside down or should be placed or disposed on its side for the safest possible venting, so that the vent screw 94 is positioned as high up as possible for venting. However, this embodiment has the advantage of a higher operational safety, because the passage 93 is further below and, therefore, the probability that air or gas is present there is relatively low.

The master cylinder 80, like the embodiment of FIGS. 10 to 11, has an extension 86, in which the compensating chamber 90 is accommodated, so that the master cylinder 80 with the compensating chamber 90 can be inserted into the handlebar tube 20 as a pre-assembled unit. The compensating chamber 90 comprises a compensating housing 120 with the bellows 91, which is secured at the bead 911 through a frame 110 in the compensating housing 120. The compensating housing is disposed in the extension 86 of the master cylinder 80 and secured by two snap devices 122,123 in the extension 86, which engage in corresponding openings as soon as the compensating housing 120 has been pushed far enough into the extension.

The compensating housing 120 has a front side 125 facing the master cylinder 80 or the screw connection 73 and a front side 124 that faces away from the master cylinder 80 or the screw connection 73 and has a flattening 121. The flattening ensures a connection from the upper side of the bellows 91 to the outside, so that the bellows can move as force-free as possible into and out of the compensating chamber, i.e., that the movement does not have to take place against an increasing or decreasing pressure. The frame 110 has a corresponding flattening 111 on its front side facing outwards.

FIGS. 35 to 45 show an alternative embodiment, which substantially corresponds to the embodiment shown in FIGS. 25 to 34 or to the other embodiments. Equal reference signs denote equal or corresponding components or features. Reference is made to the description of the other exemplary embodiments. In the following, the focus will be laid on the differences.

Figure 36:
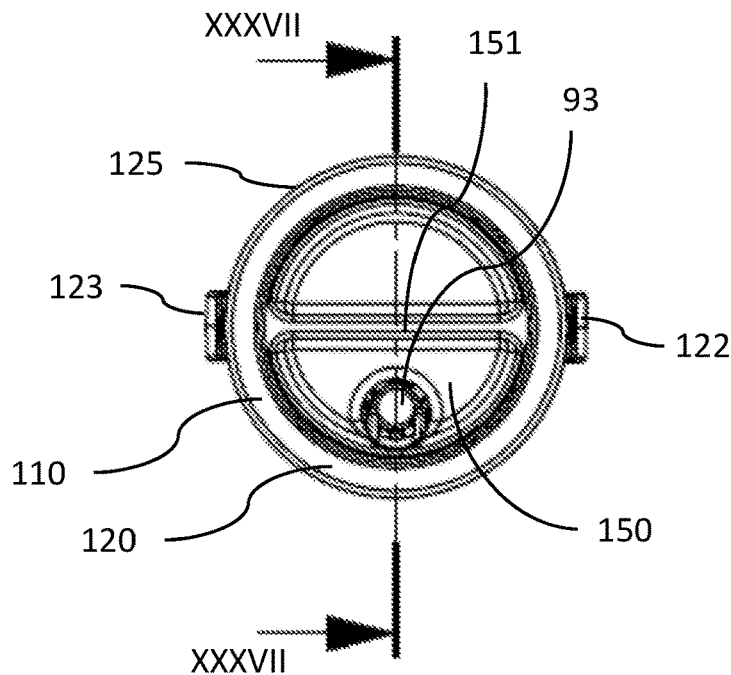
FIG. 36 is a view of the compensating housing of FIG. 35 seen from the left side in FIG. 35.
Figure 37:
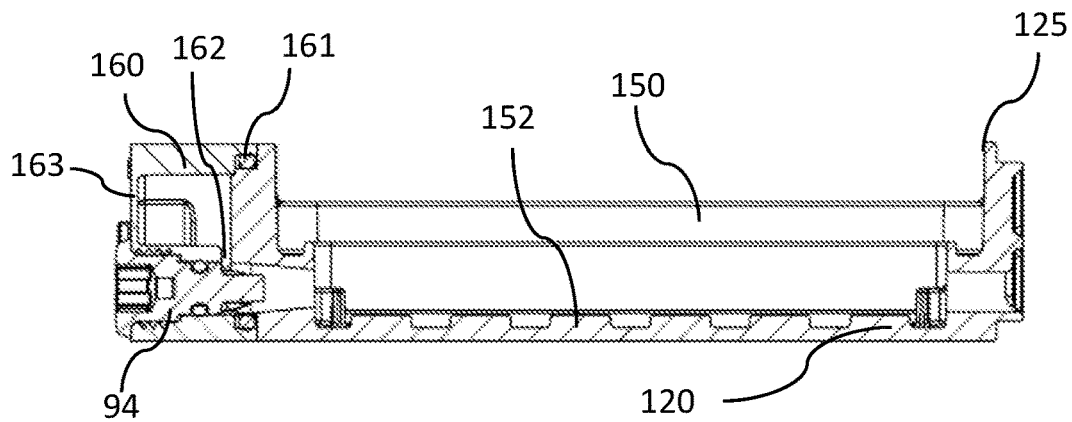
FIG. 37 is a cross-sectional view of the compensating housing of FIG. 35 in the sectional plane marked with the arrows XXXVII in FIG. 36.
Figure 38:
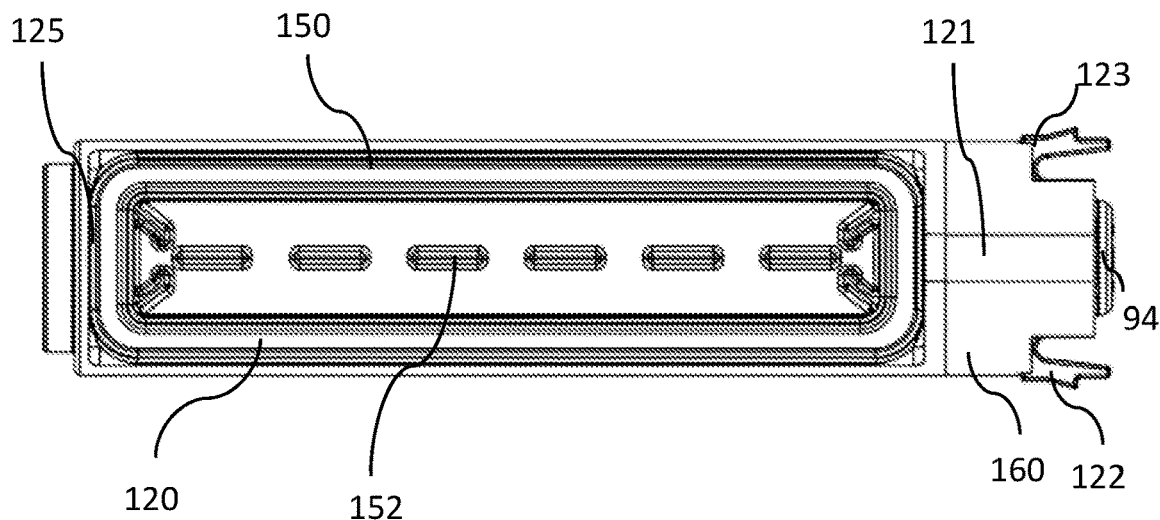
FIG. 38 is a top view of the compensating housing of FIG. 35.
Figure 39:
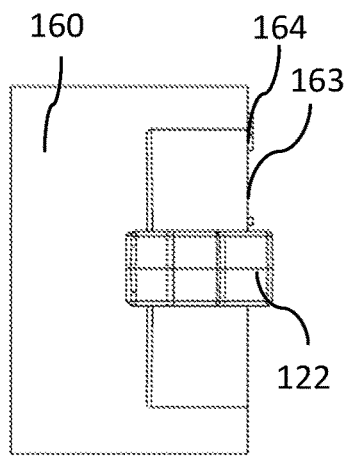
FIG. 39 is a side view of the indicator section of the compensating housing of FIG. 35.
Figure 40:
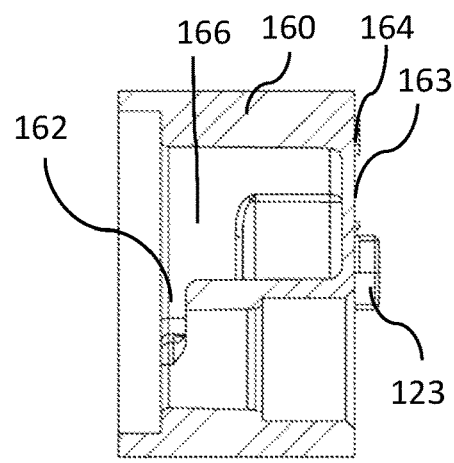
FIG. 40 is a sectional view of the indicator section of FIG. 39 corresponding to the sectional plane of FIG. 37.
Figure 41:
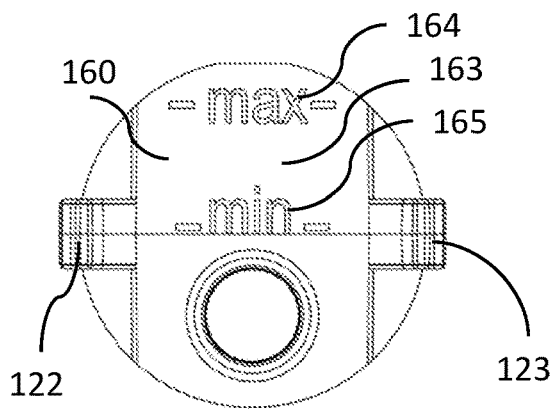
FIG. 41 is a view of the indicator section of FIG. 39 seen from the handlebar end.
Figure 42:
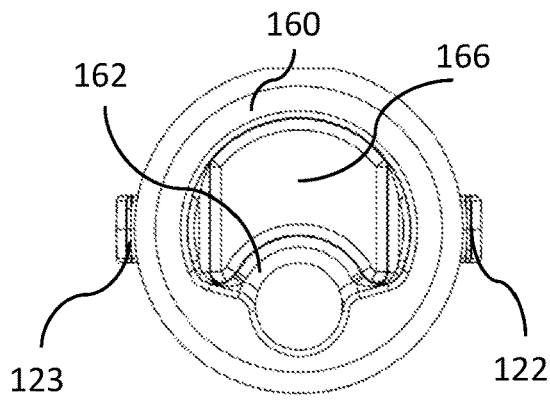
FIG. 42 is a view of the indicator section of FIG. 39 seen from the compensating section of the compensating housing.
Figure 43:
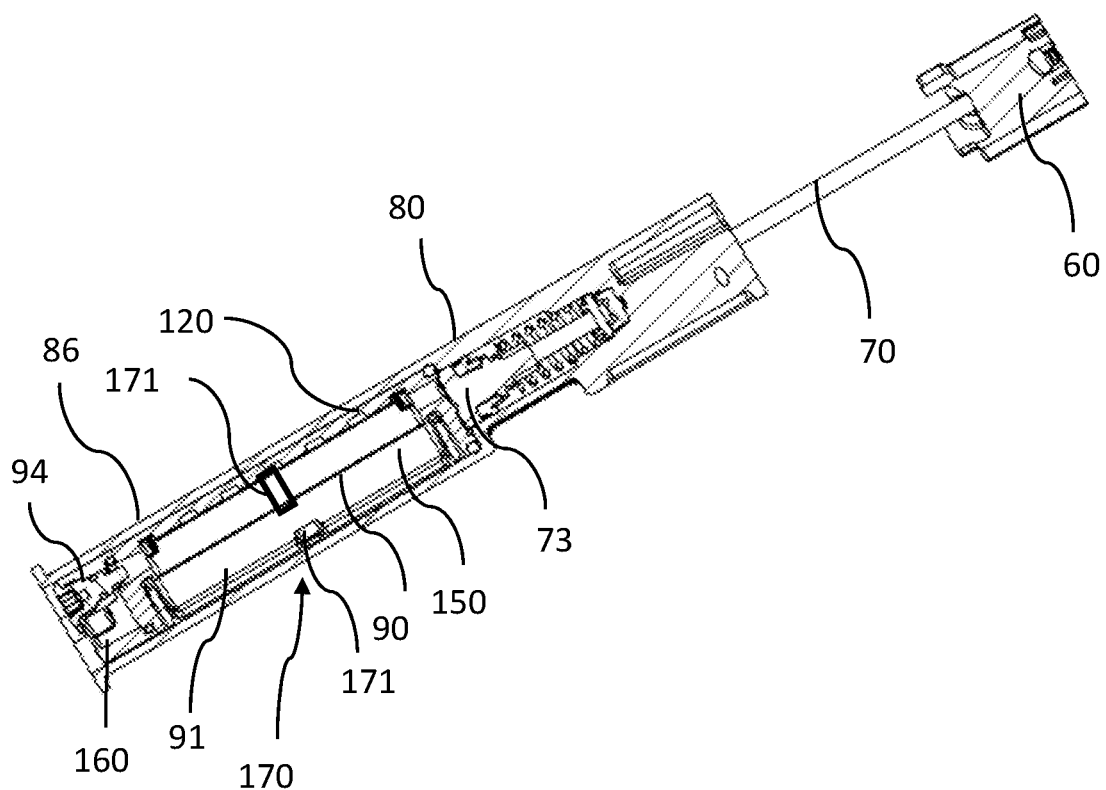
FIG. 43 is a sectional view of a hydraulic master apparatus having a compensating housing according to FIGS. 35 to 42 for assembly in a handlebar tube of a handlebar-guided vehicle, the section running in accordance with the sectional plane of FIG. 37.
Figure 44:
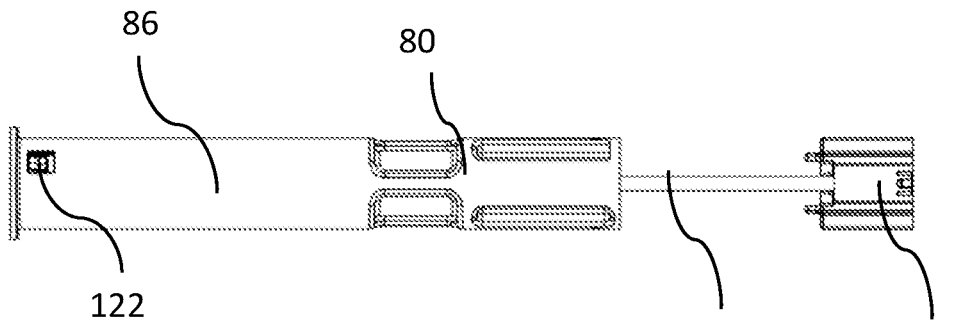
FIG. 44 is a side view of the hydraulic master apparatus of FIG. 43.
Figure 45:
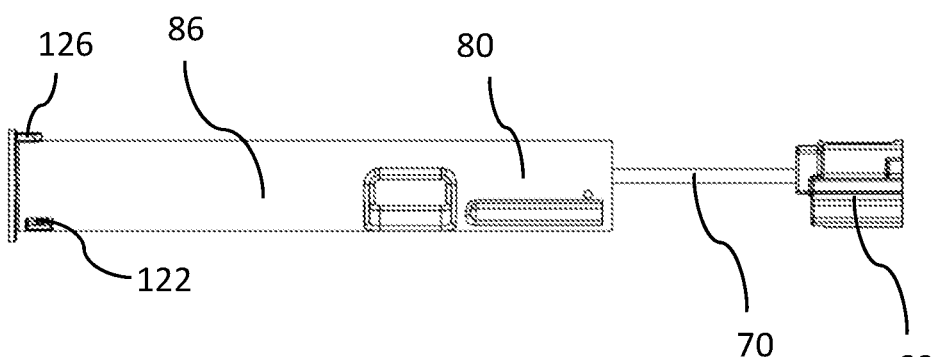
FIG. 45 is a side view of the hydraulic master apparatus of FIG. 43.

The compensating housing 120 is configured in two parts. This has an advantage when using injection molding technology if a fill level indicator is to be provided at the handlebar end. Alternatively, the compensating housing 120 can also be configured in one piece with a filling level indicator at the handlebar end, if it can be manufactured economically using other manufacturing processes, such as rapid prototyping. The illustrated two-piece compensating housing has a compensating section 150 and an indicating section 160, which are connected to each other at the front sides. A seal 161 is provided in the transition area and can be configured as an O-ring, for example. A web 151 above the passage 93 is provided at the front side of the compensating section, as shown in FIG. 36.

The indicating section 160 is in fluid communication with the compensating section 150 through a passage 162 that is configured past the vent screw 94. As a result, the indicating section 160 in area 166 is filled according to the filling level in the compensating section 150, so that the filling level can be read through the transparent front wall 163. For orientation or easy reading, markings 163 or 164 can be provided on the front wall 162, as in the exemplary embodiment, indicating, for example, that a maximum or minimum filling level has been reached.

At the bottom of the compensating container 150, projections 152 can be provided, on which the bellows 91 can rest when the hydraulic master apparatus is evacuated for filling, for example.

As an alternative or in addition to the optical level indicator in the indicating section 160 or the indicator 140 of the other exemplary embodiments, a sensor device 170 can also be provided to detect the filling level in the compensating chamber 90. For example, a magnet 171 can be provided on the bellows 91, the relative position of which is detected by a sensor 172. Depending on the filling level of the compensating chamber 90, the bellows 91 will sag. It is, therefore, advantageous to place the magnet 171 in the middle of the bellows to get to know a possible positional change depending on the filling level. The magnet can be disposed on the bellows 91 in a suitable way. For example, the magnet 171 can be accommodated in a pocket formed on the bellows. Alternatively, the magnet 171 can also be fixed to the bellows by encapsulating the bellows. Bonding or any other suitable fastening method is conceivable. Such a sensor device for recording the filling level of the compensating chamber can also be provided for the other embodiments.

The extension 86 is provided with the web 126 or a rib that can be disposed in a corresponding recess at the end of the handlebar tube to prevent rotation.

Figure 46:
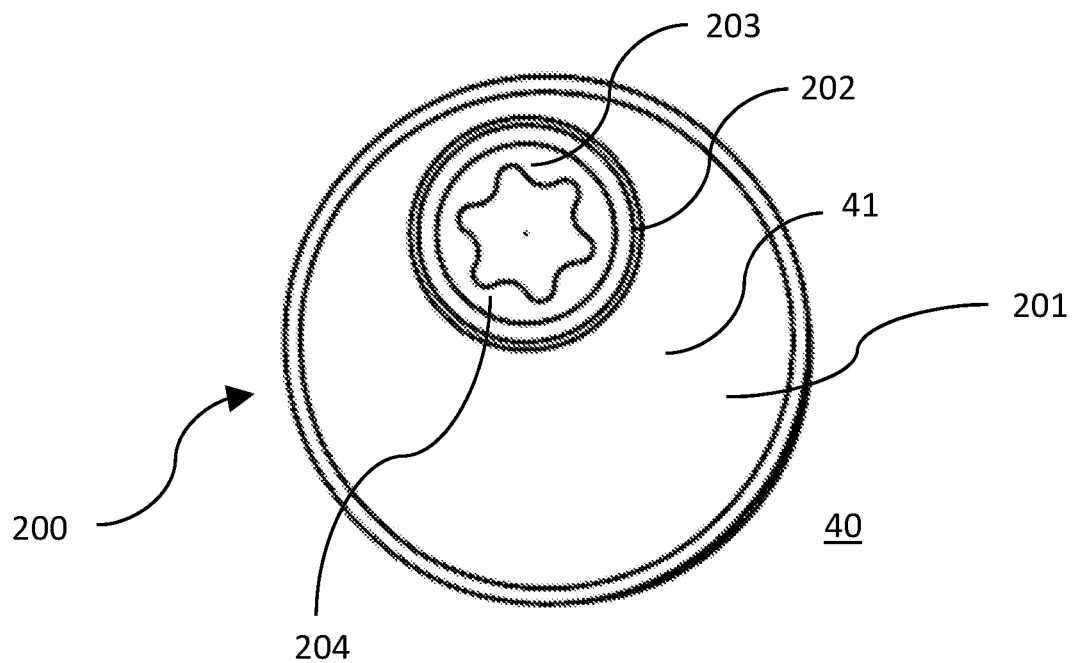
FIG. 46 is a detailed view of an eccentric device for a hydraulic master apparatus according to an exemplary embodiment.

FIG. 46 shows an eccentric device 200 for a hydraulic master apparatus according to a configuration, by which the above described axis of rotation 41 of the other configurations, which is shown in the other figures and about which the lever pivots, can be formed eccentrically so that, when the lever is operated, the point of the axis of rotation can be moved closer to the handlebar or further away from the handlebar with increasing rotational movement, as a result of which the effective lever arm changes to effect faster actuation with less force or slower actuation with more force. The eccentric device 200 has a rotation device 201, which is rotatably accommodated in the support 40 described above and shown in the other figures and corresponds to the axis of rotation 41 shown schematically in the other figures. In the case of the eccentric device 200, a link support 202 is formed eccentrically in the rotation device 201, which has a substantially circular circumference, a lever support 203 being disposed in the link support and being used to receive the lever. A fastening device 204 can be provided for fastening the lever support 203 and can have a known tool support.

Figure 47:
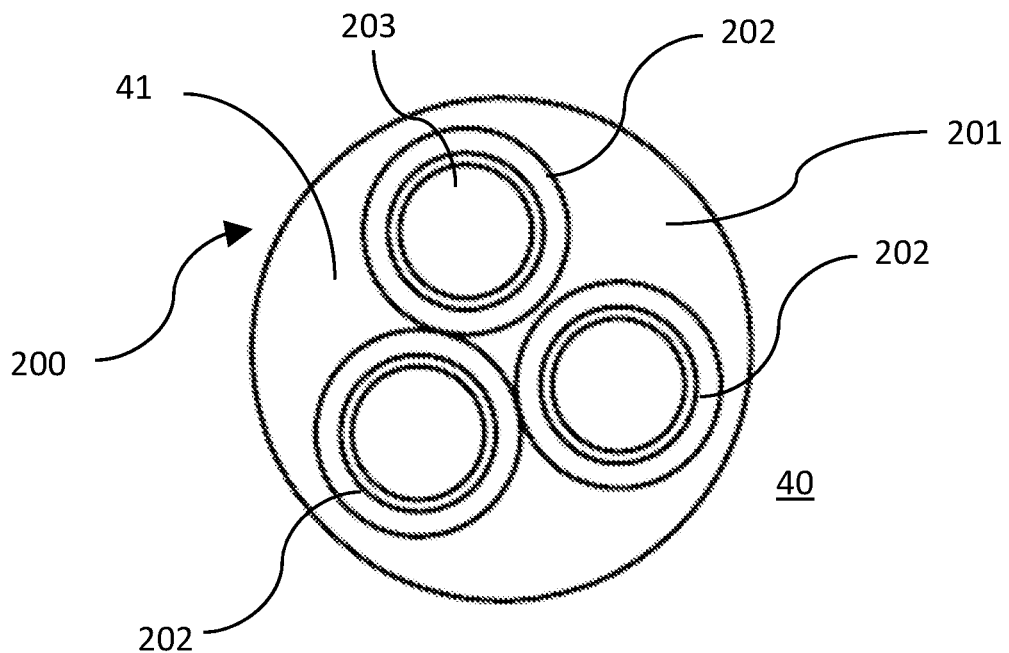
FIG. 47 is a detailed view of an eccentric device for a hydraulic master apparatus according to an exemplary configuration.

FIG. 47 shows a variant of the eccentric device 200, in which, e.g., three link supports 202 are formed in the rotation device 201, in which the lever support 203 can be disposed alternatively to be able to adapt the hydraulic device according to a configuration ergonomically to the driver. According to a configuration, only two or more than three link supports can be provided. In addition, the link support can also be inserted and secured in various angular positions in the rotation device to be able to set intermediate positions for ergonomic fine adjustment.

Figure 48:
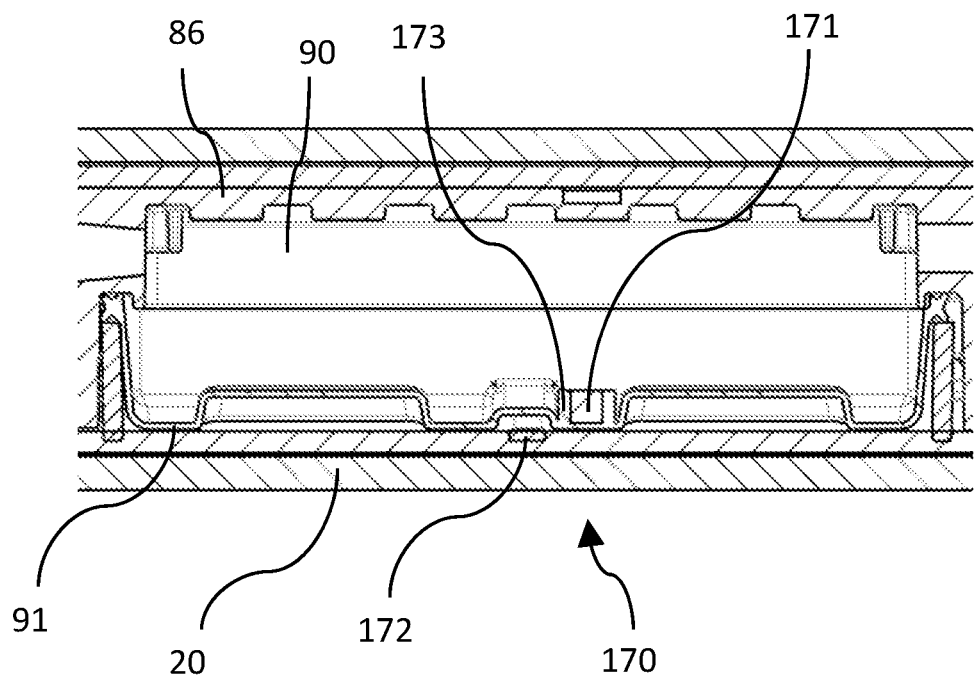
FIG. 48 is a fragmentary, cross-sectional view of a filing level sensor apparatus for a hydraulic master apparatus according to an exemplary configuration.

FIG. 48 shows a filling level sensor apparatus 170 for a hydraulic master apparatus according to a configuration, which can be realized in the other configurations. The sensor 172 is accommodated in the extension 86. The magnet 171 is accommodated in a support 173 formed in the bellows 91. With the change in the supply volume in the compensating chamber 90, the bellows 91 deforms and the distance between the sensor 172 and the magnet 171 changes. As an alternative or in addition to the magnet, it is possible to use alternative sensor transmitters and corresponding sensors known to a person skilled in the art.

Figure 49:
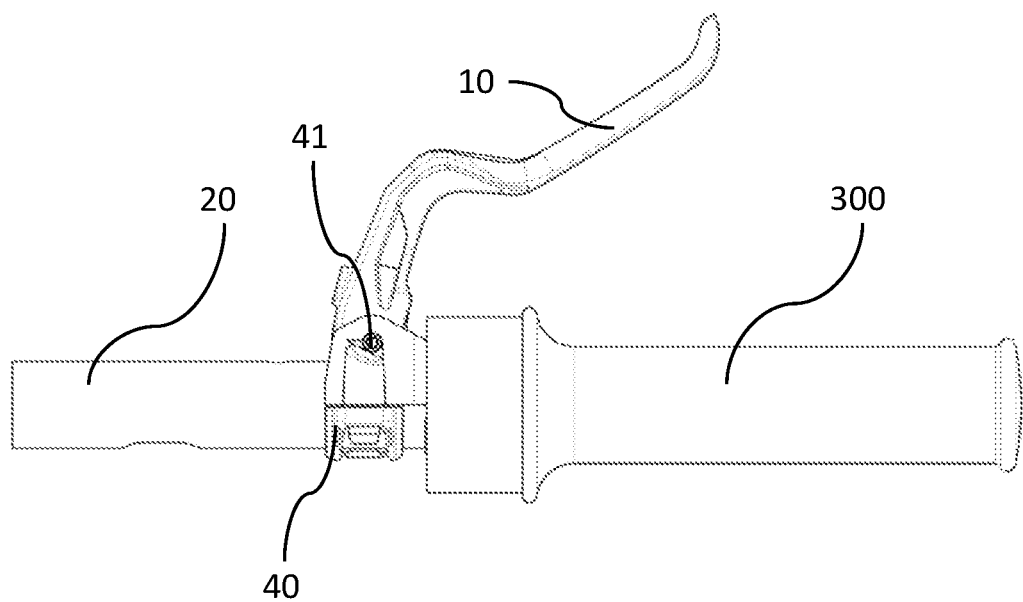
FIG. 49 is a fragmentary, view of a hydraulic master apparatus according to an exemplary configuration with a rotary handle device.

FIG. 49 shows a view of a hydraulic master apparatus according to a configuration with a rotary handle device 300. The rotary handle device can, for example, include a rotary handle for electronic actuation of throttle and/or clutch. The rotary handle device 300 is accommodated on the support 40 and is pivotally mounted such that it can be rotatably mounted around the handlebar tube 20. The support 40, therefore, has a double function for the pivotal mounting of the lever 10 and the pivotal mounting of the rotary handle device 300. The axes of rotation are here approximately perpendicular to one another. The angle can also be less than 90 degrees if the axis of rotation of lever 10 is disposed at an angle, for example, 85 degrees, or within the above-mentioned preferred limits.

Figure 50:
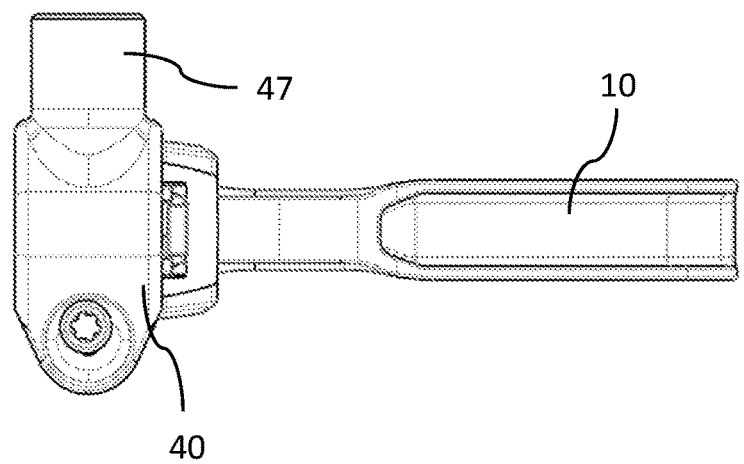
FIG. 50 is a view of a support for a hydraulic master apparatus according to an exemplary configuration seen from the lower side of the lever, with only the lever and the lever mount being illustrated.
Figures 51, 52:
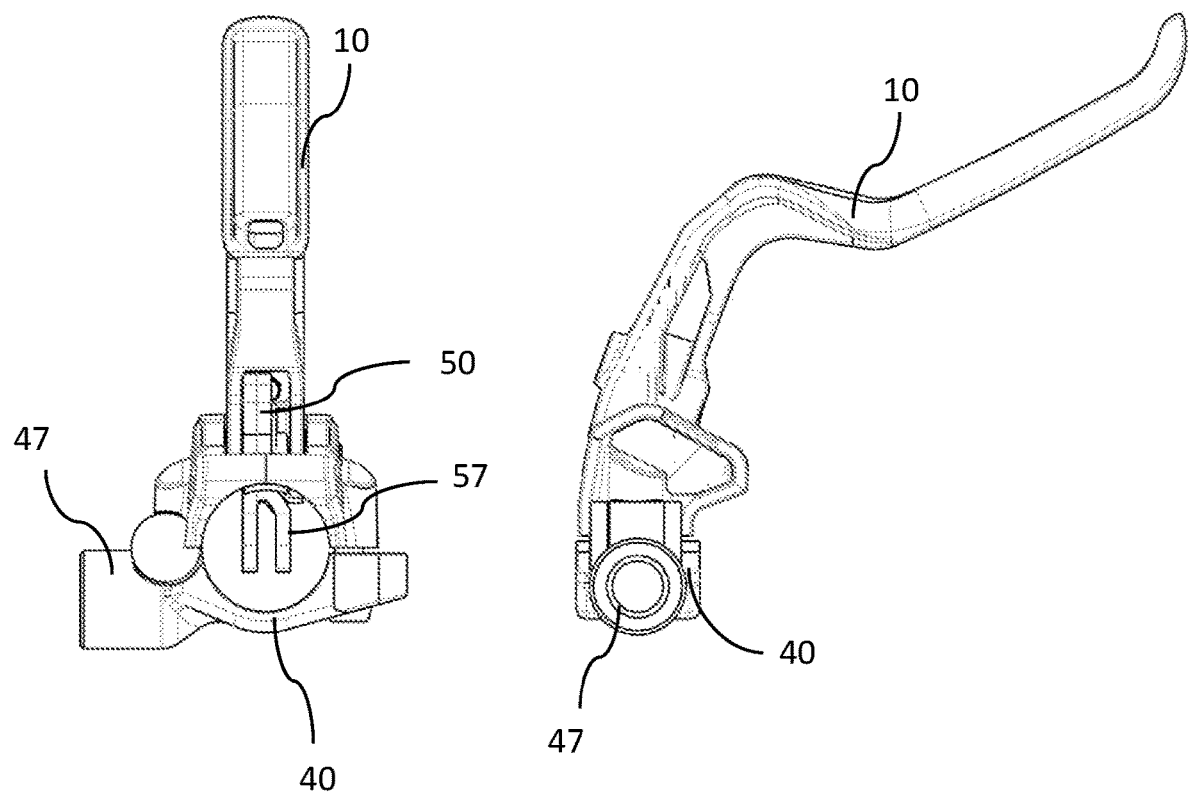
FIG. 51 is a side view of the support of FIG. 50, i.e., in a direction along the handlebar tube (not shown)
FIG. 52 is a side view of the support of FIG. 50, i.e., according to a side view of the handlebar tube (not shown)
Figure 53:
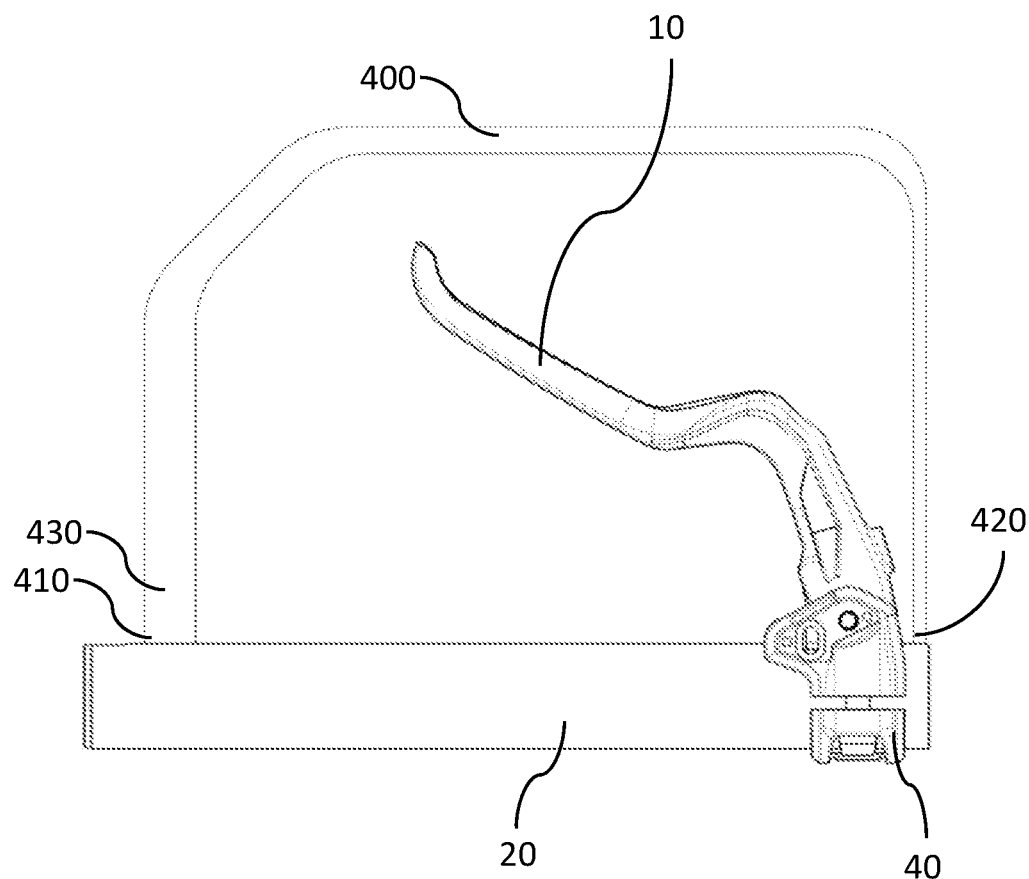
FIG. 53 is a fragmentary, view of a protection apparatus of a hydraulic master apparatus according to an exemplary embodiment.
Figure 54:
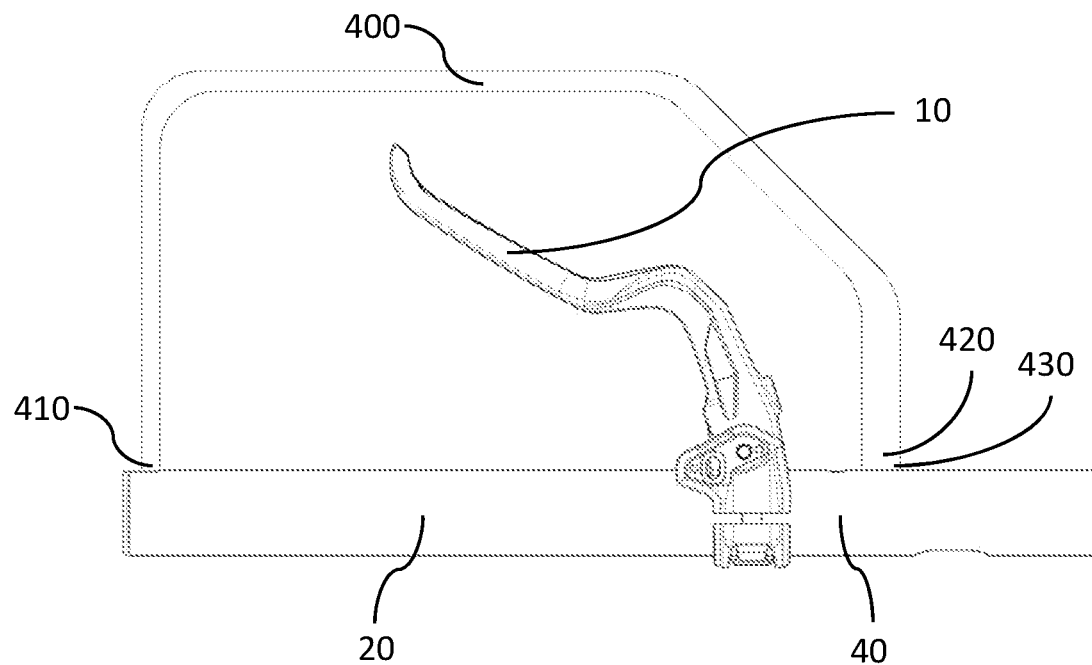
FIG. 54 is a fragmentary, view of a protection apparatus of a hydraulic master apparatus according to an exemplary embodiment.

FIGS. 50 to 52 show a support 47 for a hydraulic master apparatus according to a configuration. The support 47 is formed as a mirror mount into which a mirror can be inserted in a manner known to a person skilled in the art. The support can be formed and disposed accordingly to accommodate other components. In the illustrated configuration, a lever 10 and a pressure piece 50 are provided with extensions 57. According to a configuration, the lever can also act directly on the piston or the traction device without a pressure piece, wherein the extensions 57 can be correspondingly formed on the lever. FIGS. 53 and 54 show views of protection apparatuses 400 of hydraulic master apparatuses according to a configuration. The protection apparatus 400 comprises a protective bracket to protect the driver's hand. The protection apparatus 400 comprises an external area 410 and an internal area 420 and a clamping area 430 where the protection apparatus 400 is clamped to the handlebar tube 20. In the configuration shown in FIG. 53, the clamping area 430 is provided in the external area 410. In the configuration shown in FIG. 54, the clamping area 430 is provided in the internal area 420.

FIGS. 55 to 60 show views of switch devices 500 and their details of hydraulic master apparatuses according to a configuration.

Figure 55:
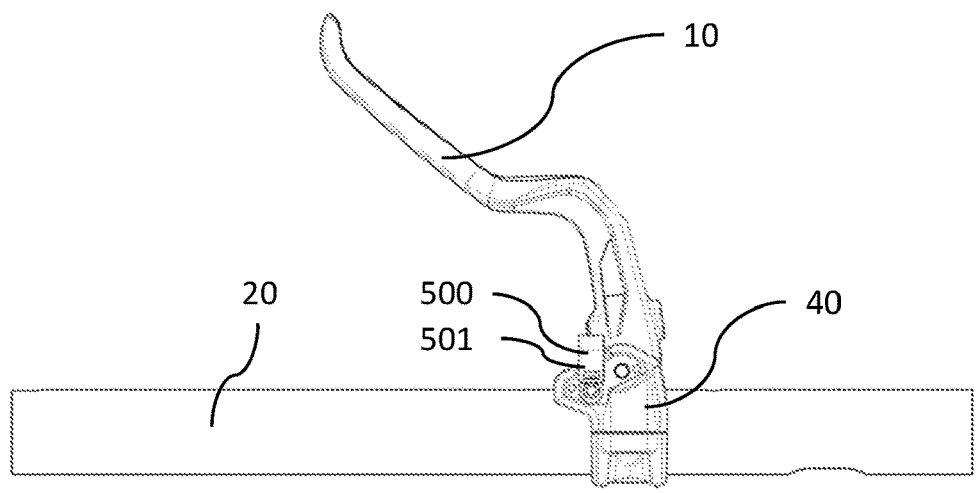
FIG. 55 is a fragmentary, view of a hydraulic master apparatus according to an exemplary embodiment with a switch device.

The switch device 500 shown in FIG. 55 comprises a sensor 501, which is disposed on the support 40 and interacts with a signal transmitter, such as a magnet, which is disposed, e.g., in the pressure piece 50 and which is disposed in a support 503. The sensor 501 can include, for example, a Hall sensor or a reed contact.

Figure 56:
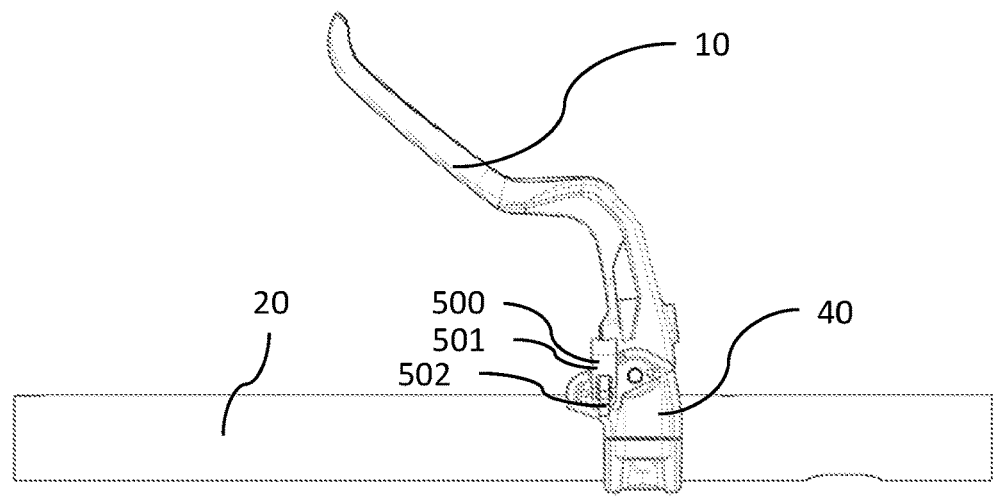
FIG. 56 is a fragmentary, view of a hydraulic master apparatus according to an exemplary configuration with a switch device.
Figure 57:
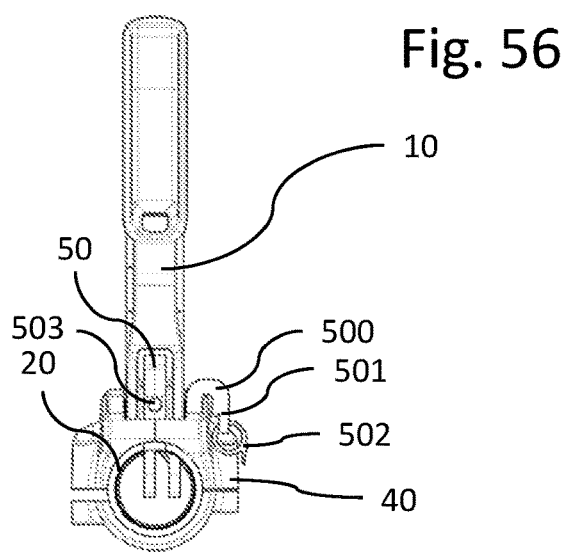
FIG. 57 is a cross-sectional view of the hydraulic master apparatus of FIG. 56.
Figure 58:
FIG. 58 is a detailed view of the sensor of the switch device of FIGS. 55 and 56.
Figures 59, 60:
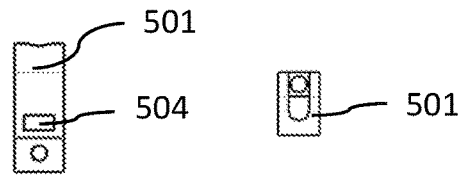
FIG. 59 is a view of the sensor of FIG. 58 from the left-hand side with regard to FIG. 58.
FIG. 60 is a view of the sensor of FIG. 58 from below

As shown in FIG. 56, a support 502 for a cable can be disposed on the sensor 501. The support 502 can be, e.g., a cable tie, which can be placed in a recess 504 provided in the housing of the sensor 501.

The position of the sensor 501 in the holder 40 is adjustable in height. The sensor housing has a symmetrical design so that the same components can be used for the left and right transmitter.

The sensor 501 with its housing can be fixed to the support by a screw or a clip, for example. The housing of the sensor 501 includes a possibility to fix the cable of the sensor through an eyelet or a cable tie.

Figure 61:
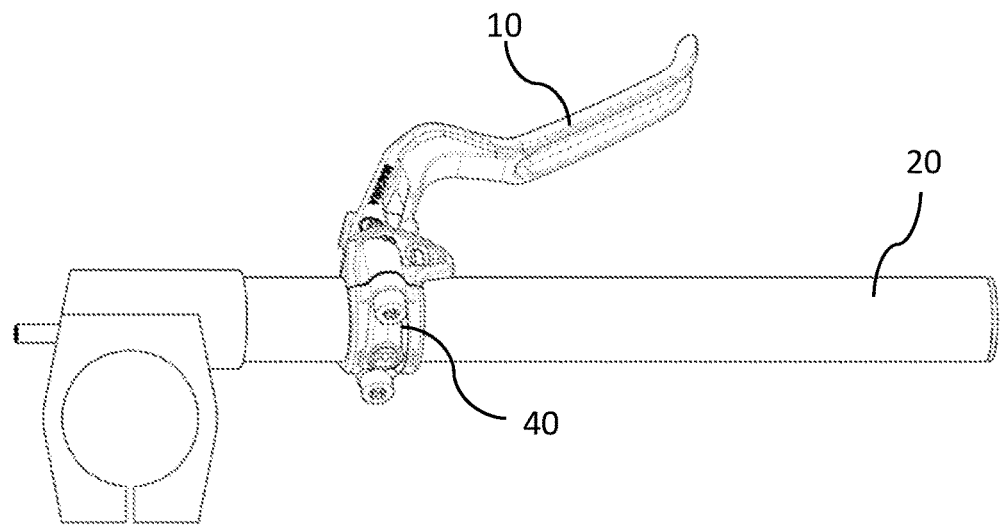
FIG. 61 is a fragmentary, perspective view of a hydraulic master apparatus according to an exemplary embodiment, which is disposed on a handlebar stub.
Figure 62:
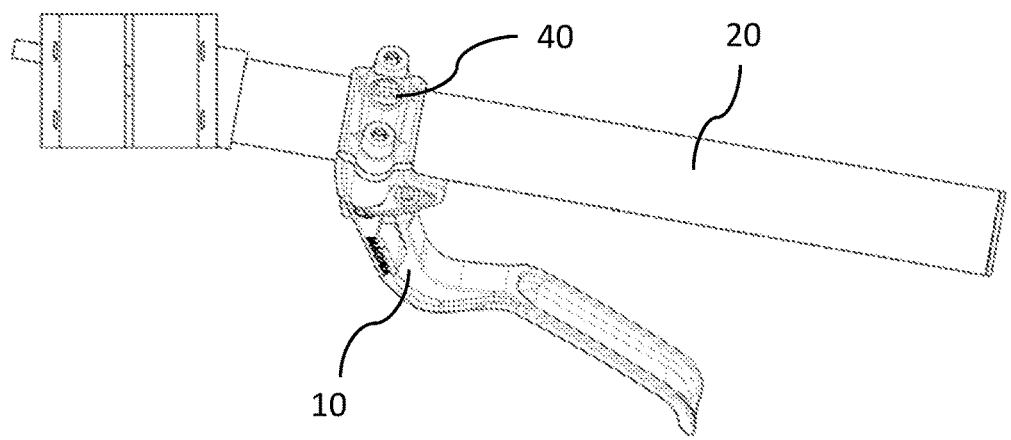
FIG. 62 is a fragmentary, further perspective view of the hydraulic master apparatus of FIG. 61.
Figure 63:
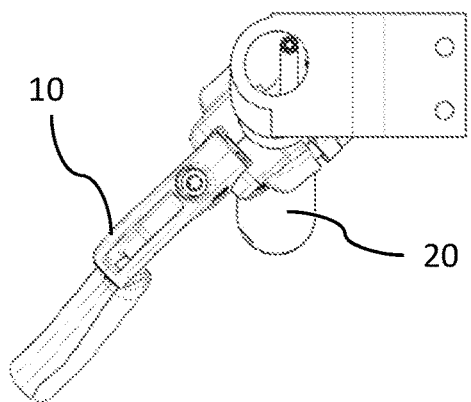
FIG. 63 is a further perspective view of the hydraulic master apparatus of FIG. 61.

FIGS. 61 to 63 show perspective views of a hydraulic master apparatus according to a configuration, which is disposed on the handlebar tube 20, which is configured as a handlebar stub. The handlebar stub is disposed on the handlebar-guided vehicle in a manner known to a person skilled in the art.

Figure 64:
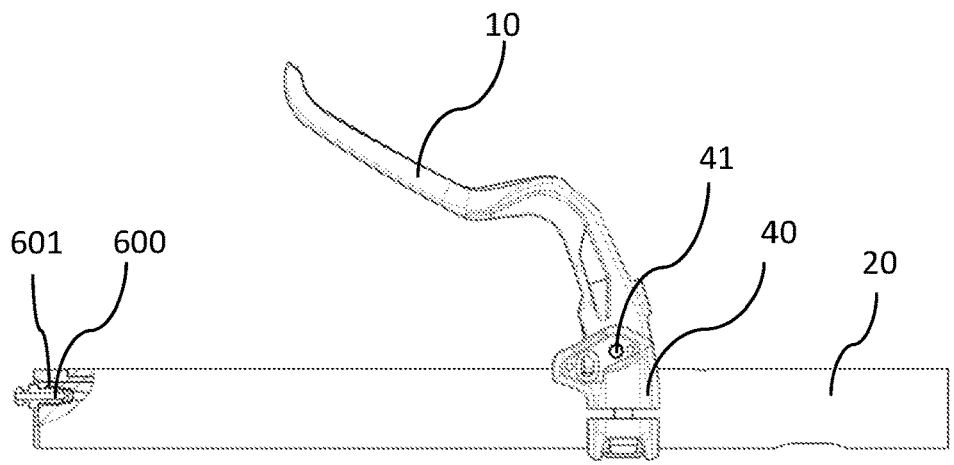
FIG. 64 is a fragmentary, view of a hydraulic master apparatus according to an exemplary embodiment.

As shown in FIG. 64, a vent valve 600 can be provided at the end of the handlebar in the case of a hydraulic master apparatus according to a configuration. The support 601 can here optionally be configured as a Luer cone so that a commercially available syringe can be used for easy filling.

Figure 65:
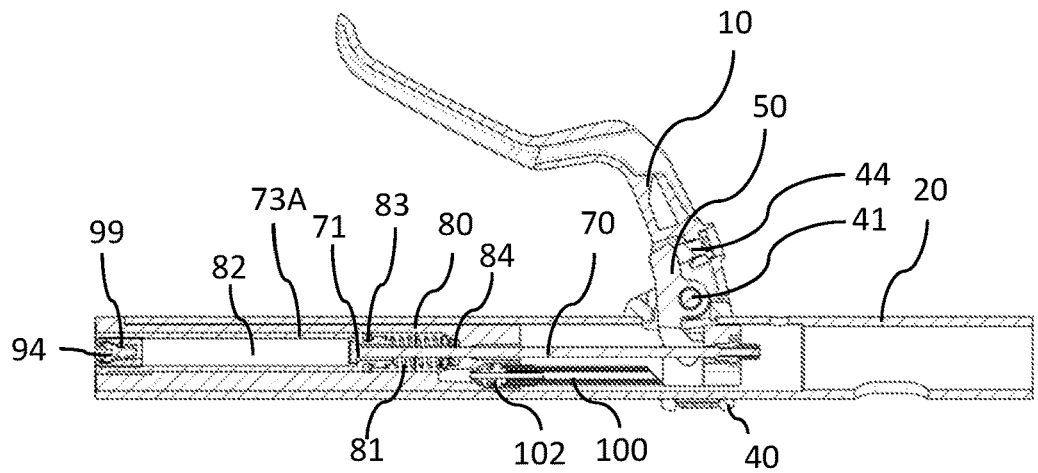
FIG. 65 is a fragmentary, cross-sectional view of a hydraulic master apparatus according to an exemplary embodiment.
Figure 66:
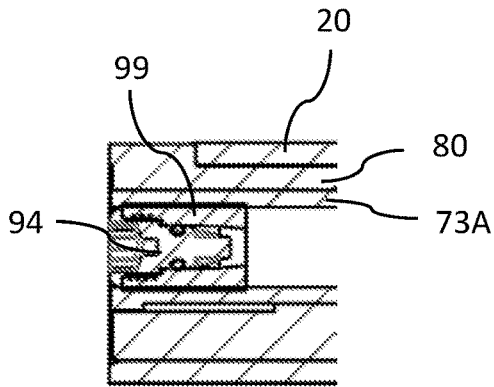
FIG. 66 is an enlarged cross-sectional view of the hydraulic master apparatus of FIG. 65.
Figure 67:
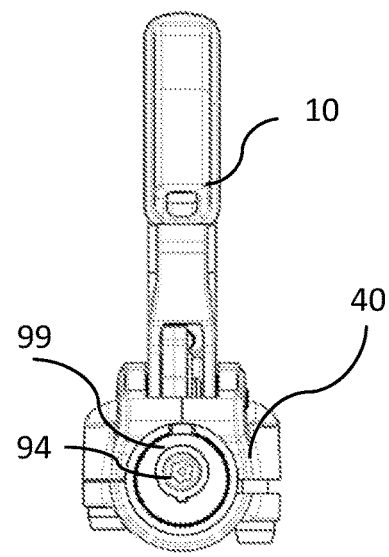
FIG. 67 is a side view of the hydraulic master apparatus of FIG. 65 in the direction of the handlebar end.

FIGS. 65 to 67 show views of a further hydraulic master apparatus according to a configuration. This configuration features a closed hydraulic system. The pulling apparatus 70 has a head 71, which is disposed in the piston 73A of the hydraulic master apparatus. The piston 73A has an extension that extends to the end of the handlebar. The pressure chamber 82 extends from the area where the return spring 81 is disposed, through the area where the head 71 engages on the piston 73A, to the handlebar end where an adjusting device 99 is provided. The adjusting device has a piston that can be screwed into the piston 73A to reduce the volume of the pressure chamber 82. This reduces the free travel. In this way, a change in the free travel can be compensated for which is created, e.g., when the brake pads wear. Pressure chamber 82 is sealed by seals 83 and 84 as well as the adjusting device 99, which is screwed into the end of the piston 73A. A seal at the head 71 of the pulling device 70 is not necessary because this area is located within the pressure chamber. A vent screw 94 is disposed in the adjusting device 99, through which the system can be vented or filled.

Figure 68:
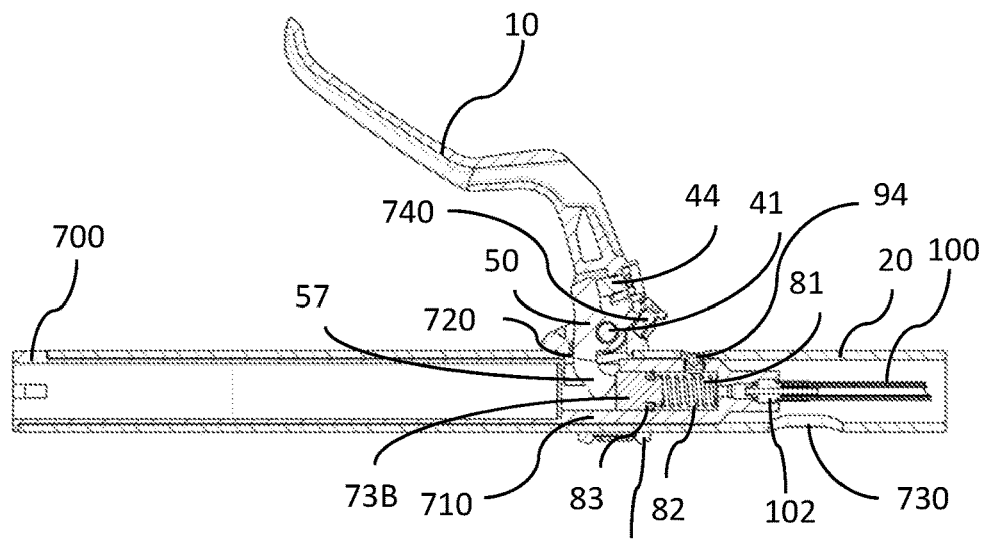
FIG. 68 is a fragmentary, cross-sectional view of a hydraulic master apparatus according to an exemplary embodiment.
Figure 69:
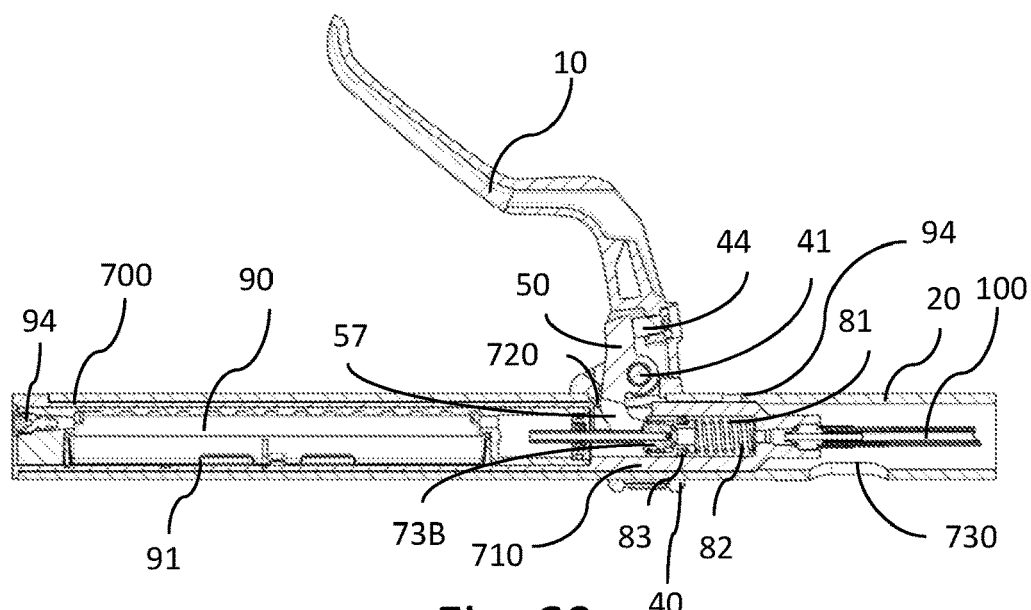
FIG. 69 is a fragmentary, cross-sectional view of a hydraulic master apparatus according to an exemplary embodiment.
Figure 70:
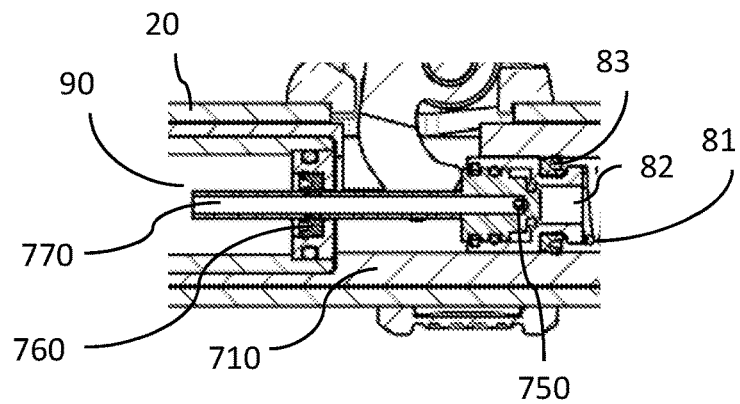
FIG. 70 is a fragmentary, enlarged cross-sectional view of the hydraulic master apparatus of FIG. 69.

FIG. 68 shows a view of another hydraulic master apparatus according to a configuration. This configuration has an insert 700 that is disposed in a handlebar tube 20. At the end of the insert 700, which is disposed towards the center of the vehicle, there is a master cylinder 710 with a piston 73B, which seals a pressure chamber 82 against the inner wall of the master cylinder 710 with a primary seal 83. A hydraulic line 100 is connected to the master cylinder 710 in a manner known to a person skilled in the art.

The force of the lever 10 is transmitted to the piston 73B through a pressure piece 50. The pressure piece 50 has an extension 57, which engages in the insert 700 and rests on the piston 73B.

The lever 10 and the pressure piece 50 are disposed to the handlebar tube through a support 40 disposed on the outside of the handlebar tube 20. Correct alignment between piston and lever assembly can be achieved by stops (not shown) or by moving the support.

A grip width adjusting device 44 is provided between the lever 10 and the pressure piece 50 and influences the angle between the lever 10 and the pressure piece.

Between the lever 10 and the support 40, a free travel adjusting device 740 is provided, which influences the angle between the lever 10 and the support 40 and, thus, the free travel. This allows compensation when, for example, the brake pads wear out over time. This is advantageous in closed systems, such as rim brake systems.

The hydraulic line 100 can be disconnected from the master cylinder 710 and connected to it through the maintenance opening 730 provided in the handlebar tube 20.

To vent the hydraulic system, a vent screw 94 is provided, which is disposed in master cylinder 710. An opening is provided in the handlebar tube 20 so that the vent screw 94 can be operated from the outside.

Figure 71:
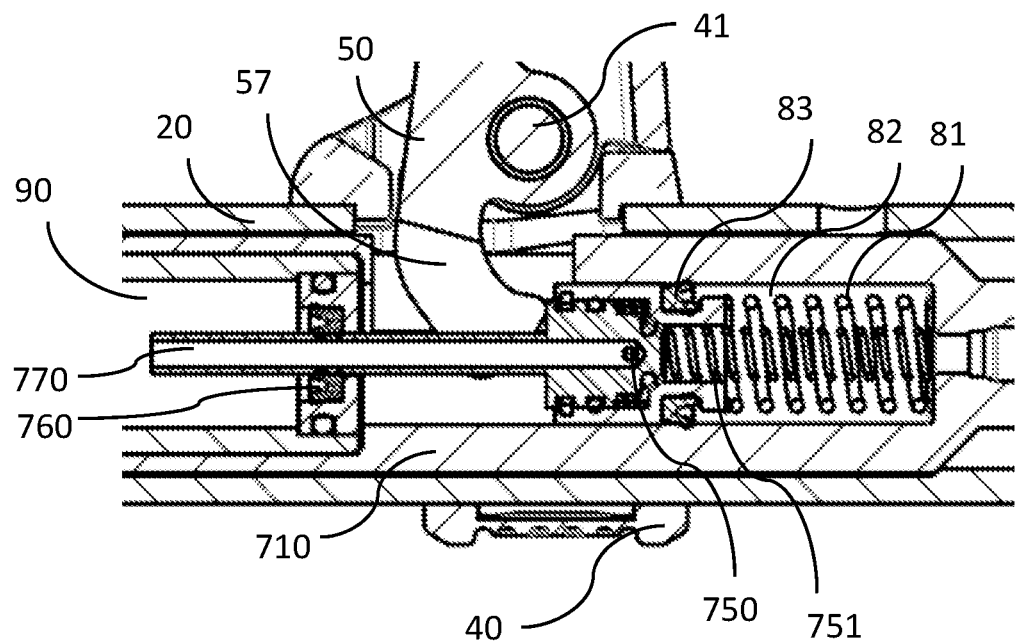
FIG. 71 is a fragmentary, enlarged cross-sectional view of the hydraulic master apparatus of FIG. 69.
Figure 72:
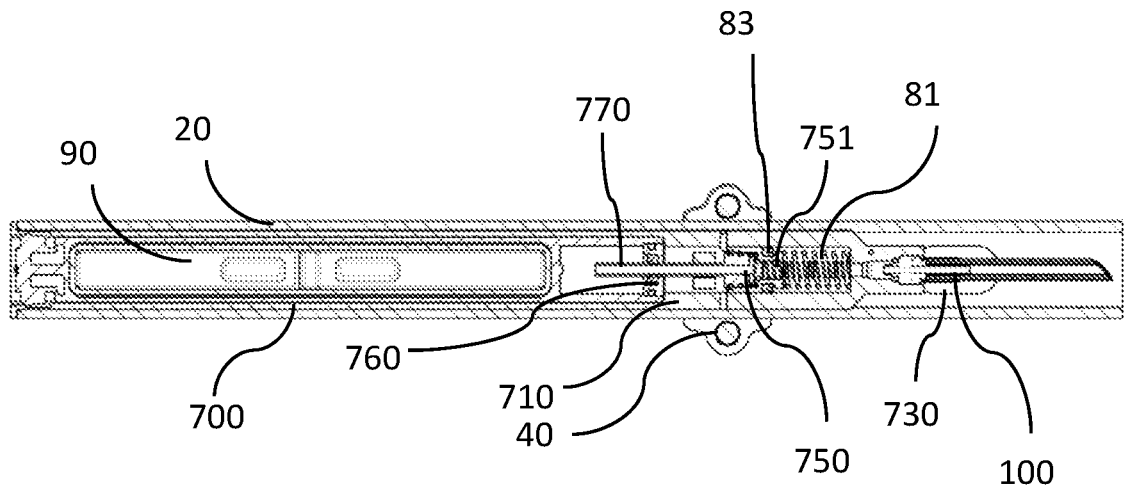
FIG. 72 is a fragmentary, cross-sectional top view of the hydraulic master apparatus of FIG. 69 in the direction of the lower part of the clamp or support.

FIGS. 69 to 72 show views of another hydraulic master apparatus according to a configuration. This configuration has a compensating chamber 90, which is disposed in the insert 700. The compensating chamber is sealed by a seal 760 against the area where the power transmission part engages in the insert. The connection between the pressure chamber 82 and the compensating chamber 90 is made through a central valve 750, which is disposed in the piston 73B and establishes a connection to the compensating chamber through a line 770. The central valve has a closing spring, which is shown in FIGS. 71 and 72. The central valve 750 closes the connection between pressure chamber 82 and compensating chamber 90 when the hydraulic master apparatus is actuated. When not actuated or at rest, compensation can take place.

The line 770 is disposed between the extensions 57 of pressure piece 50. Because this configuration has a compensating chamber, the free travel setting device 740 can be omitted. However, it can also be provided to allow the adjustment of the desired free travel, which, due to the compensating chamber, remains the same regardless of the wear of the brake linings.

This configuration has the advantage that a line outlet to the slave can be provided with a large cross-section although the master cylinder 710 is disposed in the handlebar. This is the case because the entire cross-section of the handlebar tube 20 is available.

Figure 73:
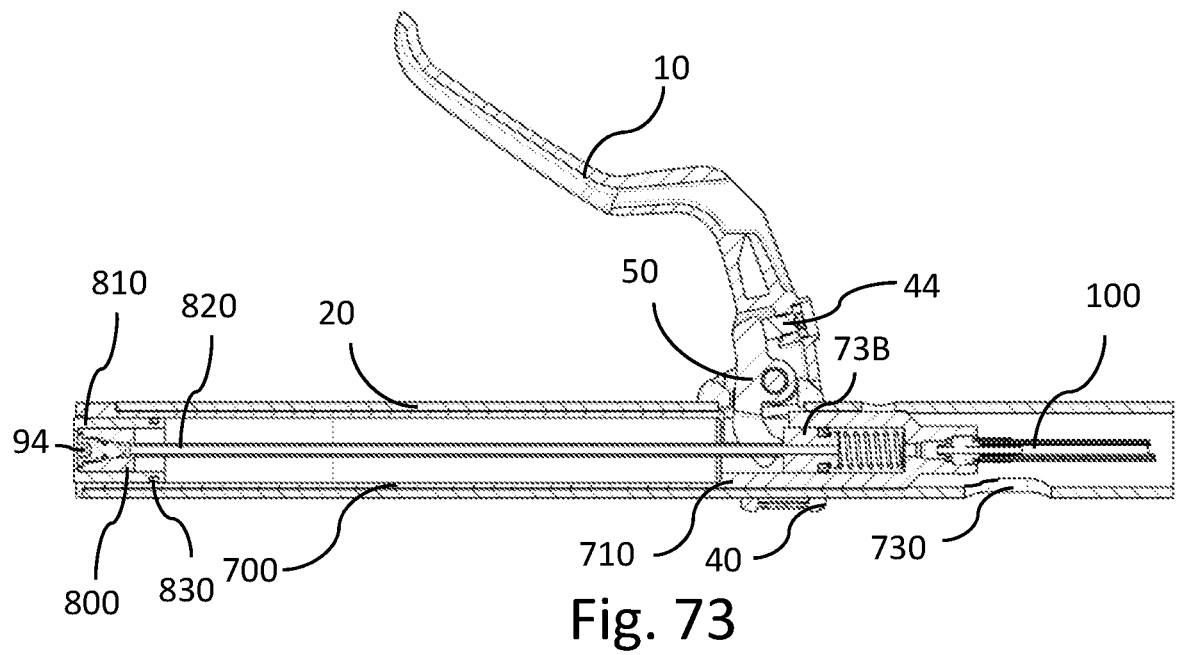
FIG. 73 is a fragmentary, cross-sectional view of a hydraulic master apparatus according to an exemplary embodiment.
Figure 74:
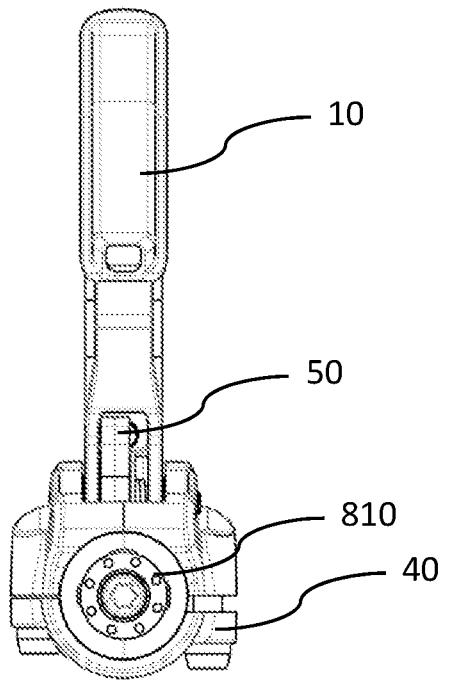
FIG. 74 is a side view of the hydraulic master apparatus of FIG. 73 in the direction of the handlebar end.

FIGS. 73 and 74 show views of a further hydraulic master apparatus according to a configuration. This configuration does not provide a compensating chamber. This configuration has a free travel adjusting device 800, which is formed and disposed such that it moves the piston 73B in the insert 700 as a mechanical remote control device. The free travel adjusting device 800 comprises an adjusting device 810 that is formed as a screw insert and is rotatably disposed in the insert. The adjusting device 810 is connected to the piston 73B through a or the connecting device 820. The connecting device is a rod that engages in the piston 73B by a thread. By turning the adjusting device 810, the piston, which is non-rotatably mounted in the insert 700, is moved axially in the insert so that the free travel is adjusted. To prevent unintentional adjustment of the free travel, the adjusting device 810 has an inhibiting device 830, which, in this case, is formed as an O-ring disposed in a groove of the adjusting device 810 or the screw insert or rotary insert. The inhibition is caused by the static friction between the O-ring and the insert 700 or the O-ring and the adjusting device 810.

In the configuration shown in FIGS. 73 to 74, a vent screw 94 can be provided in accordance with the configuration shown in FIG. 68.

Figure 75:
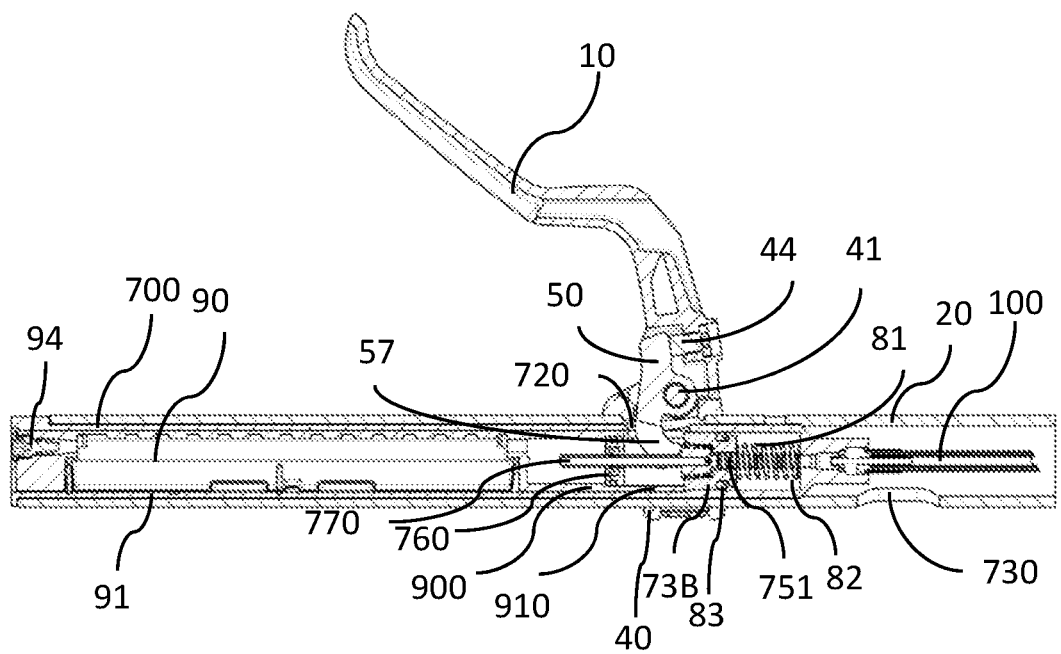
FIG. 75 is a fragmentary, cross-sectional view of a hydraulic master apparatus according to an exemplary embodiment.
Figure 76:
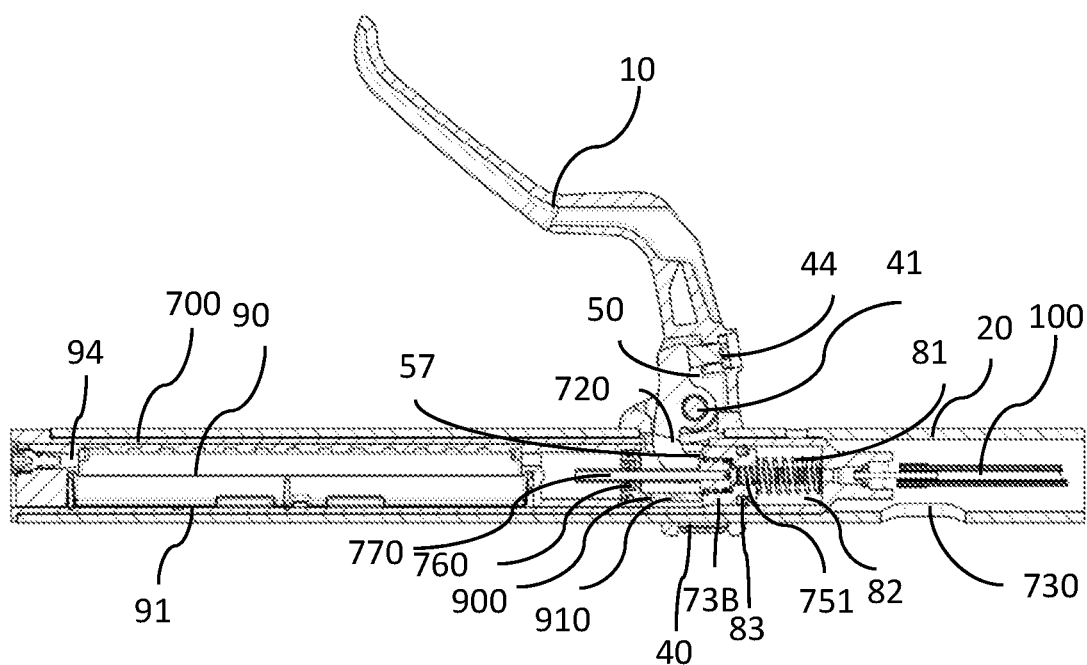
FIG. 76 is a fragmentary, cross-sectional view of a hydraulic master apparatus according to an exemplary embodiment.

FIGS. 75 and 76 show views of further hydraulic master apparatuses according to a configuration that have a stop device 900 for the piston 73b. In the configuration of FIG. 75, the stop device 900 is realized by an extension 910, which is configured as an extended web of the compensating chamber. In the configuration of FIG. 76, the stop device 900 is realized by an extension 910 that can be integrated in the support for the seal 760 or can be provided as a separate insert between the support for the seal 760 and the piston 73B.

Figure 77:
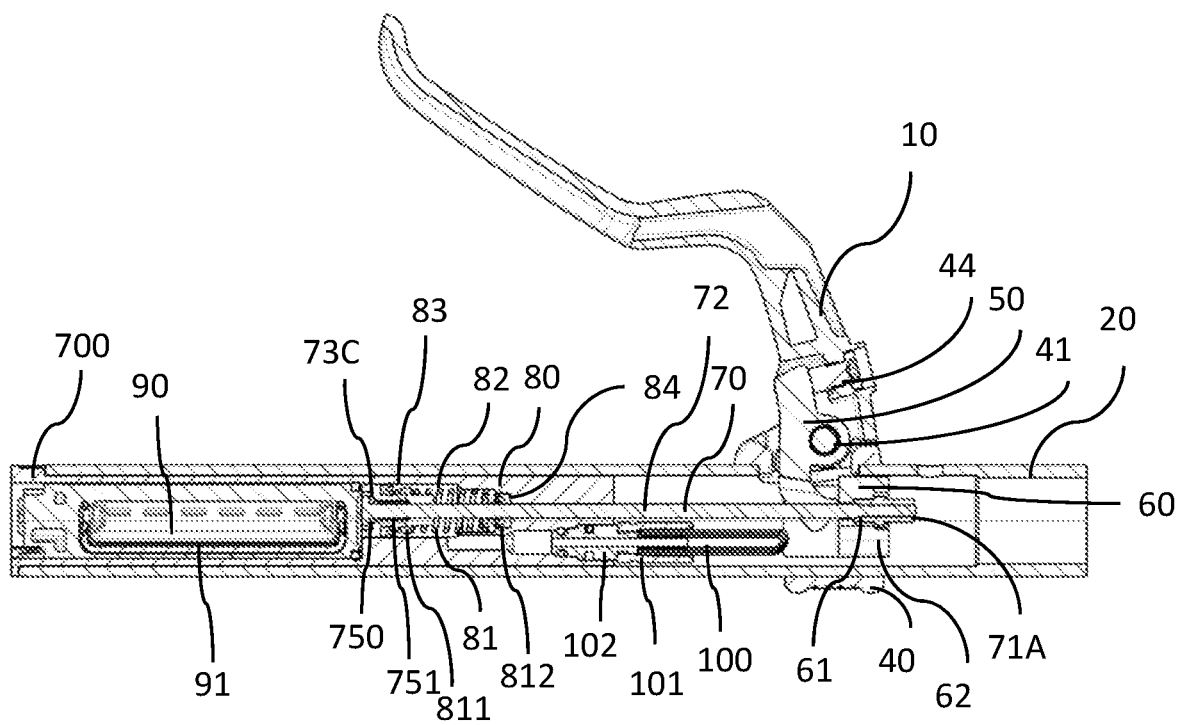
FIG. 77 is a fragmentary, cross-sectional view of a hydraulic master apparatus according to an exemplary embodiment.
Figure 78:
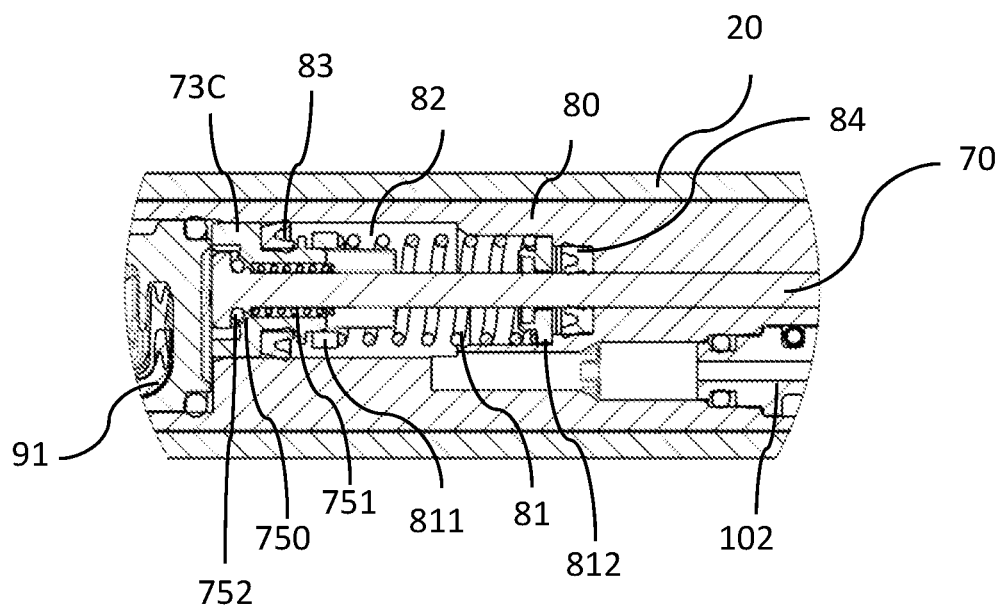
FIG. 78 is a fragmentary, enlarged cross-sectional detailed view of the hydraulic master apparatus of FIG. 77.

FIGS. 77 and 78 show views of a further hydraulic master apparatus according to a configuration. In this configuration, a pulling device 70 is provided in combination with a compensating chamber 90, which can be connected to the pressure chamber 82 through a central valve 750 when the hydraulic master apparatus is not actuated. Because the central valve 750 of this and the other configurations and its components are established and formed very similarly to the central valve 750 in the configuration described above, the same reference signs 750, 751 and 752 are used to describe the central valve 750 and its components. The central valve 750 is provided in the piston 73C. The end of the pulling device 70 is disposed in a passage extending through the piston 73C. A valve spring 751 pushes the closing member formed by the head of the pulling device 70 out of the valve seat formed on the piston 7C. Therefore, when the hydraulic master apparatus is not actuated, the central valve 750 is open and establishes a connection between the pressure chamber 82 and the compensating chamber 90. When the hydraulic master apparatus is actuated, the head of the pulling device 70 is pressed into the valve seat of the central valve so that the connection between the pressure chamber 82 and the compensating chamber 90 is interrupted.

The pressure chamber 82 is sealed by the primary seal 84 against the inner wall of the master cylinder 80. The seal 84 seals the pressure chamber 82 against the main body 72 of the pulling device 70. In the illustrated configuration, the main body 72 of the pulling device 70 is a rod.

The return spring 81 is clamped between a bushing 811 and a disk 812. During actuation, the primary seal 84 is moved with the pulling device 70 in the direction of the bushing 811 until it touches the bushing 811. Due to the pressure resulting after contact, the central valve 750 and, thus, the connection between pressure chamber 82 and compensating chamber 90 is closed by the seal 752, which is configured as an O-ring, for example, so that pressure can build up and the hydraulic slave can be actuated. This results in an interlocking connection between the piston 73C and the end of the pulling device 70, which moves the piston in the actuating direction against the force of the return spring 81 and the valve spring 751 in the direction of the pressure chamber 82. The distance between the primary seal 84 and the bushing 811 thus determines the free travel of the hydraulic master apparatus, which can be 0.3 mm to 1 mm, for example. In the rest position, the central valve 750 is open, so that a connection between pressure chamber 82 and compensating chamber 90 allows compensation of the hydraulic fluid, which is necessary or desired, e.g., when the linings (brake or clutch, etc.) heat up or wear.

As an alternative or in addition to the seal 752, the valve spring 751 can be disposed and formed such that a seal is created between the pulling device 70 and the piston 73C. The valve spring 751 can be disposed here and formed such that it has a double function and also takes over the function of the seal. For example, the valve spring might comprise a sealing ring. The valve spring can be made here of a suitable material or of a plurality of suitable materials.

Alternatively, the valve spring 751 can also be omitted. To ensure that the central valve 750 is still open when at rest, the seal 752 can be formed so that it closes the central valve 750 only at a certain pressure, which is certain to occur when the hydraulic fitting is actuated. For example, the seal can have extensions that are compressed during actuation, so that the central valve closes after a short actuation travel or a free travel caused by the compression of the extensions, if the seal closes not only in the area of the extensions but completely.

The pulling device 70 can, for example, be preloaded in tension by a spring provided on the lever, thus bringing the piston 73C into its rest position.

On the side of the pulling device 70 opposite the central valve 750, an adjusting device 71A is provided with which the distance between the shifting device 60 and the piston 73C can be adjusted, for example, to be able to set the free travel. The adjusting device 71A has a sleeve that is disposed on the end of the pulling device. For example, the sleeve can have an internal thread that can cooperate with an external thread on the rod of the pulling device 70 such that by turning the sleeve the distance between the shifting device 60 and the piston 73C can be adjusted.

Figure 79:
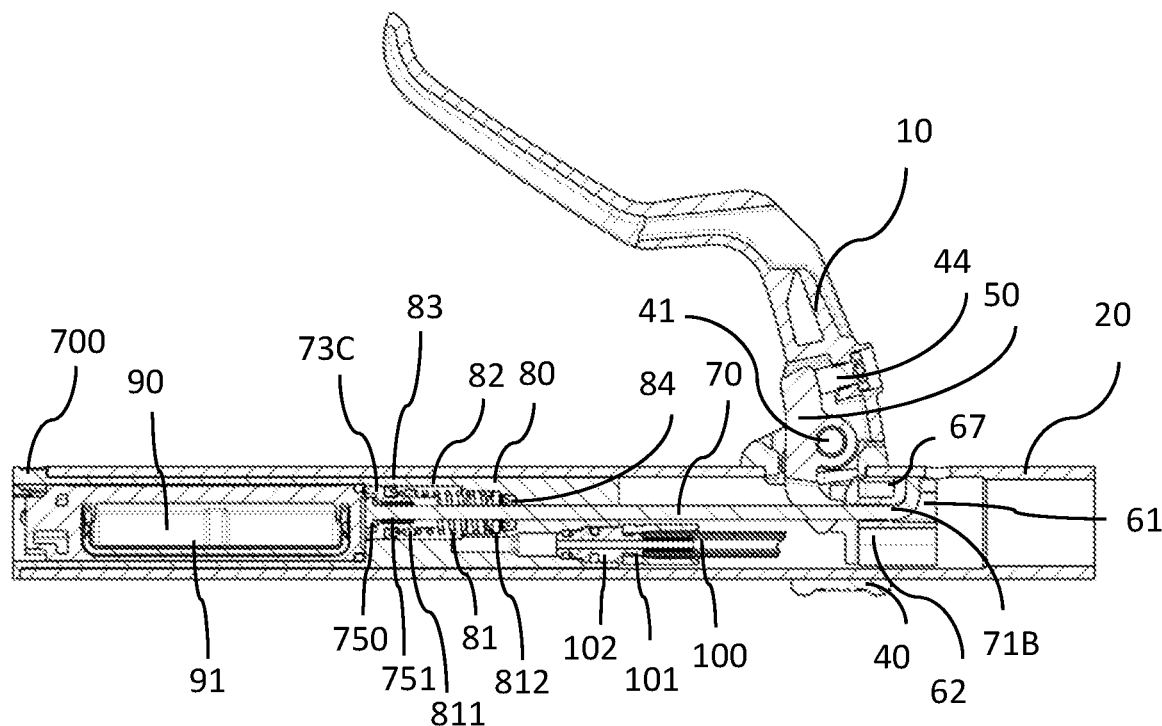
FIG. 79 is a fragmentary, cross-sectional view of a hydraulic master apparatus according to an exemplary embodiment.
Figure 80:
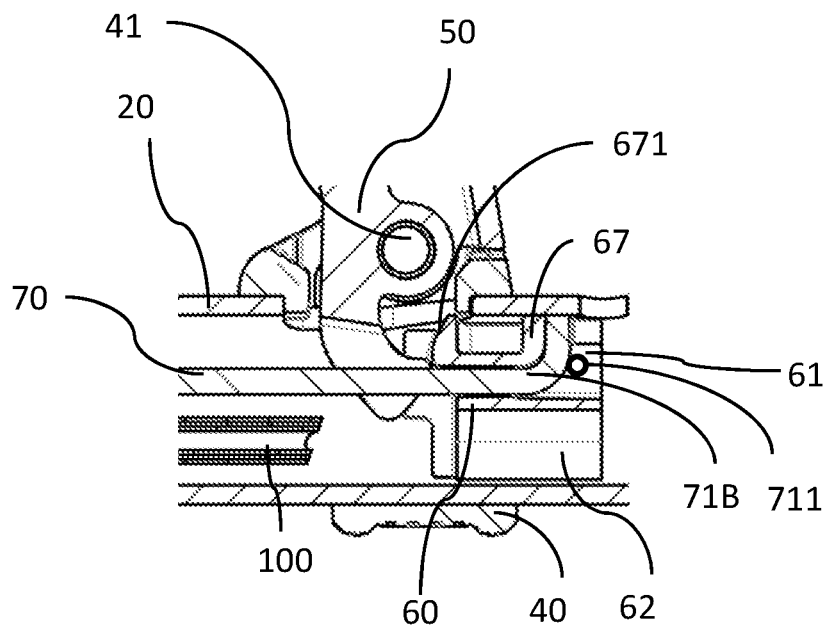
FIG. 80 is an enlarged cross-sectional view of the hydraulic master apparatus of FIG. 79.

FIGS. 79 and 80 show views of a further hydraulic master apparatus according to a configuration. This configuration is substantially the same as that shown in FIGS. 77 and 78, a connecting device 71B with an optional locking device 711 being provided instead of the adjusting device 71A.

The connecting device 71B can be formed hereby a curved section of the pulling device 70, which is disposed in the shifting device 60, as shown in FIGS. 79 and 80. In this case, the shifting device 60 is divided into two parts and comprises a clamping device 67. The connecting device 71B is attached to the shifting device 60 by the clamping device 67. In the other configurations, the force between the piston 73 and the pulling device 70 is transmitted by a threaded connection or an interlocking connection between the head 71 of the pulling device 70 and the shifting device 60. The configuration shown in FIGS. 79 and 80, on the other hand, has the advantage that it can be produced more cheaply and is easier to assemble.

For the assembly, all necessary components of the embodiments with or without central valve can be threaded onto a "pearl necklace" and then inserted into the cylinder 80. Then, the clamping device 67 can be placed on the shifting device 60 and the pulling device 70 with its pull rod can be bent by a certain angle to form the connecting device 71B. This method simplifies the assembly and significantly reduces the costs of the pulling device 70.

The clamping device 67 can have a contour 671, which can be formed such that the transmission ratio of the hydraulic master apparatus changes as desired during the actuation.

For securing the connecting device 71B and for easy mounting of the hydraulic master apparatus in a handlebar, a securing device 711 can be provided as an option, which can be made as a pin, for example. The safety device 711 is simultaneously used here as a support for the bent end of the pull rod in the area of the connecting device 71B. The support provided by the safety device 711 prevents the bent end of the pull rod from retaining its shape due to the support in the event of frequent or heavy use. This guarantees a constant and durable function of the fitting. The support also has the advantage that the pull rod can be made lighter or smaller because there is less risk of it being deformed due to the forces prevailing during the actuation.

It goes without saying that the systems and devices are not limited to the illustrated embodiments. Therefore, the above description should not be considered limiting but explanatory. The following claims should be understood such that a stated feature is present in at least one embodiment. This does not exclude the presence of further features. If the claims and the above description define "first" and "second" embodiments, this designation serves to distinguish between two similar embodiments without determining a ranking order.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A hydraulic master apparatus for a hydraulic brake or clutch of handlebar-guided vehicles, the hydraulic master apparatus comprising:
   a handlebar tube defining:
      a longitudinal direction; and
      a longitudinal axis within the handlebar tube extending in the longitudinal direction of the handlebar tube;
   a support shaped to connect to the handlebar tube;
   a lever pivotally mounted in the support; and
   a hydraulic cylinder:
      comprising a compensating chamber shaped to be disposed in the handlebar tube;
      comprising a movable piston having disposed therein a central valve; and
      being a master cylinder disposed between the support and the compensating chamber along the longitudinal axis.

2. The hydraulic master apparatus according to claim 1, wherein:
   the hydraulic cylinder comprises a pressure chamber in which the piston is movably disposed;
   the lever comprises a force transmission member; and
   which further comprises an insert:
      shaped to insert into the handlebar tube;
      comprising an end at which the hydraulic cylinder is disposed; and
      defining an engagement opening shaped to engage the force transmission member.

3. The hydraulic master apparatus according to claim 1, which further comprises a pulling device that, responsive to actuation of the hydraulic master apparatus, exerts a pulling force on the piston of the hydraulic cylinder.

4. The hydraulic master apparatus according to claim 3, wherein the pulling device comprises a pull rod.

5. The hydraulic master apparatus according to claim 4, wherein the pull rod has a bent section.

6. The hydraulic master apparatus according to claim 5, which further comprises a shifting device, the pulling device comprising a safety device configured to secure the pulling device in the shifting device and supporting the bent section of the pull rod to prevent deformation of the bent section.

7. The hydraulic master apparatus according to claim 3, wherein the pulling device defines a hydraulic channel and which further comprises:
   a hydraulic slave apparatus; and
   a hydraulic line:
      connected to the hydraulic slave apparatus; and
      connecting the hydraulic channel to the hydraulic cylinder.

8. The hydraulic master apparatus according to claim 1, which further comprises a shifting device shaped to be disposed in the handlebar tube movably in the longitudinal direction of the handlebar tube.

9. The hydraulic master apparatus according to claim 8, which further comprises a pulling device that, responsive to actuation of the hydraulic master apparatus, exerts a pulling force on the piston of the hydraulic cylinder, the shifting device being connected to the pulling device.

10. The hydraulic master apparatus according to claim 1, wherein the lever:
   comprises two arms are pivotally mounted thereon; and
   is hinged to two axes of rotation engaged by the two arms.

11. The hydraulic master apparatus according to claim 10, which further comprises a pressure piece and one of the two arms being part of the pressure piece.

12. The hydraulic master apparatus according to claim 1, wherein the hydraulic cylinder is a master cylinder and which further comprises a grip width adjusting apparatus configured to adjust a distance between the support and the master cylinder and thereby adjust a grip width.

13. The hydraulic master apparatus according to claim 1, wherein the master cylinder is disposed in the handlebar tube.

* * * * *